United States Patent
Ohmori et al.

(10) Patent No.: US 7,484,090 B2
(45) Date of Patent: Jan. 27, 2009

(54) ENCRYPTION APPARATUS, DECRYPTION APPARATUS, SECRET KEY GENERATION APPARATUS, AND COPYRIGHT PROTECTION SYSTEM

(75) Inventors: Motoji Ohmori, Hirakata (JP); Makoto Tatebayashi, Takarazuka (JP); Hideshi Ishihara, Katano (JP); Toshihisa Nakano, Neyagawa (JP)

(73) Assignee: Panasonic Corporation, Osaka (JP)

( * ) Notice: Subject to any disclaimer, the term of this patent is extended or adjusted under 35 U.S.C. 154(b) by 933 days.

(21) Appl. No.: 10/958,551

(22) Filed: Oct. 6, 2004

(65) Prior Publication Data

US 2005/0078825 A1    Apr. 14, 2005

(30) Foreign Application Priority Data

Oct. 10, 2003   (JP) ............................. 2003-352801

(51) Int. Cl.
H04L 9/00    (2006.01)
(52) U.S. Cl. .................................... 713/158
(58) Field of Classification Search ............... 713/156, 713/158; 726/10; 380/44; 725/67, 115
See application file for complete search history.

(56) References Cited

U.S. PATENT DOCUMENTS 6,574,609 B1 *   6/2003   Downs et al. ................. 705/50
7,073,073 B1 *   7/2006   Nonaka et al. ............... 713/193

FOREIGN PATENT DOCUMENTS

JP    3-210843    9/1991
JP    2003-234728    8/2003

* cited by examiner

Primary Examiner—Ellen Tran
(74) Attorney, Agent, or Firm—Wenderoth, Lind & Ponack, L.L.P.

(57) ABSTRACT

An encryption apparatus 100a including: a CRL storage unit 111 storing a CRL; a device key ring storage unit 112 storing a device key KD_A specific to each copyright protection module 210a used by a decryption apparatus 200a; a content key storage unit 113 storing a content key Kc that is a secret key for encrypting a content; a hashing function processing unit 114 calculating a hash value of the CRL stored in the CRL storage unit 111 according to a hashing function; and an Ex-OR unit 115 obtaining an exclusive OR value between the hash value and the device key KD_A. The encryption apparatus also includes an Enc unit 116 encrypting the content key Kc using an output value from the Ex-OR unit, and storing the hash value, the encrypted content key and the encrypted content in a DVD 2a.

91 Claims, 17 Drawing Sheets

FIG. 2

| CRL | | |
|---|---|---|
| File header | Name | ○△□△.crl |
| | Size | 119KB |
| | Type | Certificate Revocation List |
| | Date of update | 17:42, 08/08/03 |
| General | Version | V1 |
| | Issuer | ○△□△ |
| | Validity start date | 07/08/03 |
| | Next update due date | 17/08/03 |
| | Signature algorithm | md5RSA |
| Revocation list | Serial number | Revocation date |
| | ○×× ···△□ | 01/05/01 |
| | ○×× ···○□ | 29/11/00 |
| | ... | ... |

ENCRYPTION APPARATUS, DECRYPTION APPARATUS, SECRET KEY GENERATION APPARATUS, AND COPYRIGHT PROTECTION SYSTEM

BACKGROUND OF THE INVENTION (1) Field of the Invention

The present invention relates to an encryption apparatus, a decryption apparatus, a secret key generation apparatus and a copyright protection system for protecting copyright for transmitting a digital work via a recording medium or a transmission medium. In particular, the present invention relates to a technique of protecting against an attack enacted by replacing a Certificate Revocation List for specifying revoked public key certificates.

(2) Description of the Related Art

When a first device transmits a digital work to a second device, the first device authenticates the second device (or the first and second devices mutually authenticate). The authentication is performed before the transmission so as to prevent a copyright infringement by unauthorized obtainment. In other words, the authentication is a means to make sure whether the person on the other side of the communication is a person intended to be there for communication.

One of the examples in using a public key encryption is as follows: the first device sends a random number to the second device, then, the second device encrypts the random number using its own secret key (e.g., digital signature) and returns the encrypted text to the first device, and finally, the first device verifies the returned encrypted text (or the digital signature) using the public key held by the second device. However, in the authentication based on such public key encryption, it is presupposed that the public key is valid.

In recent years, an organization or a company called "certificate authority" issues a "public key certificate" indicating that a public key is authorized for each user (a "guarantee" for a public key). Among the issued public key certificates, for those with expired validity or those possessed by the user who has illegally conducted or who has his/her secret key stolen, Certificate Revocation List (hereinafter to be referred to as "CRL", "public key certificate revocation list" or "revocation list") indicating a list of information for specifying revoked public key certificates is issued in order to nullify such certificates (in order to inform other users of the revoked public key certificates).

It is possible to prevent an error of transmitting an important digital work to an unauthorized person by obtaining a public key certificate from a person on the other side of communication so as to authenticate the person using the public key possessed by the person, and performing the authentication as described above after confirming that the obtained public key certificate is not registered in the CRL (i.e., nullified).

It should be noted that, in some cases, the verification of a public key is performed using only a public key certificate (see reference to Japanese Patent Publication No. 3199119 (pp. 2)). However, this does not work for the public key certificate possessed by the user who has illegally acted or the user who has had his/her own secret key stolen.

However, not all the computers can always obtain a proper CRL so as to check the validity of the public key certificate issued for the person at the other end of the communication. This is a defect in the authentication based on the CRL and illegal conducts are enacted by taking advantage of the defect.

For example, in the case where a device, such as a Digital Video/Versatile Disc (DVD) for replaying a DVD on which a digital work such as a movie is recorded, obtains the latest CRL via the DVD (i.e., reads out the latest CRL recorded on the DVD) and employs the method of authentication with reference to the CRL for a partner device (e.g., a computer that activates an integrated replay processing circuit or replay software), there is a possibility that the CRL may be replaced with the old one in the process of reading out the CRL. The problem therefore is that the digital work may be obtained illegally with a revoked key that is not yet registered in the replaced and old CRL, whereas the public key would have been registered as a revoked public key certificate in a proper (i.e., the latest) CRL.

In order to overcome such a problem, the encryption apparatus, the decryption apparatus, and the copyright protection system are invented for realizing a prevention of the replacement of the CRL and a safe transmission of a digital work (see reference to Japanese Patent Application No. 2002-259514).

On one hand, in the encryption apparatus according to this conception, the following operations are performed: an attribute value calculation unit calculates an attribute value which depends on the information in the CRL that is a list of information for specifying revoked public key certificates; a modification unit modifies, using the attribute value calculated by the attribute value calculation unit, a second secret key associated with the decryption apparatus that decrypts an encrypted digital work; a first encryption unit encrypts a first secret key used for the encryption of the digital work using the second secret key modified by the modification unit; a second encryption unit encrypts the digital work using a first secret key; and an output unit outputs, to the storage medium or the transmission medium, the CRL, the first secret key encrypted by the first encryption unit and the digital work encrypted by the second encryption unit.

On the other hand, in the decryption apparatus according to this conception, an obtainment unit obtains, via a storage medium or a transmission medium, an encrypted digital work, an encrypted first secret key generated by encrypting the first secret key used for the encryption of the digital work, and an CRL that is a list of information for specifying revoked public key certificates; the attribute value calculation unit calculates, based on the obtained CRL, an attribute value that depends on the contents of the CRL; the modification unit modifies, using the attribute value calculated by the attribute value calculation unit, a second secret key which is specific to the decryption apparatus and is already held by said apparatus; a first decryption unit decrypts the obtained encrypted first secret key using the second secret key modified by the modification unit; and a second decryption unit decrypts the encrypted digital work obtained by the obtainment unit using the first secret key decrypted by the first decryption unit.

Thus, the encryption apparatus outputs the encrypted digital work, the encrypted first secret key generated by encrypting the first secret key used for the encryption of the digital work, and the CRL. However, the encrypted first secret key is the first secret key encrypted by the second secret key being a key which is not only associated with the decryption apparatus, but also in which the CRL is involved. In the case where the CRL is replaced with the old one, the information related to the CRL for the pre-held second secret key is changed. Therefore, the decryption apparatus which has received the encrypted digital work, the encrypted first secret key and the CRL cannot decrypt the encrypted first secret key into the original first secret key with the use of the second secret key thus transformed. Consequently, the decryption apparatus cannot properly decrypt the encrypted digital work, and it is possible to safely transmit a digital work allowed by the function to prevent the attack enacted by replacing the CRL.

SUMMARY OF THE INVENTION

Along with a fierce competition in the market of decryption apparatuses, an arrival of a decryption apparatus with a higher cost performance is desired.

An object of the present invention therefore is to provide the encryption apparatus, the decryption apparatus and the copyright protection system which realize a higher cost performance and a safe transmission of a digital work.

In order to achieve the above object, the inventors have conducted a detailed analysis on the operation of the decryption apparatus according to the above conception. They found out that it takes so much time for the attribute value calculation unit in the decryption apparatus to calculate, based on the CRL, an attribute value that depends on the contents of the CRL, which causes a low performance, and that the attribute value calculation unit is a cause of the increase in cost. This resulted in the structures of the encryption apparatus, the decryption apparatus and the copyright protection system which realize the safe transmission of a digital work, even without calculating, based on the CRL, the attribute value that depends on the contents of the CRL.

The second secret key storage unit, the attribute value calculation unit, the modification unit, and the first decryption unit in the decryption apparatus are composed as a content key decryption unit within a copyright protection module (e.g., an IC card or an IC chip) with tamper-resistant nature, while the second decryption unit is composed as a descrambler. The respective copyright protection module and descrambler are respectively equipped with an encryption apparatus that judges the validity of a partner device's public key with reference to the CRL and performs encrypted communication with the partner device using the public key in the case of judging that the partner device's public key is valid. In this way, in the case where the partner device (i.e., the copyright protection module or the descrambler) is unauthorized, Secure Authentication Channel (SAC) may be formed between the device per se and the partner device so that the copyright protection module can send the first secret key to the descrambler via encrypted communication.

As it is conceivable that an illegal conduct may be carried out using an application program or the like, in the case where the decryption apparatus is realized with a DVD drive and an application program for replaying a content in a Personal Computer (PC), it is particularly required that the SAC be formed between the DVD drive and the application program.

However, in the case of realizing the decryption apparatus in a consumer DVD player, it is general that the second secret key storage unit, the attribute value calculation unit, the modification unit, the first decryption unit in the content key decryption unit and the second decryption unit in the descrambler are composed as hardware. This facilitates the incorporation of the second decryption unit of the descrambler into the copyright protection module. The incorporation does not necessitate the formation of the SAC between the content key decryption unit and the descrambler as long as a copyright protection module is manufactured under the control of a copyright holder. It is therefore possible to omit an encryption communication apparatus so that decryption apparatuses are produced with a low cost. The calculation of the attribute value (i.e., a hash value) made by the attribute value calculation unit based on the CRL without the formation of SAC in the DVD player is unreasonable and wasteful whereas an attribute value (a hash value) is necessary for decrypting an encrypted content key. The structure of the decryption apparatus without the attribute value calculation unit is developed by allowing a storage medium to bind the attribute value (a hash value) calculated by the attribute value calculation unit in the encryption apparatus or outputting the attribute value to a transmission medium so as to use the attribute value obtained via the storage medium or the transmission medium in the decryption apparatus. Thus, by using the attribute value instead of the CRL, a high performance is achieved in the decryption of the secret key since the time for calculating an attribute value is no longer required, and the low cost can be achieved for the decryption apparatus because of the omission of the attribute value calculation unit. The high performance is greatly achieved in the decryption of a content since the time taken for a mutual authentication is no longer required, and the cost of the decryption apparatus is greatly reduced because of the omission of the encryption communication apparatus for forming the SAC, by not using the CRL despite that it is no longer possible to perform mutual authentication. That is to say, the encryption apparatus, the decryption apparatus and the copyright protection system that realize a higher cost performance as well as a safe transmission of a digital work is realized.

In other words, the encryption apparatus according to the present invention is an encryption apparatus that encrypts a digital work and outputs the encrypted digital work to a storage medium or a transmission medium, the apparatus comprising: a digital work storage unit operable to store a digital work; a first secret key storage unit operable to store a first secret key to be used for encrypting a digital work; a second secret key storage unit operable to store a second secret key associated with a decryption apparatus that decrypts an encrypted digital work; a certificate revocation list (CRL) storage unit operable to store a CRL that is a list of information for specifying revoked public key certificates; an attribute value calculation unit operable to calculate an attribute value that depends on the information in the CRL, based on the CRL stored in the CRL storage unit; a modification unit operable to modify the second secret key stored in the second secret key storage unit, using the attribute value calculated by the attribute value calculation unit; a first encryption unit operable to encrypt the first secret key stored in the first secret key storage unit, using the second secret key modified by the modification unit; a second encryption unit operable to encrypt the digital work stored in the digital work storage unit, using the first secret key stored in the first secret key storage unit; and an output unit operable to output, to the storage medium or the transmission medium, the attribute value calculated by the attribute value calculation unit, the first secret key encrypted by the first encryption unit and the digital work encrypted by the second encryption unit.

Thus, the encryption apparatus outputs an encrypted digital work, an encrypted first secret key used for the encryption of the digital work, and an attribute value (a hash value) of the CRL. However, the encrypted first secret key is generated by encrypting the first secret key using the second secret key being a second secret key which is not only corresponded to the decryption apparatus but is also the one in which the attribute value of the CRL is involved. Therefore, even in the case where the CRL is replaced by another, the decryption apparatus having received the encrypted digital work, the encrypted first secret key and the attribute value of the CRL cannot decrypt the encrypted first secret key into the original first secret key using the second secret key thus modified since it does not use the replacing CRL. This means that it is not possible to correctly decrypt the encrypted digital work so that the digital work can be transferred securely. What is more, by using an attribute value, high performance is achieved in the decryption of the first secret key because the time for calculating an attribute value is no longer required, and the price of the decryption apparatus can be reduced because of the omission of the attribute value calculation unit.

The encryption apparatus may further comprise a verification data output unit operable to output, to the storage medium or the transmission medium, verification data to be a criterion for checking whether or not the first secret key decrypted by the decryption apparatus is correct. For example, the verification data output unit may output, to the storage medium or the transmission medium, data obtained by encrypting predetermined fixed-pattern data using the first secret key stored in the first secret key storage unit, as the verification data, or output to the storage medium or the transmission medium, data obtained by encrypting the first secret key stored in the first secret key storage unit, using said first secret key, as the verification data.

Thus, the decryption apparatus, having received the encrypted digital work outputted from the encryption apparatus, the encrypted first secret key and the attribute value of the CRL, can judge whether or not the encrypted first secret key is correctly decrypted into the original first secret key so that it is possible to prevent unnecessary processing of erroneously decrypting the digital work using the first secret key.

The encryption apparatus according to the present invention is also an encryption apparatus that encrypts a digital work and outputs the encrypted digital work to a storage medium or a transmission medium, the apparatus comprising: a digital work storage unit operable to store a digital work; a first secret key storage unit operable to store a first secret key to be used for encrypting a digital work; a second secret key storage unit operable to store a second secret key associated with a decryption apparatus that decrypts an encrypted digital work; a CRL storage unit operable to store a CRL that is a list of information for specifying revoked public key certificates; a first encryption unit operable to encrypt the first secret key stored in the first secret key storage unit, using the second secret key stored in the second secret key storage unit; an attribute value calculation unit operable to calculate an attribute value that depends on the information in the CRL, based on the CRL stored in the CRL storage unit; a modification unit operable to modify the first secret key stored in the first secret key storage unit, using the attribute value calculated by the attribute value calculation unit; a second encryption unit operable to encrypt the digital work stored in the digital work storage unit, using the first secret key modified by the modification unit; and an output unit operable to output, to a storage medium or a transmission medium, the attribute value calculated by the attribute value calculation unit, the first secret key encrypted by the first encryption unit and the digital work encrypted by the second encryption unit.

Thus, the encryption apparatus outputs an encrypted digital work, an encrypted first secret key used for the encryption of the digital work, and a CRL. The encrypted digital work, however, is not encrypted using a simple first secret key but is encrypted using the modified first secret key in which the CRL is involved. Therefore, even in the case where the CRL is replaced by another, the decryption, having received the encrypted digital work, the encrypted first secret key and the attribute of the CRL, cannot correctly decrypt the encrypted digital work using the first secret key thus modified since it does not use the replacing CRL. Consequently, it is possible to securely transmit a digital work. What is more, by using an attribute value, high performance can be achieved in the decryption of the first secret key since the time for calculating an attribute value is no longer required and the price of the decryption apparatus can be reduced due to the omission of the attribute value calculation unit.

As described above, owing to the fact that the encryption apparatus outputs the verification data related to the first secret key in which the attribute value of the CRL is involved, the decryption apparatus, having received the encrypted digital work, the encrypted first secret key and the attribute value of the CRL outputted by the encryption apparatus can judge whether or not the encrypted first secret key can be decrypted into a correct secret key used for the encryption of the digital work. It is therefore possible to prevent beforehand the unnecessary processing of decrypting the digital work using a wrong secret key.

It is further possible to multi-layer a secret key in the encryption apparatus. That is to say, the encryption apparatus that encrypts a digital work and outputs the encrypted digital work to a storage medium or a transmission medium may repeat, for a first through (n−1)th (n is 2 or greater) secret keys, a sequence of encrypting a digital work using a first secret key out of n secret keys, and encrypting an (i−1)th ($2 \leq i \leq =n$) secret key using an i th secret key; output the encrypted first through (n−1)th secret keys to either of the mediums; modify a secret key, prior to encryption, using an attribute value which depends on information in a certificate revocation list (CRL) that is a list of information for specifying revoked public key certificates, in the case where at least one of the first through (n−1)th secret keys is used in the encryption; and output the attribute value to the medium.

The encryption apparatus that that encrypts a digital work and outputs the encrypted digital work to a storage medium or a transmission medium may repeat, for a first through an (n−1)th (n is 1 or greater) secret keys, a sequence of encrypting a digital work using the converted medium identification information after converting medium identification information by one-way function using the first secret key out of n secret keys, and encrypt an (i−1)th ($2 \leq i \leq n$) secret key using an i th secret key, in the case where n is 2 or greater; output the encrypted first through (n−1)th secret keys to the either of the mediums; modify, prior to encryption or conversion, (i) a secret key, using an attribute value which depends on information in a certificate revocation list (CRL) that is a list of information for specifying revoked public key certificates, or (ii) the medium identification information obtained in the conversion, using the attribute value, in the case where at least one of the first through n th secret keys is used in the encryption or the conversion; and output the attribute value to the medium.

A content key, a device key, a disk key, a media ID, or the like, may be used as a secret key.

Thus, the level of encryption can be enhanced.

It should be noted that the present invention can be realized as the following: a decryption apparatus that is adaptive to the encryption apparatus; a secret key generation apparatus; a copyright protection system configured by such encryption and decryption apparatuses; an encryption or decryption method including the characteristic units composing the encryption apparatus or the decryption apparatus as steps; and a program that causes a personal computer to execute these steps. Such a program can be surely distributed widely via a storage medium such as a DVD or a transmission medium such as the Internet.

As is obvious from the above description, the present invention can overcome the attack enacted by replacing the CRL by using an attribute value instead of a CRL. Moreover, the high performance in the decryption of a secret key can be achieved because the time for calculating an attribute value is no longer required, and the cost of the decryption apparatus can be reduced because of the omission of the attribute value calculation unit. The high performance is greatly achieved in the decryption of a content since the time taken for mutual authentication is no longer required, and the cost of the decryption apparatus is greatly reduced because of the omission of the encryption communication apparatus for forming a SAC, by not using a CRL despite that it is no longer possible to perform a mutual authentication. Therefore, the encryption apparatus, the decryption apparatus and the copyright protection system that realize a higher cost performance as well as a safe transmission of a digital work are realized.

As described above, owing to the present invention, it is possible to realize a higher cost performance and a safe transmission of a digital work. The practical value of the present invention is extremely high today where the distribution or the circulation of digital works via a transmission line such as the Internet or a storage medium such as a DVD has become active.

The disclosure of Japanese Patent Application No. 2003-352801 filed on Oct. 10, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 shows an example of the composition of the CRL;

DETAILED DESCRIPTION OF THE INVENTION

The following describes the copyright protection system according to the embodiments of the present invention with reference to the drawings.

First Embodiment

Figure 1:
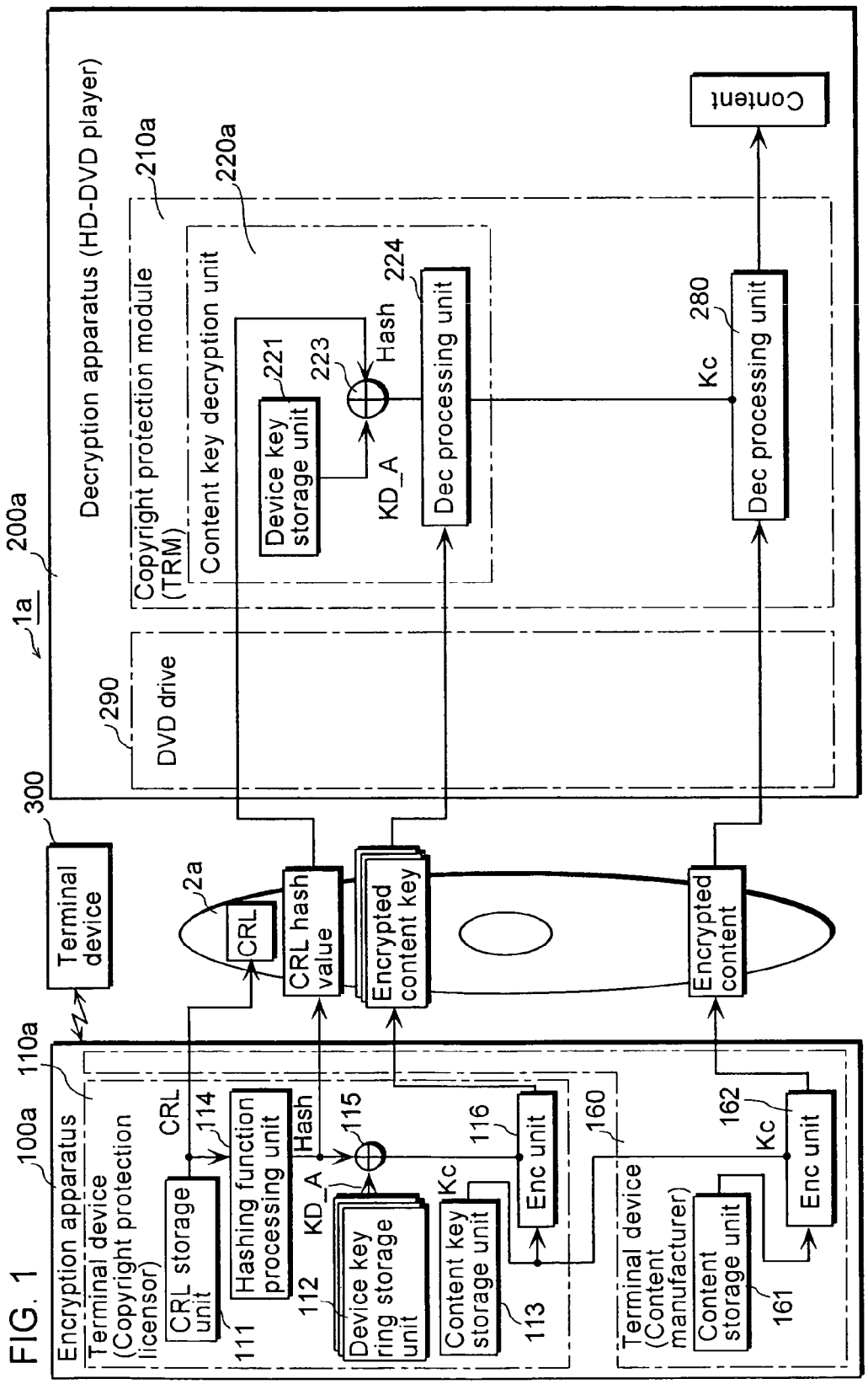
FIG. 1 is a functional block diagram showing the overall structure of the copyright protection system according to a first embodiment of the present invention.

FIG. 1 is a functional block diagram showing the overall configuration of the copyright protection system according to the first embodiment.

As shown in FIG. 1, the copyright protection system 1a is for recording an encrypted content onto a DVD2a that serves as a storage medium, and reading out the encrypted content from the DVD2a so as to decrypt it. Such copyright protection system 1a is comprised of: an encryption apparatus 100a for recording an encrypted content onto the DVD2a; a decryption apparatus 200a for reading the encrypted content from the DVD2a so as to decrypt it; and a terminal device 300 used by a Certificate Authority (hereinafter to be referred to as "CA") that issues a CRL, etc.

The encryption device 100a is mainly composed of two terminal devices: a terminal device 110a used by a copyright protection licensor; and a terminal device 160 used by a content manufacturer.

The decryption apparatus 200a is, for example, an HD-DVD player adapted for a reproduction of a content at a picture level HD (1125i/750p), and is composed of a DVD drive 290 for reading an encrypted content from the DVD2a, and a copyright protection module 210a.

The terminal device 110a used by the copyright protection licensor is a computer apparatus for providing the terminal device 160 with the following: information for attempting the copyright protection for the decryption apparatus 200a i.e., a CRL; a CRL hash value Hash; a content key for decrypting a content; a ring of encrypted content keys obtained by encrypting the content key. The terminal device 110a includes a CRL storage unit 111, a device key ring storage unit 112, a content key storage unit 113, a hashing function processing unit 114, an Ex-OR unit 115 and an Enc unit 116.

The CRL storage unit 111 regularly accesses the terminal device 300 via a communication network such as the Internet, updates the CRL to the latest one provided by the CA and stores the updated CRL. The CRL includes, as shown in FIG. 2, a file header, a field "General" and a field "Revocation list". The file header includes records on the file such as "Name" (e.g., ○△□△.CR1), "Size" (e.g., 119 KB) "Type" (e.g., CRL), "Date of update" (e.g., 17:42/08/08/2003). The field "General" includes the records such as "Version" (e.g., V), "Issuer" (e.g., ○△□△) "Validity start date" (e.g., Aug. 7, 2003), "Next update due date" (e.g., Aug. 17, 2003), and "Signature algorithm" (e.g., md5RSA). In the field "Revocation list", "Serial number" of a revoked certificate and the date of revocation are described in a text form. The CRL is characteristic in that the size of the file increases monotonously. This is because the number of revoked public key certificates increases monotonously with time, and the newer the CRL is, the more the number of entries (the number of revoked public key certificates registered in the CRL) made by serial numbers of revoked public key certificates increases.

The device key ring storage unit 112 stores in advance a device key KD_A specific to each copyright protection module 210a that is manufactured under the control of the copyright protection licensor (e.g., 128 bits).

The content key storage unit 113 stores a content key Kc (e.g., 128 bits) that is a secret key for encrypting a predetermined content e.g., music or movie.

The hashing function processing unit 114 is a processing unit for converting the CRL being variable length data stored in the CRL storage unit 111 into fixed length (e.g. 128 bits) data (e.g., a hash value Hash) by compressing it based on a hashing function, for example, Secure Hash Algorithm (SHA-1) or MD5.

The Ex-OR unit 115 calculates an exclusive OR value between the hash value Hash calculated by the hashing function processing unit 114 and each device key KD_A stored in the device key ring storage unit 112 (i.e., each device key KD_A is transformed using the hash value Hash).

The Enc unit 116 encrypts the content key Kc stored in the content key storage unit 113 based on the output of the Ex-OR unit 115, namely, the exclusive OR value between the hash value Hash and each device key KD_A, and generates a ring of encrypted content keys.

It should be noted that the hashing function processing unit 114 and the Ex-OR unit 115 in the terminal device 110a transform the device key KD_A with reference to the CRL stored in the CRL storage unit 111. This, however, is performed with the view to associate the encrypted content key outputted by the Enc unit 116 with the CRL by encrypting the content key Kc using the transformed device key KD_A. Thus, it is possible to prevent against the attack of replacing the CRL enacted in the decryption processing (to be mentioned later) performed by the decryption apparatus 200a.

The terminal device 160 used by a content manufacturer is a write apparatus for recording the CRL provided by the terminal device 110a, the CRL hash value Hash and the ring of encrypted content keys directly onto the DVD2a, and includes a content storage unit 161 and an Enc unit 162.

The content storage unit 161 stores in advance a predetermined content such as movie and music.

The Enc unit 162 encrypts the content stored in the content storage unit 161 using the content key Kc provided by the terminal device 110a, and generates an encrypted content.

In the case of manufacturing the DVD2a, using the encryption apparatus 100a thus composed of the terminal devices 110a and 160, the terminal device 110a reads out the CRL from the CRL storage unit 111 and passes the read-out CRL to the hashing function processing unit 114 and the device apparatus 160. Then, the hashing function processing unit 114 calculates the CRL hash value Hash and passes the calculated hash value Hash to the Ex-OR unit 115 and the terminal device 160. Then, the Ex-OR unit 115 reads out one by one each of the device keys KD_A, etc, from the device key ring storage unit 112, sequentially calculates an exclusive OR value between each of the device keys KD_A and the hash value Hash each time the device key KD_A is read out, and outputs each exclusive OR value to the Enc unit 116. The terminal device 110a then reads out the content key Kc from the content key storage unit 113 and passes the read-out content key Kc to the Enc unit 116 and the terminal device 160. The Enc unit 116 encrypts the passed content key Kc using each exclusive OR value outputted from the Ex-OR unit 115. That is to say that the Enc unit 116 encrypts the content key Kc using the exclusive OR value between the respective value of the device key KD_A and the hash value Hash as a key. Thus, the Enc unit 116 generates plural encrypted content keys and passes the encrypted content keys in a ring.

The terminal device 160 writes the CRL passed by the terminal device 110a, the CRL hash value Hash and a ring of encrypted content keys directly onto the DVD2a, and then, writes the encrypted content generated by the Enc unit 162 onto the DVD2a. The DVD2a thus manufactured, in which the encrypted content key ring, the CRL that is the latest at the time of manufacturing, and the CRL hash value Hash are bound together with the encrypted content, is vended to the user. It should be noted that the CRL is bound with the DVD2a in order to maintain the compatibility for the decryption apparatus that calculates the hash value with reference to the CRL contrived by the inventors.

Figure 3:
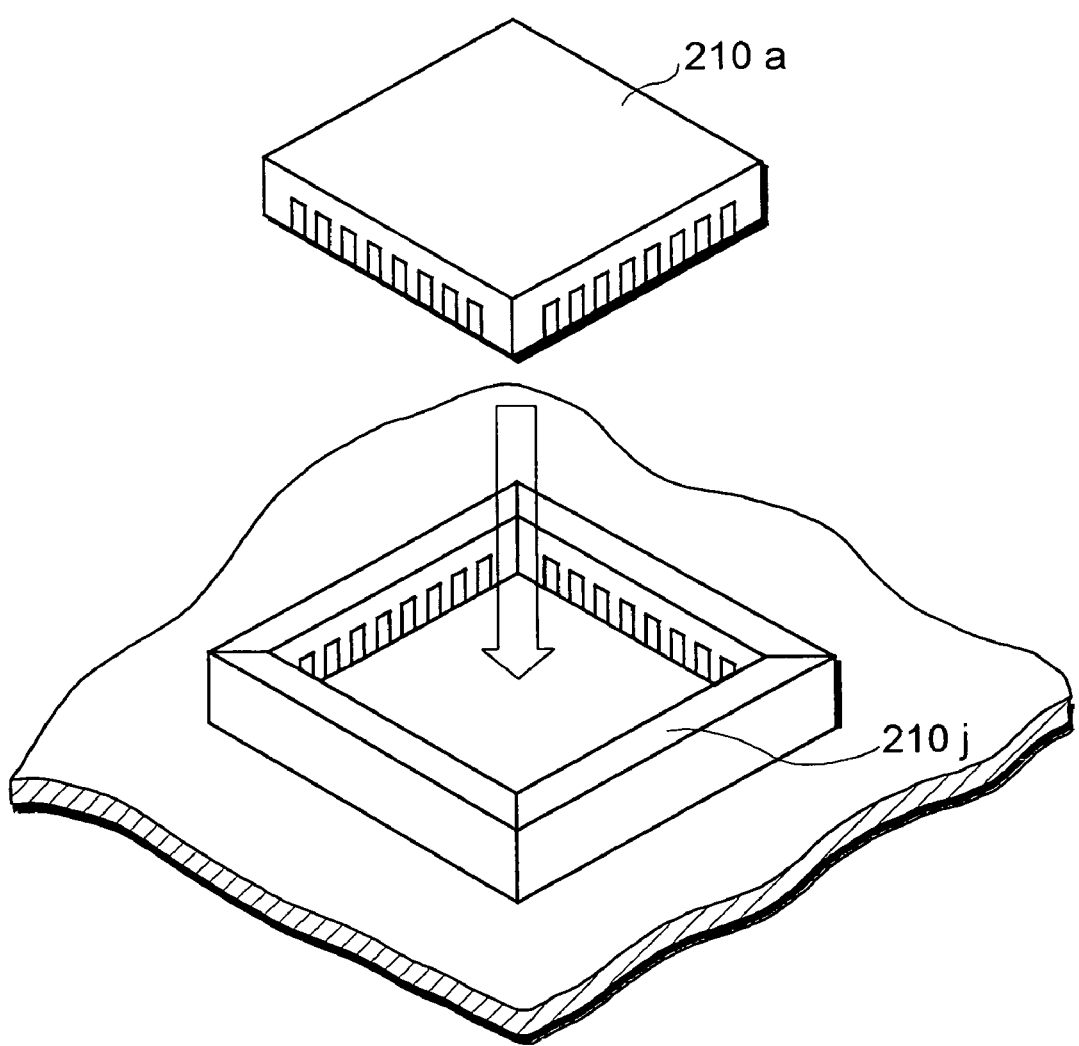
FIG. 3 shows a mounting example in the case where a copyright protection module is formed by an LSI.

The copyright protection module 210a of the decryption apparatus 200a that decrypts such DVD2a is provided by the copyright protection licensor or manufactured by the manufacturer of the decryption apparatus 200a under the control of the copyright protection licensor. As shown in FIG. 3, the copyright protection module 210a is composed of a Tamper Resistance Module (TRM) that is constructed in chip form as an LSI. The copyright protection module 210a constructed as an LSI is mounted within the decryption apparatus by mounting it on a socket 210j or directly mounting it on a board by means of soldering. The LSI includes, for example, a protection film for internal circuit deconstruction within a scribe area in an internal circuit, and deconstructs the internal circuit when it is attacked externally. It is therefore difficult to conduct an unauthorized access or a falsification, and therefore, a high security can be achieved.

Figure 4:
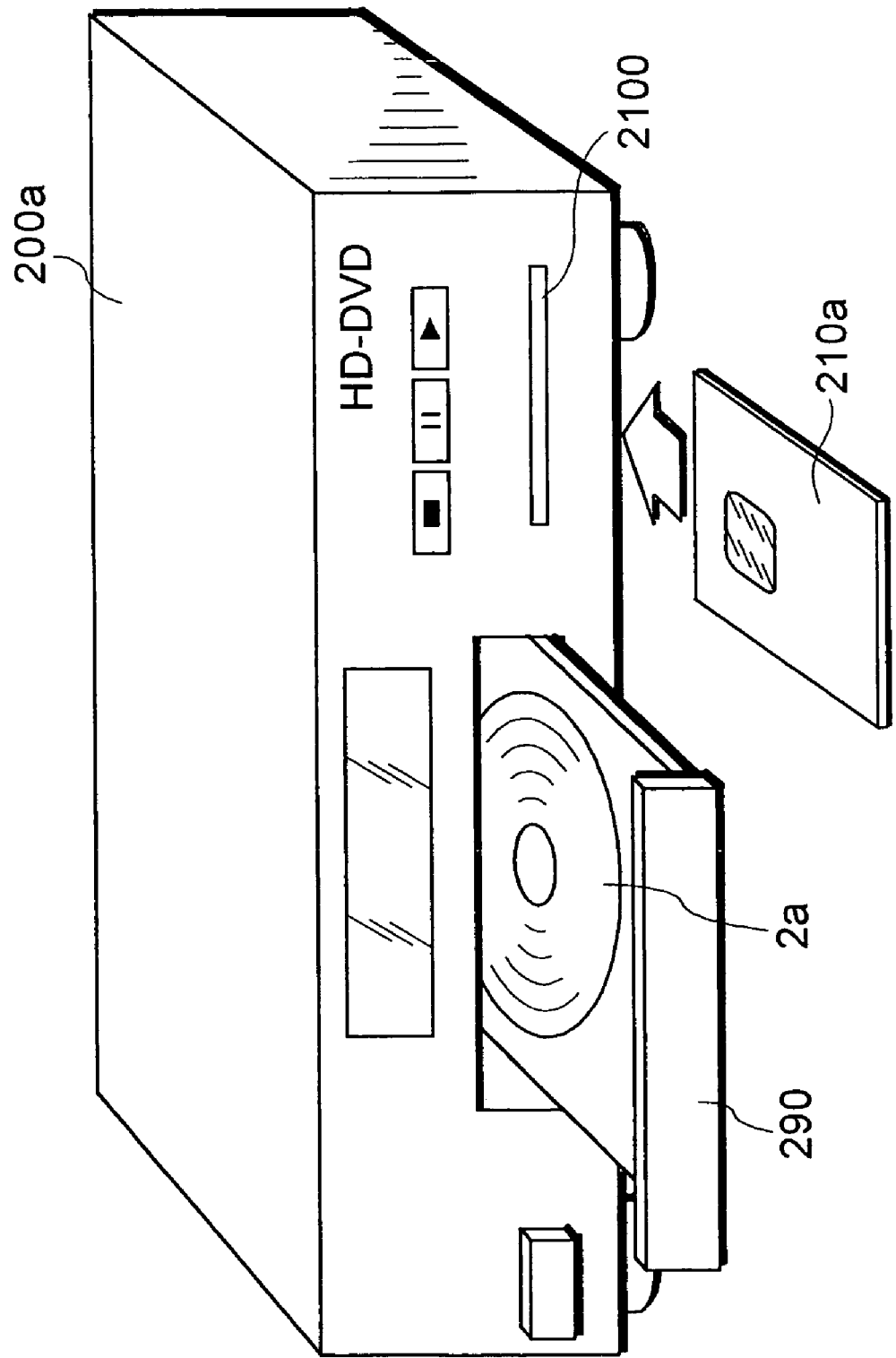
FIG. 4 is an appearance diagram showing an example of mounting the copyright protection module 210a on the decryption apparatus (HD-DVD player) 200a, in the case where the copyright protection module is formed by an IC card.

It should be noted that the copyright protection module 210a may be composed as an IC card. In this case, a card insertion slot 2100 may be set in the front panel of the HD-DVD player 200a so that the copyright protection module 210a as IC card is inserted into the card insertion slot 2100, as shown in FIG. 4. The copyright protection module 210a as IC card is a card made of plastic in which an IC chip including a CPU is buried, and can judge whether or not the access at the time of writing/reading data is authorized by means of the processing performed by the incorporated CPU. It is therefore difficult to conduct an unauthorized access or a falsification, and therefore, a high security can be achieved.

Such copyright protection module 210a mainly includes: a content key decryption unit 220a which obtains a key for decrypting an encrypted content based on the hash value Hash that is bound to the DVD2a; and a Dec processing unit 280 which decrypts the encrypted content.

The content key decryption unit 220a has a device key storage unit 221, an Ex-OR unit 223 and a Dec processing unit 224.

The device key storage unit 221 stores a device key KD_A specific to the copyright protection module 210a (a secret key e.g., a key of AES 128 bits).

The Ex-OR unit 223 calculates an exclusive OR value between the device key KD_A stored in the device key storage unit 221 and the hash value Hash bound to the DVD2a (i.e., the device key KD_A is transformed using the hash value Hash).

The Dec processing unit 224 reads, among the ring of encrypted content keys bound to the DVD2a, an encrypted content key for its own use stored in a predetermined place, decrypts the read-out encrypted content key using the exclusive OR value between the device key KD_A and the hash value Hash, and generates a content key Kc.

The Dec processing unit 280 decrypts, using the content key Kc passed from the Dec processing unit 224, the encrypted content obtained from the DVD2*a* via the DVD drive 290, and obtains a content.

The following describes the operation of the content decryption processing performed by the content key decryption unit 220*a*.

In the content decryption processing, the content key used for encrypting the content by the content key decryption unit 220*a* is firstly decrypted. Namely, the Ex-OR unit 223 calculates the exclusive OR value between the device key KD_A of the copyright protection module 210*a* stored in the device key storage unit 221 and the CRL hash value Hash that is bound to the DVD2*a*. After the calculation of the exclusive OR value, the Dec processing unit 224 reads, from the ring of encrypted content keys bound to the DVD2*a*, the one for its own use, decrypts the read-out encrypted content key for its own use using the obtained exclusive OR value, obtains a content key Kc and then terminates the processing after passing the content key Kc to the authentication unit 237. After the content key decryption processing is terminated, the Dec processing unit 280 decrypts the encrypted content obtained from the DVD2*a* via the DVD drive 290 using the content key Kc passed from the Dec processing unit 224, and obtains a content. Thus, it is possible to decrypt a content while providing a copyright protection.

Thus, with the copyright protection system 1*a* according to the first embodiment, an encrypted digital work (i.e., a content), an encrypted content key Kc used for the encryption (i.e., an encrypted content key) and an attribute value (i.e., a hash value) of the CRL are bound to the DVD2*a* by the encryption apparatus 100*a*. The encrypted content key is encrypted by the second secret key (i.e., a device key KD_A) which is associated with the decryption apparatus 200*a*. This second secret key, however, is also the device key in which the CRL attribute value (i.e., a hash value) is involved. Therefore, the decryption apparatus 200*a*, having received the encrypted content, the encrypted content key and the attribute value of the CRL, cannot properly decrypt the encrypted content key into the original key using the device key thus transformed. This means that the decryption apparatus 200*a* cannot properly decrypt the encrypted digital work. Thus, a secure transmission of a digital work is realized. The digital work recorded onto the DVD2*a* is protected from unauthorized copy, and a sound development in the market of multimedia-related products can be expected. By using the attribute value (i.e., a hash value) that is bound to the DVD2*a*, high performance is achieved in the decryption of a content key since the time for calculating the attribute value is no longer required. Also, it is possible to reduce the price of the decryption apparatus 200*a* because of the omission of the attribute value calculation unit. A high performance is greatly achieved also in the decryption of a content by not using the CRL, despite that it is no longer possible to perform a mutual authentication, since the time taken for a mutual authentication is no longer required. The cost of the decryption apparatus is greatly reduced because of the omission of the encryption communication apparatus for forming a SAC.

Second Embodiment

Figure 5:
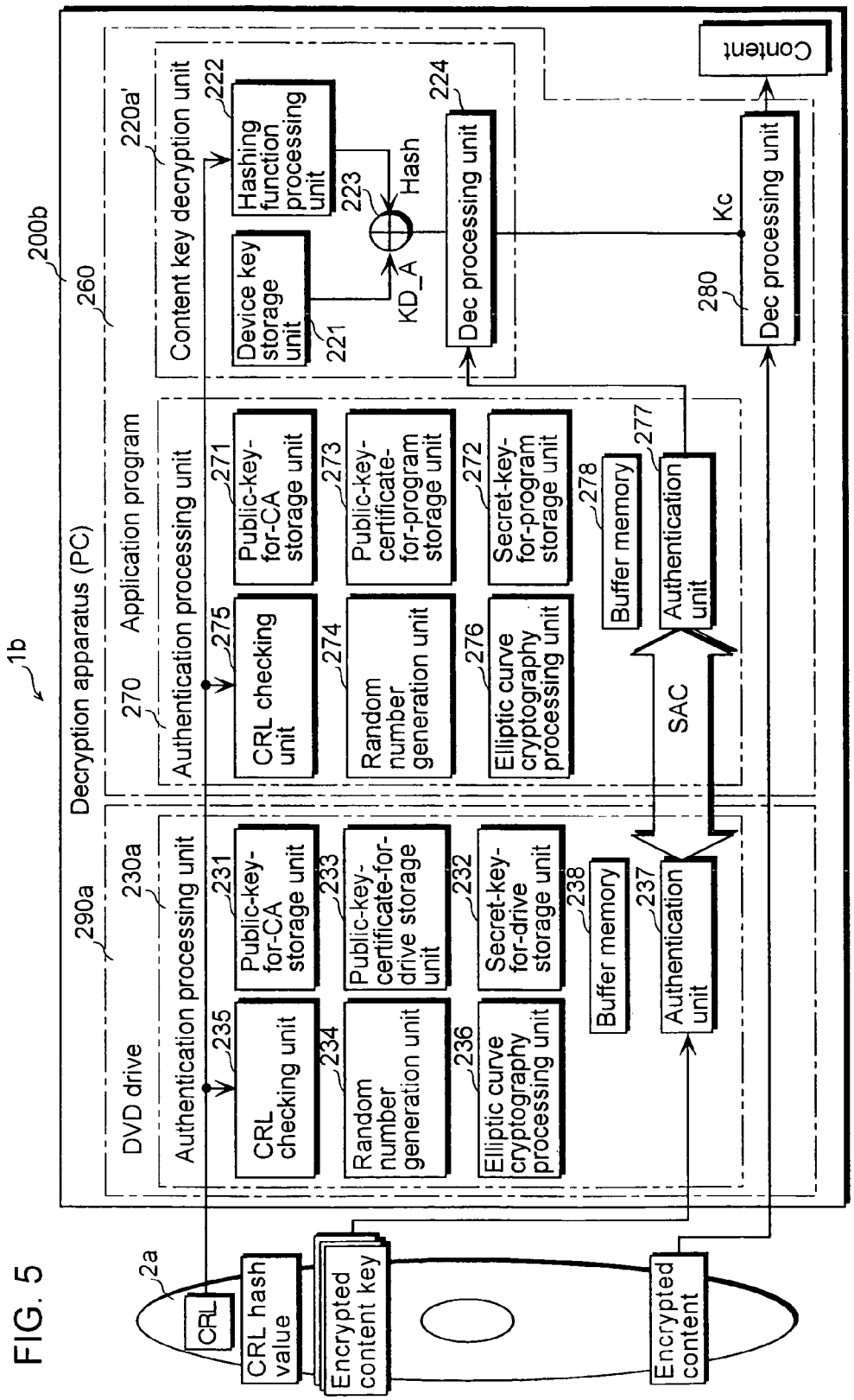
FIG. 5 is a functional block diagram showing a part of the configuration of the copyright protection system 1b according to a second embodiment.

FIG. 5 is a functional block indicating a part of the configuration of the copyright protection system according to the second embodiment. It should be noted that in the copyright protection system 1*b*, the same referential marks are put for the same parts corresponding to the copyright protection system 1*a* and the description will be omitted. The following description mainly focuses on the difference between the two systems.

The decryption apparatus 200*b* calculates a hash value with reference to the CRL that is bound to the DVD2*a*, and replays a content with a picture level HD (1125i/750p) using a personal computer (PC). Such decryption apparatus 200*b* includes a DVD drive 290*a* that reads the encrypted content from the DVD2*a* and an application program 260 that is installed in a hard disk or the like.

One of the media referred to as a DVD can be read by the personal computer (PC) and has a high compatibility with the PC. A content can be viewed if an HD-DVD is mounted on the PC, and at the same time, replay software is already installed in a hard disk or the like so as to use the PC as a decryption apparatus in the same way as is the case of HD-DVD. In this case, an illegal conduct may be performed by the DVD drive, and copyright protection is necessary as is the case of HD-DVD. In the first embodiment, the decryption apparatus 200*a* is composed of the content key decryption unit 220*a*, the Dec processing unit 280 and the DVD drive 290*a*. In the case of PC, however, a decryption apparatus, in general, is composed of a DVD drive and replay software, therefore, an illegal conduct can be easily performed. The decryption apparatus 200*b* according to the second embodiment is composed of the DVD drive 290*a* and an application program 260. An authentication processing unit 230*a* is set in the DVD drive 290*a* while the application program 260 is composed of an authentication processing unit 270, a content key decryption unit 220*a*' and the Dec processing unit 280.

The DVD drive 290*a* protects a copyright by removing an unauthorized application program 260 such as that listed in the CRL, and includes the authentication processing unit 230*a* for setting a SAC in a mutual authentication form between the application program 260 and itself while checking whether or not the application program 260 is not revoked based on the CRL. It should be noted that it is preferable to compose the authentication processing unit 230*a* by modules to be used for preventing a program in the computer from being changed intentionally.

The authentication processing unit 230*a* is composed of a public-key-for-certificate-authority storage unit 231, a secret-key-for-drive storage unit 232, a public-key-certificate-for drive storage unit 233, a random number generation unit 234, a CRL checking unit 235, an elliptical curve cryptography processing unit 236, an authentication unit 237 and a buffer memory 238.

The public-key-for-CA storage unit 231 stores beforehand a public-key-for-CA PK_CA used for decrypting a signature of the CA.

The secret-key-for-drive storage unit 232 stores in advance a secret-key-for-drive SK_A used by the authentication processing unit 230*a* for its own signature.

Figure 6:
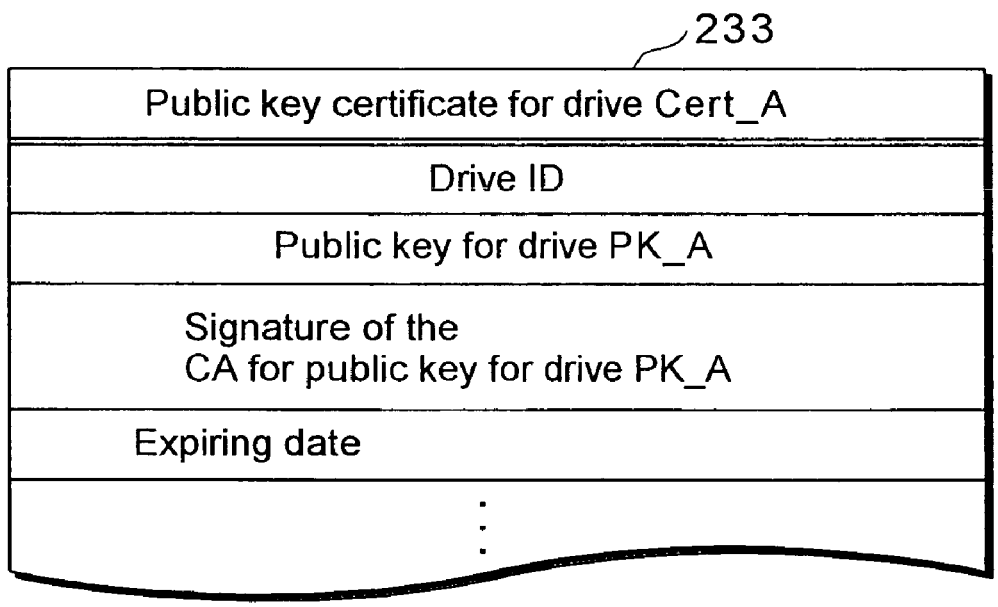
FIG. 6 shows an example of the composition of a public key certificate for drive.

The public-key-certificate-for-drive storage unit 233 stores beforehand a public-key-certificate-for-drive Cert_A that is a document certified by the CA indicating that the public key PK_A paired with the secret-key-for-drive SK_A belongs to the DVD drive 290*a*. As shown in FIG. 6, the public-key-certificate-for-drive Cert_A is made up of an ID of the DVD drive 290*a*, a public-key-for-drive PK_A for the secret-key-for-drive SK_A, a signature of the CA for the public-key-for-drive PK_A and an expiring date of the certificate.

The random generation unit 234 generates a random number (e.g., 128 bits) as a time-variant value.

The CRL checking unit 235 checks whether or not the CRL includes an ID of the application program 260.

The elliptical curve cryptography processing unit 236 executes encryption (e.g., 256 bits as a unit of processing) according to an ellipse curve when an authentication for setting a SAC is performed.

The authentication unit 237 is an interface for communicating with the application program 260 via a SAC.

The buffer memory 238 holds the random number generated by the random number generation unit 234 and temporary data generated by the elliptical curve cryptography processing unit 236.

The application program 260 mainly consists of: an authentication processing unit 270 for setting a SAC in a mutual authentication form between the copyright protection module 210a and itself while checking whether or not the copyright protection module 210a is revoked based on the CRL; a content key decryption unit 220a' for obtaining a key for decrypting an encrypted content based on the CRL that is bound to the DVD2a; and the Dec processing unit 280 that decrypts the encrypted content read out from the DVD2a, using the content key Kc passed from the content key decryption unit 220a'. Each of the units can be realized by an application program, a CPU of the PC, a memory, or the like.

The authentication processing unit 270 has almost the same structure as that of the authentication processing unit 230a, and is composed of a public key for CA storage unit 271, a secret-key-for-software memory (secret-key-for-program storage unit) 272, a public-key-certificate-for-software storage unit (public-key-certificate-for-program storage unit) 273, a random number generation unit 274, a CRL checking unit 275, an elliptical curve cryptography processing unit 276, an authentication unit 277, and a buffer memory 278.

The public-key-for-CA storage unit 272 stores beforehand a public-key-for-CA PK_CA.

The secret-key-certificate-for-software storage unit 272 stores beforehand a specific secret-key-for-software SK_i used by the application program 260 for its own signature.

Figure 7:
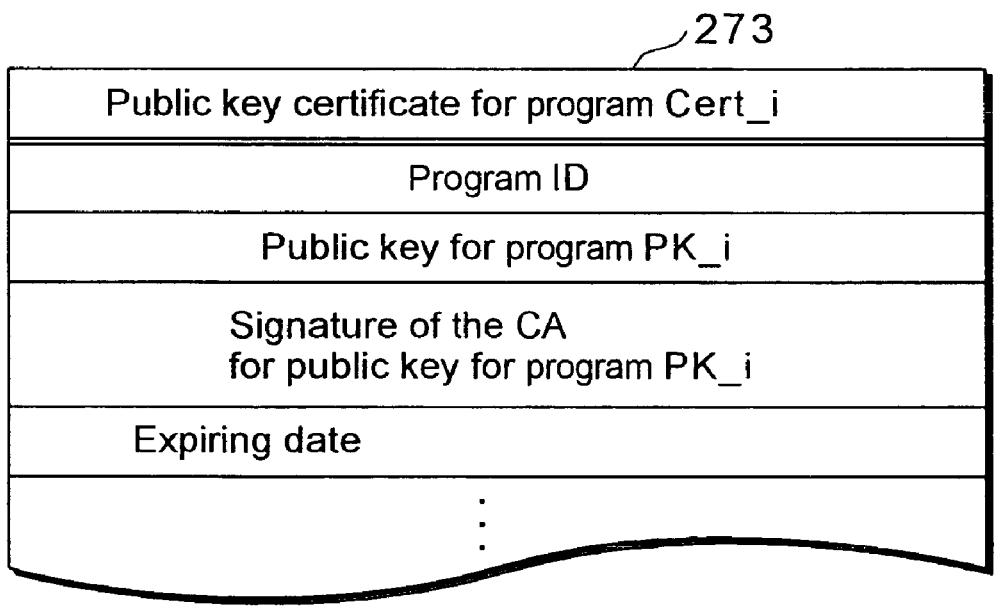
FIG. 7 shows an example of the composition of a public key certificate for software.

The public-key-certificate-for-software storage unit 273 stores beforehand a public-key-certificate-for-software Cert_i that is a document certified by the CA indicating that the public key PK_i paired with the secret-key-for-software SK_i belongs to the application program 260. As shown in FIG. 7, the public-key-certificate-for-software Cert_i is composed of an ID of the application program 260 (i.e. a serial number of the certificate), a public-key-for-software PK_i for the secret-key-for-software SK_i, a signature of the CA for the public-key-for-software PK_i and an expiring date of the certificate.

The random number generation unit 274 generates a random number (e.g. 128 bits) as a time-variant value.

The CRL checking unit 275 checks whether or not an ID of the DVD drive 290a is included in the CRL.

The elliptical curve cryptography processing unit 276 executes encryption (e.g. a processing unit of 256 bits) according to an ellipse curve at the time where an authentication is performed for SAC.

The authentication unit 277 is a communication interface for communicating with the copyright protection module 210a via a SAC.

The buffer memory 278 holds the random number generated by the random number generation unit 274 and temporary data generated by the elliptical curve cryptography processing unit 276.

The content key decryption unit 220a' is further composed of a hashing function processing unit 222 in addition to the components in the content key decryption unit 220a (i.e., the device key storage unit 221, the Ex-OR unit 223 and the Dec processing unit 224).

The hashing function processing unit 222 is structured as same as the hashing function processing unit 114 of the terminal device 110a, and calculates a hash value Hash (e.g., 128 bits) of the CRL that is bound to the DVD2a.

Figure 8:
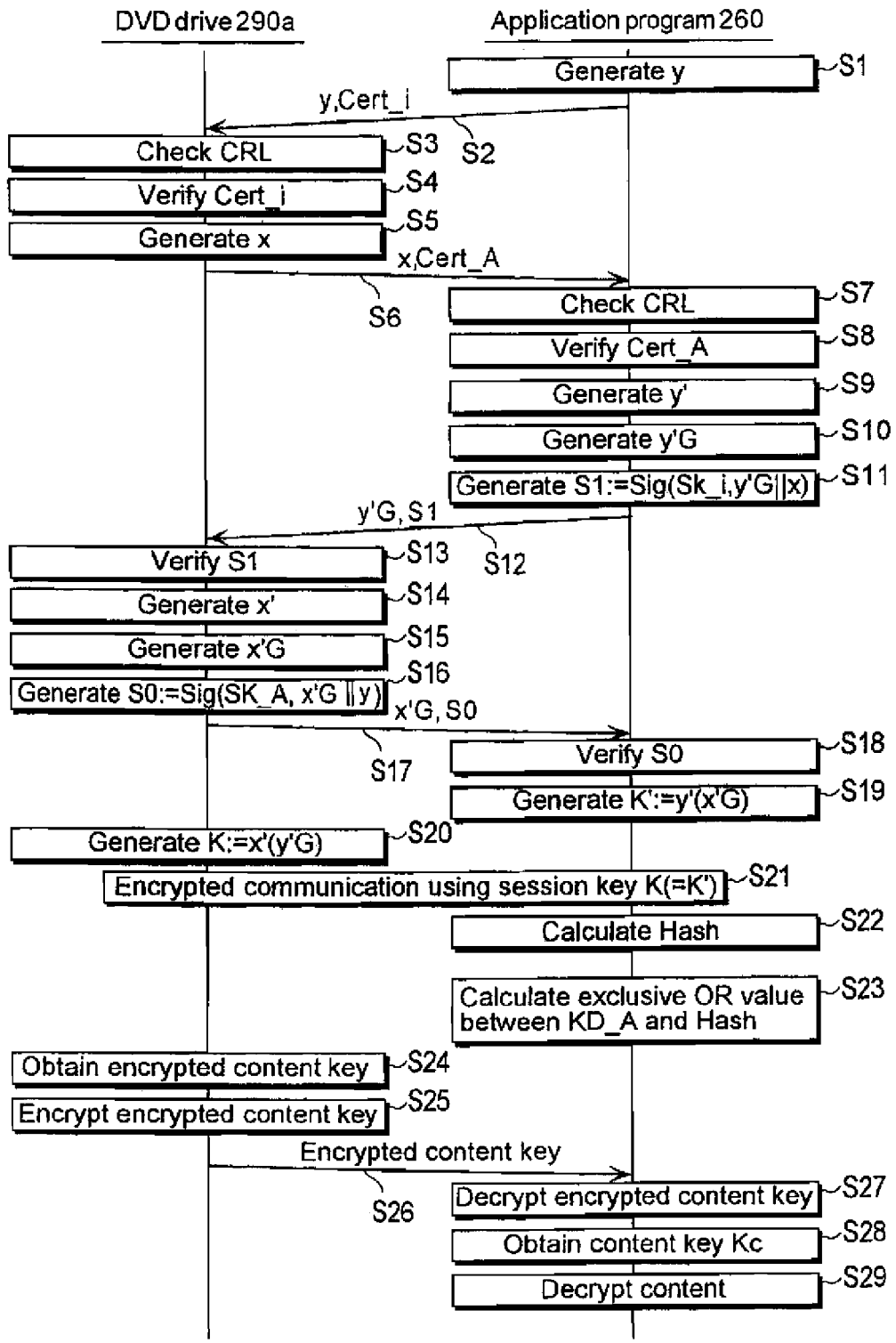
FIG. 8 is a diagram showing a sequence of processing performed between the DVD drive 290a in the decryption apparatus 200a and the application program 260.

The following describes, with reference to FIG. 8, the SAC setting between the DVD drive 290a and the application program 260 as well as a sequence of the decryption for the encrypted content recorded onto the DVD2a.

FIG. 8 is a communication sequence diagram performed by the DVD drive 290a and the application program 260.

When the user sends an instruction for a content replay to be executed by the DVD2a, the random number generation unit 274 in the application program 260 generates a first random number y (e.g., 128 bits) and stores it in the buffer memory 278 (S1). The authentication unit 277 in the application program 260 reads the first random number y stored in the buffer memory 278 and the public-key-certificate-for-software Cert_i stored in the public-key-certificate-for-software storage unit 273, and transmits them to the DVD drive 290a (S2).

The authentication unit 237 of the DVD drive 290a stores, in the buffer memory 238, the first random number y received from the application program 260 and the public-key-certificate-for-software Cert_i. The CRL checking unit 235 checks whether or not the application program 260 is revoked based on the CRL that is bound to the DVD2a (S3). To be more precise, it is judged by whether or not the ID of the application program 260 is listed in the CRL. In the case where the application program 260 is not revoked, the authentication unit 237 verifies the public key certificate Cert_i using the public-key-for-CA PK_CA (S4). That is to say that the authentication unit 270 decrypts the signature of the CA included in the public-key-certificate-for-software Cert_i using the public-key-for-CA PK_CA, and verifies whether or not the public-key-certificate-for-software Cert_i surely belongs to the application program 260. After the verification, the random number generation unit 234 generates a first random number x (e.g., 128 bits) and stores the generated first random number x in the buffer memory 238 (S5). The authentication 237 reads the first random number x stored in the buffer memory 238 and the public key certificate for drive Cert_A stored in the public key certificate storage unit 233, and transmits them to the application program 260 (S6).

After the application program 260 allows the authentication unit 277 to store the first random number x received from the DVD drive 290a and the public-key-certificate-for-drive Cert_A into the buffer memory 278, and then, the CRL checking unit 275 checks whether or not the DVD drive 290a is revoked based on the CRL passed from the DVD drive 290a (S7). More precisely, it is judged by whether or not the ID of the copyright protection module 210a is listed in the CRL. In the case where the DVD drive 290a is not revoked, the authentication unit 277 verifies the public key certificate for drive Cert_A using the public-key-for-CA PK_CA (S8). That is to say that the CRL checking unit 275 decrypts the signature of the CA included in the public-key-certificate-for-drive Cert_A using the public-key-for-CA PK_CA, and verifies whether or not the public-key-certificate-for-drive Cert_A belongs to the DVD drive 290a. After the verification, the random number generation unit 274 generates a second random number y' (e.g., 128 bits) and stores the second random number y' into the buffer memory 278 (S9). The elliptical curve cryptography processing unit 276 multiplies the second random number y' by a base point G (a constant) on the ellipse curve, generates a resultant y'G and stores it in the buffer memory 278 (S10). The authentication unit 277 then generates a signature for the resultant y'G, S1:=Sig (SK_i, y'G∥x), and stores the signature S1 into the buffer memory 278 (S11). The signature is performed by signing for the resultant y'G to which the first random number x is bit linked using the secret key SK_i. It should be noted that a sign "||" presents a bit linkage and indicates that the resultant y'G and the random number x are linked in digit-direction so as to make 256 bits (e.g., the resultant y'G makes up upper 128 bits, the random number x makes up lower 128 bits). After the storage of the signature S1, the authentication unit 277 transmits the resultant y'G and the signature S1 for the resultant y'G to the copyright protection module 210a (S12).

After storing, in the buffer memory 238, the resultant y'G and the signature SI for it, the authentication unit 237 in the copyright protection module 210a verifies that S1 is the signature of the application program 260 for the resultant y'G using the public-key-for-software PK_i obtained from the public-key-certificate-for-software Cert_i (S13). To be more concrete, the authentication unit 237 decrypts the signature S1 using the public-key-for-software PK_i, and verifies the signature SI by dividing the bit linkage between the resultant y'G and the random number x. In this way, it is verified that the application program 260 is not an interceptor.

After the verification, the random number generation unit 234 in the DVD drive 290a generates a second random number x' and stores it in the buffer memory 238 (S14). Then, the elliptical curve cryptography processing unit 236 multiplies the second random number x' by a base point G (a constant) on the ellipse curve, generates a resultant x'G and stores it in the buffer memory 238 (S15). Then, the authentication unit 237 generates a signature for the resultant x'G, S0:=Sig (SK_A, x'G||y) and stores the signature S0 in the buffer memory 238 (S16). The signature is performed by signing the resultant x'G to which the first random number y is bit linked using the secret key SK_A. After the memorization of the signature, the authentication unit 237 transmits the resultant x'G and the signature S0 to the application program 260 (S17).

After storing, into the buffer memory 278, the resultant x'G and the signature S0 received from the copyright protection module 210a, the authentication 277 in the application program 260 verifies, using the public key PK_A obtained from the public-key-certification-for-drive Cert_A that the signature S0 is a signature of the application program 260 for x'G||y (S18). That is to say that the authentication unit 277 decrypts the signature S1 using the public key for software PK_i, and verifies the signature by separating the bit linkage between y'G and the random number x. Thus, it is ascertained that the copyright protection module 210a is not an interceptor.

After verifying that the copyright protection module 210a is neither revoked nor is an interceptor, the authentication unit 277 in the application program 260 generates K'=x' (x'G) by multiplying a second random number y' (e.g., 128 bits) which is generated by itself and stored in the buffer memory 278, and the resultant x'G provided from the communication partner, and stores, in the buffer memory 278, a resultant K' as a session key (S19).

After verifying that the application program 260 is neither revoked nor is an interceptor, the authentication unit 237 in the copyright protection module 210a generates K:=x' (y'G) by multiplying a second random number x' which is generated by itself and stored in the buffer memory 238, and the resultant y'G provided from the communication partner, and stores, in the buffer memory 238, a resultant K as a session key (S20).

Thus, the copyright protection module 210a and the application program 260 can have the key K (=K') indicating the same value and perform encrypted communication using K (=K') as a session key (S21).

After the generation of the session key K (=K'), the content key decryption unit 220a' in the application program 260 executes the content key decryption processing. In the processing, the hashing function processing unit 222 firstly calculates a CRL hash value Hash passed from the DVD drive 290a at the time of authentication (S22). Then, the Ex-OR unit 223 calculates an exclusive OR value between the device key KD_A of the application program 260 stored in the device key storage unit 221 and the hash value Hash (S23).

It should be noted that in the case where the hashing function processing unit 222 calculates the CRL hash value Hash, the CRL can be transmitted in encrypted form from the DVD drive 290a to the application program 260 via the SAC so that the hash value Hash may be calculated based on the CRL obtained by the encrypted communication. Thus, the CRL can be surely prevented from being intercepted.

After the generation of the session key K, the DVD drive 290a obtains, from the DVD2a, the encrypted content key to be exclusively used for the content key decryption unit 220 (S24), and passes the obtained encrypted content key to the authentication unit 237 in the authentication processing unit 230a. The authentication unit 237, having received the encrypted content, doubly encrypts the encrypted content key using the session key K (S25), and transmits it to the application program 260 via the SAC (S26). Thus, interception of the encrypted content key can be surely prevented.

The authentication unit 277 in the application program 260 decrypts the encrypted content key received from the DVD drive 290a using the session key K' (S27), and passes the decrypted encrypted content key to the Dec processing unit 224. The Dec processing unit 224 decrypts the encrypted content key using the obtained exclusive OR value and obtains a content key Kc (S28), and terminates the content key decryption processing after passing the content key Kc to the Dec processing unit 280.

The Dec processing unit 280 decrypts the encrypted content obtained via the DVD drive 290a using the content key Kc passed from the Dec processing unit 224, and obtains a content (S29). Thus, it is possible to decrypt the content while providing copyright protection. It should be noted that in the case of decrypting the content encrypted by the Dec processing unit 280, the encrypted content may be transmitted in encrypted form from the DVD drive 290a to the application program 260 via the SAC so that the content is decrypted based on the encrypted content obtained from the encrypted communication. Thus, the encrypted content can be surely prevented from being intercepted.

Assuming here the case where the application program 260 replaces the CRL that is bound to the DVD2a by the CRL provided before its own public key becomes valid, it is possible to set the SAC and proceed to the stage of encrypted communication (S21) using the session key as is the case where the replacement of the CRL does not take place.

However, the decryption apparatus 200b of the second embodiment binds the CRL and a ring of encrypted content keys encrypted using the information that involves the CRL hash value Hash. Therefore, in the case where the replacement of the CRL takes place, the value of the replacing CRL and that of the CRL hash value Hash that is bound to the DVD2a do not match. As a result, an authorized content key Kc cannot be obtained although the decryption of the content key is attempted using the hash value Hash of the replacing CRL. In order to obtain the content key Kc for decrypting the content, the CRL that is bound to the DVD2a needs to be provided.

It is therefore possible to eliminate the unauthorized decryption apparatus 200a that replaces the CRL, and strengthen thereby the protection of copyright.

It should be noted, that in the second embodiment, the content key decryption unit 220a' is set in the application program 260, but it may be set in the DVD drive 290a. In this case, the content key Kc may be transmitted in encrypted form from the DVD drive 290a to the application program 260 via the SAC so that the content is decrypted based on the content key Kc obtained by the encrypted communication. Thus, the content key Kc is surely prevented from being intercepted.

The device key storage unit 221, the Ex-OR unit 223 and the Dec processing unit 224 in the content key decryption unit 220a' may be set in the DVD drive 290a while only the hashing function processing unit 222 is set in the application program 260. In this case, the DVD drive 290a may send the CRL to the application program 260 while the application program 260 sends, to the DVD drive 290a, the hash value calculated by the hashing function processing unit 222. Here, the CRL and the hash value may be transmitted in encrypted form via the SAC so that the hash value is calculated or the encrypted content key is decrypted based on the CRL and the hash value obtained through the encrypted communication. Thus, the CRL and the hash value are surely prevented from being intercepted. In this case, the Dec processing unit 280 may be set in the DVD drive 290a. That is to say that the device key storage unit 221, the Ex-OR unit 223 and the Dec processing unit 224 in the content key decryption unit 220a' may be set in the DVD drive 290a while only the hashing function processing unit 222 is set in the application program 260. In this case, the DVD drive 290a may send the CRL to the application program 260, the application program 260 may send the hash value calculated by the hashing function processing unit 222 to the DVD drive 290a, and the DVD drive 290a may send the decrypted content to the application program 260. Here, the CRL and the hash value may be transmitted in encrypted form via the SAC so that the hash value is calculated or the encrypted content key is decrypted based on the CRL and the hash value obtained through the encrypted communication. Furthermore, the decrypted content may be transmitted in encrypted form via the SAC so that it is passed in encrypted form to the application program 260. Thus, the CRL, the hash value and the content are surely prevented from being intercepted.

Moreover, in the above embodiment, a SAC is formed by bi-directional authentication, but it may be formed by unidirectional authentication.

Third Embodiment

Figure 9:
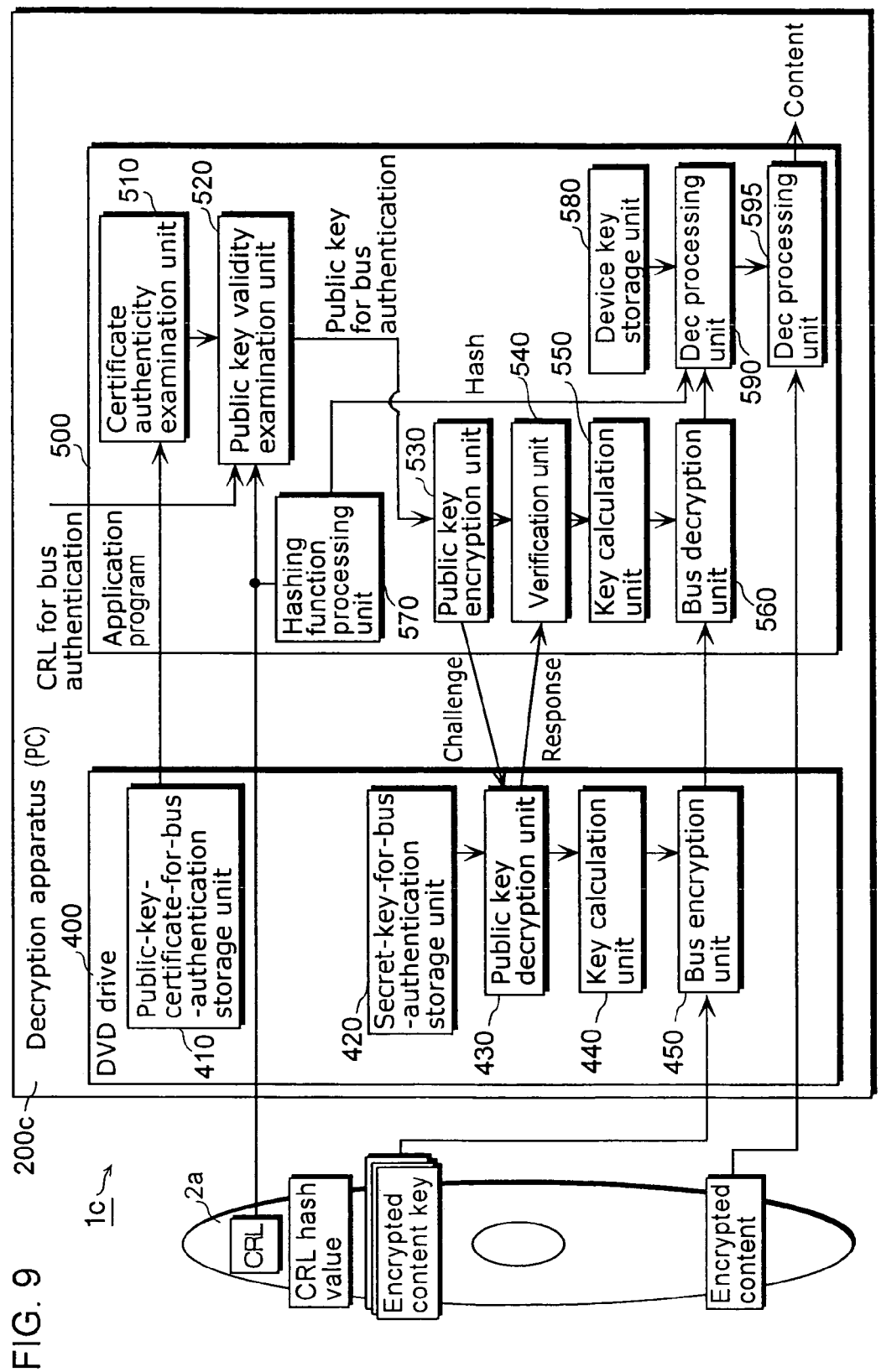
FIG. 9 is a functional block diagram showing a part of the configuration of the copyright protection system 1i according to a third embodiment.

FIG. 9 is a block diagram showing a part of the configuration of the copyright protection system 1c according to the third embodiment. It should be noted that, in the copyright protection system 1c, the same referential marks are put for the parts corresponding to those in the copyright protection system 1a according to the first embodiment, and the decryption is omitted. The difference between the two systems will be focused below.

The decryption apparatus 200c performs uni-directional authentication based on the CRL that is bound to the DVD2a, calculates the hash value based on the CRL, and replays a content using a PC. Such decryption apparatus 200c is comprised of a DVD drive 400 for reading an encrypted content from the DVD2a and an application program 500 installed in a hard disk or the like.

The DVD drive 400 is comprised of a public-key-certificate-for-bus-authentication storage unit 410, a secret-key-for-bus-authentication storage unit 420, a public key decryption unit 430, a key calculation unit 440 and a bus encryption unit 450.

The public-key-certificate-for-bus-authentication storage unit 410 in the DVD drive 400 stores beforehand a public-key-certificate-for-bus-authentication for a bus such as IDE bus and a SCSI bus, and passes a public-key-certificate-for-bus-authentication to the application program 500 when replaying a content in the DVD2a.

The secret-key-for-bus-authentication storage unit 420, the public key decryption unit 430, the key calculation unit 440 and the bus encryption unit 450 generate a session key K and form a SAC for the communication with the application program 500.

The application program 500 includes a certificate authenticity examination unit 510, a public key validity examination unit 520, a public key encryption unit 530, a verification unit 540, a key calculation unit 550, a bus decryption unit 560, a hashing function processing unit 570, a device key storage unit 580, and Dec processing units 590, 595. Each of the parts can be realized with software, a CPU of the PC, a memory, or the like.

The certificate authenticity examination unit 510 decrypts the certificate transmitted from the public-key-certificate-for-bus-authentication storage unit 410 using a public key, and examines whether the certificate is authorized or not.

When receiving, from the certificate authenticity examination unit 510, a notification indicating that the certificate is authorized, the public key validity examination unit 520 refers to the CRL-for-bus-authentication received via the DVD drive 400 and the latest CRL-for-bus-authentication read from a latest CRL storage unit (not shown in the diagram), and examines whether or not the DVD drive 400 is revoked.

The public key encryption unit 530, the verification unit 540, the key calculation unit 550 and the bus decryption unit 560, having received, from the public key validity examination unit 520, a notification indicating that the DVD drive 400 is not revoked, namely that the DVD drive 400 is authorized, generates a session key K' and forms a SAC for the communication with the DVD drive 400.

The public key encryption unit 530 calculates a CRL hash value Hash.

The public key encryption unit 580 stores beforehand a device key KD_A.

The Dec processing unit 590 generates a content key Kc based on the encrypted content key outputted from the bus decryption unit 560, the hash value Hash outputted from the hashing function processing unit 570 and the device key KD_A.

The Dec processing unit 590 decrypts the encrypted content that is bound to the DVD2a using the content key Kc and generates a content.

The following describes the authentication processing performed between the DVD drive 400 and the application program 500.

When receiving a notification indicating that the DVD drive 400 is authorized, the public key encryption unit 530 generates a random number cha, encrypts the generated random number cha using the partner's public-key-for-bus-authentication, and transmits the encrypted random number cha to the public key decryption unit 430 in the DVD drive 400.

The public key decryption unit 430 decrypts the encrypted random number cha using the secret-key-for-bus-authentication stored in the secret-key-for-bus-authentication storage unit 420 so as to obtain a random number cha. The public key decryption unit 430 then encrypts the random number cha and its own secret key using the partner's public-key-for-bus-authentication, and transmits the result of the encryption to the verification unit 540 as well as provides the random number cha and the secret key to the key calculation unit 440. The key calculation unit 440 calculates the session key K based on the random number cha and the secret key, and passes the session key K to the bus encryption unit 450.

The bus encryption unit 450 encrypts a ring of encrypted content keys using the session key K and transmits the ring of doubly encrypted content keys to the application program 500.

The verification unit 540 in the application program 500 confirms whether or not the random number cha obtained by decryption matches to the original random number cha using its own secret key. In the case where they match, the verification unit 540 passes the random number cha and the partner's secret key to the key calculation unit 550. The key calculation unit 550 calculates the session key K' using the random number cha and the partner's secret key and gives it to the decryption unit 560. The bus decryption unit 560 decrypts the ring of doubly encrypted content keys using the session key K', generates a ring of encrypted content keys, and outputs the ring of encrypted content keys to the Dec processing unit 590.

The hashing function processing unit 570 calculates a CRL hash value Hash outputted via the DVD drive 400, and outputs the hash value Hash to the Dec processing unit 590. The Dec processing unit 590 decrypts the content key Kc into a value encrypted using the device key KD_A, for example, by calculating the exclusive OR value between the ring of encrypted content keys and the hash value Hash, decrypts the content key Kc by further decrypting it using the device key KD_A, and passes the content key Kc to the Dec processing unit 595. The Dec processing unit 595 decrypts the encrypted content that is bound to the DVD2a using the content key Kc, and replays the content.

Accordingly, even the decryption apparatus 200c in the copyright protection system 1c according to the third embodiment, namely, the PC composed of the DVD drive 400 and the application program 500, is required to pass the CRL that is bound to the DVD2a in order to obtain a key for decrypting a content, as is the case of the HD-DVD. It is therefore possible to eliminate the unauthorized DVD drive 400 such that replaces the CRL, and copyright protection can be provided.

It should be noted that in the case where the decryption apparatus 200c, namely, the PC, is connected to the Internet, the terminal device 300 may be accessed at the time of replaying the DVD2a so that the latest CRL is downloaded from the terminal device 300 and the public key validity examination unit 520 examines whether or not the DVD drive 400 is revoked.

The decryption apparatus 200c according to the third embodiment is composed of the DVD drive 400 and the application program 500, but a case in which a DVD replay software actually has only a so-called "descramble" function, and is used by connecting to a copyright protection module 210a may be assumed as well. That is to say that the copyright protection module 210a can be mounted on the PC and the decryption apparatus 200c composed of the PC may be comprised of the DVD drive 400, the copyright protection module 210a and the DVD replay PC software being the Dec processing unit 595.

In this case, a SAC is formed by the DVD drive 400 and the copyright protection module 210a. After the formation of SAC performed by the copyright protection module 210a the DVD replay PC software in the Dec processing unit 595, the encrypted content read from the DVD drive 400 may be decrypted using a content key so that the content is replayed.

In the third embodiment, the authentication is performed in the following order of challenge (encryption), response (decryption), and confirmation (verification of a decrypted text), however, it may be performed using a general order of challenge (plaintext), response (signature generation) and confirmation (signature confirmation), instead.

Fourth Embodiment

Figure 10:
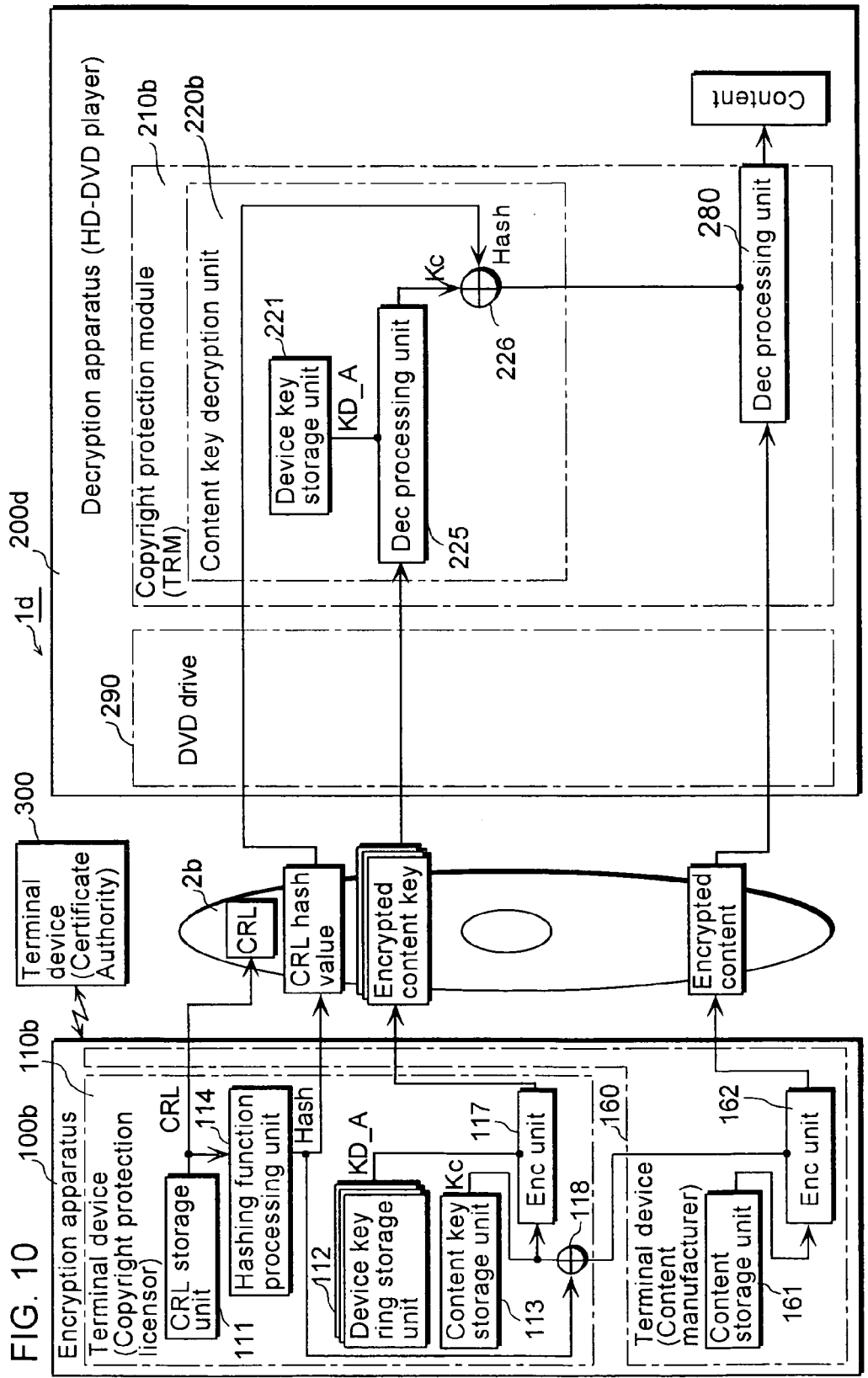
FIG. 10 is a functional block diagram showing the overall configuration of the copyright protection system 1b according to a fourth embodiment.

FIG. 10 is a functional block diagram showing the overall configuration of the copyright protection system 1d according to the fourth embodiment. It should be noted that in the copyright protection system 1d, the same numerals are put for the components corresponding to those in the copyright protection system 1a according to the first embodiment so that the description is omitted and the difference between the two systems will be focused.

In the copyright protection system 1d, the terminal device 110b in the encryption apparatus 100b further includes an Enc unit 117 and an Ex-OR unit 118 in addition to the CRL storage unit 111, the device key ring storage unit 112, the content key storage unit 113, and the hashing function processing unit 114. The copyright protection module 210b in the decryption apparatus 200d further includes a Dec processing unit 225 and an Ex-OR unit 226 in addition to the device key storage unit 221.

Here, in the terminal device 110a in the encryption apparatus 100a according to the first embodiment, the Ex-OR unit 115 calculates an exclusive OR value between the CRL hash value Hash outputted from the hashing function processing unit 114 and each device key, while the Enc unit 116 encrypts the content key Kc using the obtained exclusive OR value so as to generate a ring of encrypted content keys.

In contrast, in the terminal device 110b in the encryption apparatus 100b according to the fourth embodiment, the Enc unit 117 encrypts the content key Kc using only each device key stored in the device key ring storage unit 112 so as to generate an encrypted ring of content keys that are encrypted using only each device key.

The terminal device 110a in the encryption apparatus 100a according to the first embodiment passes the content key Kc directly to the terminal device 160. Therefore, in the terminal device 160, the Enc unit 162 encrypts a content using the content key Kc so as to generate an encrypted content.

In contrast, in the terminal device 110b in the encryption apparatus 100b according to the fourth embodiment, the Ex-OR unit 118 calculates an exclusive OR value between the CRL hash value Hash outputted from the hashing function processing unit 114 and the content key Kc and passes the obtained exclusive OR value to the terminal device 160. This is why the terminal device 160 having received the exclusive OR value encrypts the content using the exclusive OR value and generates an encrypted content.

Therefore, it is the encrypted content, but not each encrypted content key bound to a DVD2b, that involves the hash value, which is the reversed case of the case of DVD2a.

In the content key decryption unit 220a in the decryption apparatus 200a according to the first embodiment, the Ex-OR unit 223 calculates the exclusive OR value between its own device key KD_A stored in the device key storage unit 221 and the CRL hash value Hash while the Dec processing unit 224 decrypts the encrypted content key to which the hash value is related using the obtained exclusive OR value and obtains a content key Kc.

In contrast, in the content key decryption unit 220b in the decryption apparatus 200d according to the fourth embodiment, the hash value Hash is not involved in the encrypted content key that is bound to the DVD2b. The Dec processing unit 225 therefore decrypts the encrypted content key using only its own device key stored in the device key storage unit 221 so as to obtain the content key Kc. Since the hash value Hash is involved in the encrypted content that is bound to the DVD2b, the Ex-OR unit 226 calculates the exclusive OR value between the content key Kc obtained by the Dec processing unit 225 and the CRL hash value Hash that is bound to the DVD2b, and passes the obtained exclusive OR value to the authentication unit 237 in the authentication processing unit 230a.

The exclusive OR value between the content key Kc and the hash value Hash is passed to the Dec processing unit 280. The Dec processing unit 280 therefore decrypts, using the exclusive OR value between the content key Kc and the hash value Hash, the encrypted content which is stored in the DVD2b and in which the hash value Hash is involved, and obtains a content.

Therefore, also in the copyright protection system 1d according to the fourth embodiment, the encryption apparatus 100b outputs the encrypted digital work, an encrypted first secret key (i.e., a content key) used for the encryption of the digital work (i.e., an encrypted content key) and a CRL hash value. The encrypted digital work, however, is encrypted using not a simple first secret key, but a transformed first secret key in which the CRL hash value Hash is involved. Therefore, the decryption apparatus 200b, having received the encrypted digital work, the encrypted first secret key and the attribute value of the CRL, cannot properly decrypt the encrypted digital work using the first secret key thus transformed since it does not use the CRL even in the case where the CRL is replaced. Therefore, it is possible to securely transfer a digital work. Furthermore, by using an attribute value, high performance is achieved in the decryption of the first secret key because the time for calculating an attribute value is no longer required, and the price of the decryption apparatus can be reduced because of the omission of the attribute value calculation unit. In other words, the copyright protection system that enables higher cost performance and a secure transmission of a digital work can be realized.

Fifth Embodiment

Figure 11:
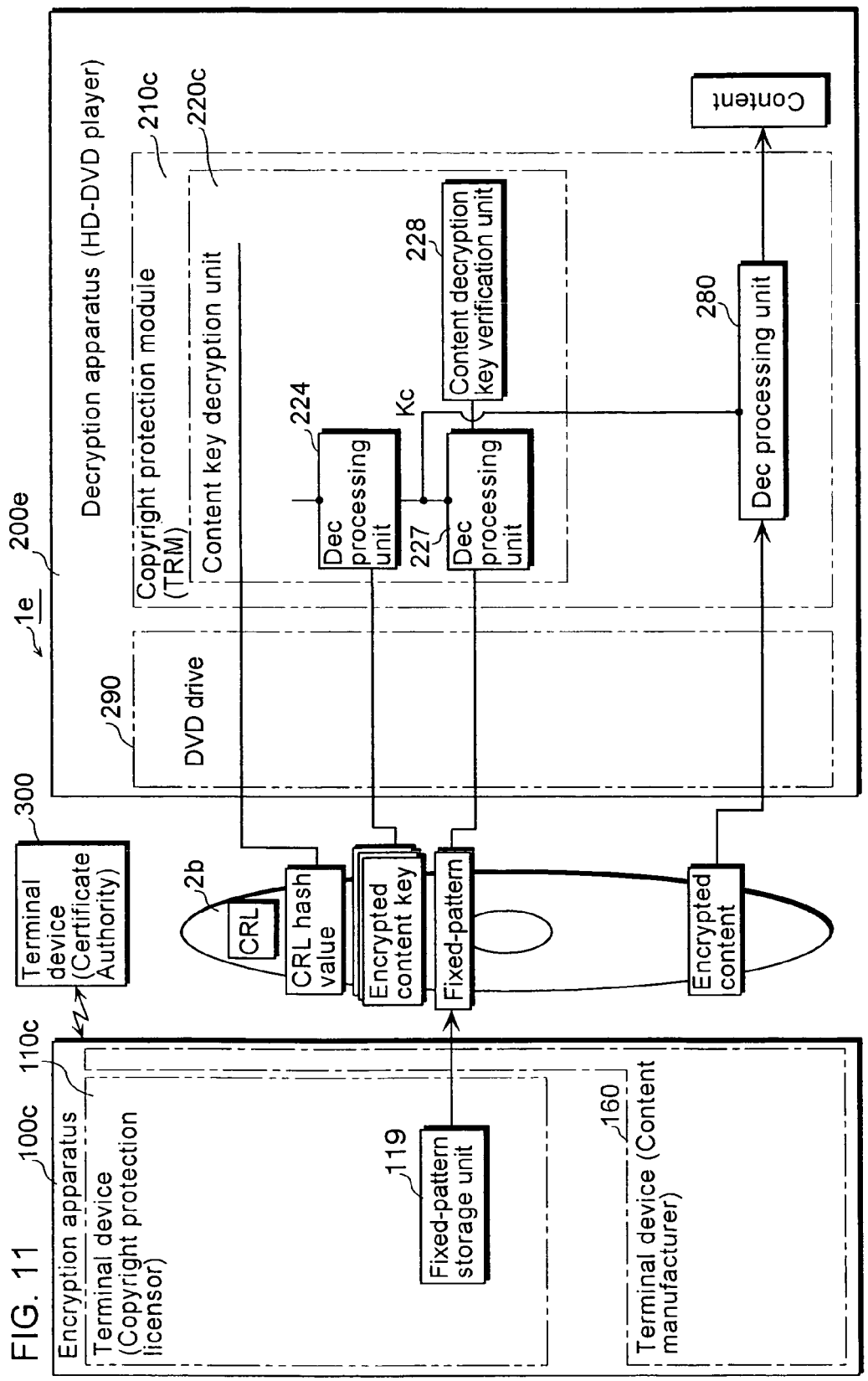
FIG. 11 is a functional block diagram showing the overall configuration of the copyright protection system 1c according to a fifth embodiment.

FIG. 11 is a functional block diagram showing the overall configuration of the copyright protection system 1e according to the fifth embodiment. It should be noted that in the diagram, the functions corresponding to those of the copyright protection system 1a according to the first embodiment are omitted while the functions specific to the copyright protection system 1e are shown.

In the encryption apparatus 100c in the copyright protection system 1e, the terminal device 110c further includes a fixed-pattern storage unit 119. In the copyright protection module 210c in the decryption apparatus 200e, the content key decryption unit 220c further includes a Dec processing unit 227 and a content decryption key verification unit 228 in addition to the content key decryption unit 220c and the Dec processing unit 224.

Here, the content key decryption unit 220a in the decryption apparatus 200a according to the first embodiment simply passes the obtained content key Kc to the Dec processing unit 280, and does not know whether the obtained content key Kc is an authorized key for properly decrypting an encrypted content. It is therefore desirable that the content key decryption unit 220a checks whether or not the content key Kc indicates a correct value before passing it to the Dec processing unit 280.

The copyright protection system 1e according to the fifth embodiment is a system having the verification function as described above, and the terminal device 110c used by the copyright protection licensor in the encryption apparatus 100c further includes a fixed-pattern storage unit 119 in addition to the components in the terminal device 110a. The fixed pattern storage unit 119 stores beforehand a fixed pattern obtained by encrypting, using the content key Kc, a predetermined fixed-pattern plaintext (e.g., a fixed-pattern plaintext presented in hex "0123456789ABCDEF"). The fixed-pattern stored in the fixed-pattern storage unit 119 is bound to a DVD2c via the terminal device 160.

The content key decryption unit 220c set in the copyright protection module 210c in the decryption apparatus 200e further includes a Dec processing unit 227 and a content decryption key verification unit 228 in addition to the components in the content key decryption unit 220a. The Dec processing unit 227 decrypts, using the decrypted content key Kc decrypted by the Dec processing unit 224, the encrypted data of the fixed-pattern plaintext that is bound to the DVD2a.

The content decryption key verification unit 228 holds in advance the fixed-pattern plaintext "0123456789ABCDEF" and verifies whether the decrypted content key Kc indicates a correct value by checking whether or not the pre-held fixed pattern plaintext and the fixed-pattern plaintext decrypted by the Dec processing unit 227 are the same.

According to the copyright protection system configured as above, it is possible for the content key decryption unit 220c to check whether or not the content key Kc indicates a correct value, and to prevent beforehand the unnecessary processing performed by the Dec processing unit 280 for decrypting a content using a wrong content key Kc.

It should be noted that the copyright protection system 1e according to the fifth embodiment applies the key verification function to the copyright protection system 1a according to the first embodiment, but such function may be applied to the copyright protection system 1d according to the fourth embodiment.

In this case, the content is encrypted using the exclusive OR value between the content key Kc and the CRL hash value Hash, therefore, the fixed-pattern obtained by encrypting the fixed-pattern plaintext "01234567879ABCDEF" using the exclusive OR value between the content key Kc and the hash value Hash may be stored beforehand so that this fixed-pattern is recorded onto the DVD2c.

The Dec processing unit 227 in the content key decryption unit 220c may only perform the output from the Dec processing unit 224, that is, the output from the Ex-OR unit 226 (see reference to FIG. 10) in stead of the output of the content key Kc. That is, the Dec processing unit 227 may only decrypt the encrypted data of the fixed-pattern plaintext that is bound to the DVD2a, using the exclusive OR value between the content key Kc and the hash value Hash. Thus, the content decryption key verification unit 228 can verify whether the exclusive OR value between the decrypted content key, namely, the content key Kc, and the hash value Hash indicates a correct value, by checking whether or not the fixed-pattern plaintext "0123456789ABCDEF" that is already held by the content decryption key checking unit 228 and the fixed-pattern plaintext decrypted by the Dec processing unit 227 are the same.

Sixth Embodiment

Figure 12:
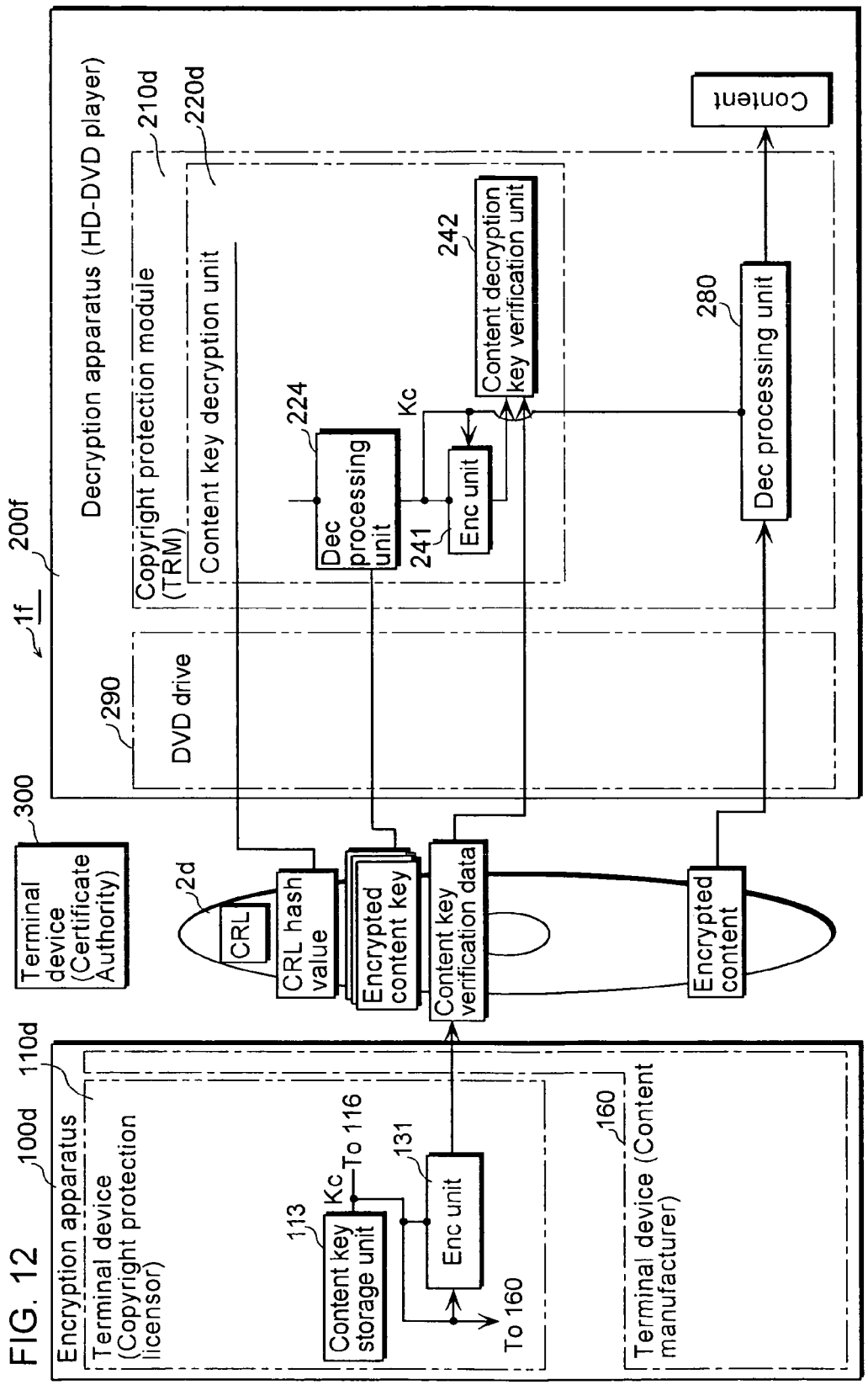
FIG. 12 is a functional block diagram showing the overall configuration of the copyright protection system 1d according to a sixth embodiment.

FIG. 12 is a functional block diagram showing the overall configuration of the copyright system 1f according to the sixth embodiment. It should be noted that, in the diagram, the functions corresponding to those of the copyright protection system 1a according to the first embodiment are omitted while the functions specific to the copyright protection system if are shown.

The copyright protection system if according to the sixth embodiment is a system having the key verification function as is the case of the copyright protection system 1e. The terminal device 110d in the encryption apparatus 100d further includes an Enc unit 131 in addition to the components in the terminal device 110a. The Enc unit 131 generates content key verification data by encrypting, using the content key Kc, the content key Kc read from the content key storage unit 113. The content key verification data is bound to a DVD2d.

The content key decryption unit 220d set in the copyright protection module 210d in the decryption apparatus 200f further includes an Enc unit 241 and a content key verification unit 242 in addition to the components in the content key decryption unit 220a. The Enc unit 241 has the same structure as that of the Enc unit 131 in the terminal device 110d, encrypts, using the content key Kc, the content key Kc decrypted by the Dec processing unit 224, and generates content key verification data. The content key verification unit 242 compares the content key verification data generated by the Enc unit 241 and the content key verification data bound to the DVD2d. The content key verification unit 242 thus verifies whether or not the content key Kc decrypted by the Dec processing unit 224 is a correct key, that is, a key that can decrypt an encrypted content, by checking whether or not both of the data indicate the same value.

With the copyright protection system 1f configured as above, as is the case of the copyright protection system 1e, it is possible for the content key decryption unit 220d to check beforehand whether or not the content key Kc indicates a correct value. Thus, it is possible to avoid the unnecessary processing performed by the Dec processing unit 280 for decrypting a content using a wrong content key Kc.

It should be noted that in the copyright protection system if according to the sixth embodiment, the key verification function is applied to the copyright protection system 1a according to the first embodiment, but it may be applied to the copyright protection system 1d according to the fourth embodiment.

In this case, since the content is encrypted using the exclusive OR value between the content key Kc and the CRL hash value Hash, the Enc unit 131 may encrypt the output from the content key storage unit 118, that is, the exclusive OR value between the content key Kc and the hash value Hash using this exclusive OR value, in stead of the output from the content key storage unit 113, namely, the content key Kc, and record the content key verification data onto the DVD2d.

The Enc unit 241 in the content key decryption unit 220d may encrypt the output from the Ex-OR unit 226 (see reference to FIG. 10), that is, the exclusive OR value between the content key Kc and the hash value Hash using the exclusive OR value, instead of the output from the Dec processing unit 224, namely, the content key Kc. The content key verification unit 242, then, can compare the content key verification data generated by the Enc unit 241 and the content key verification data bound to the DVD2d, and verify whether or not the key generated by the Ex-OR unit 226 is a correct key, namely, a key that can decrypt an encrypted content, by checking whether or not these keys indicate the same value.

Seventh Embodiment

Figure 13:
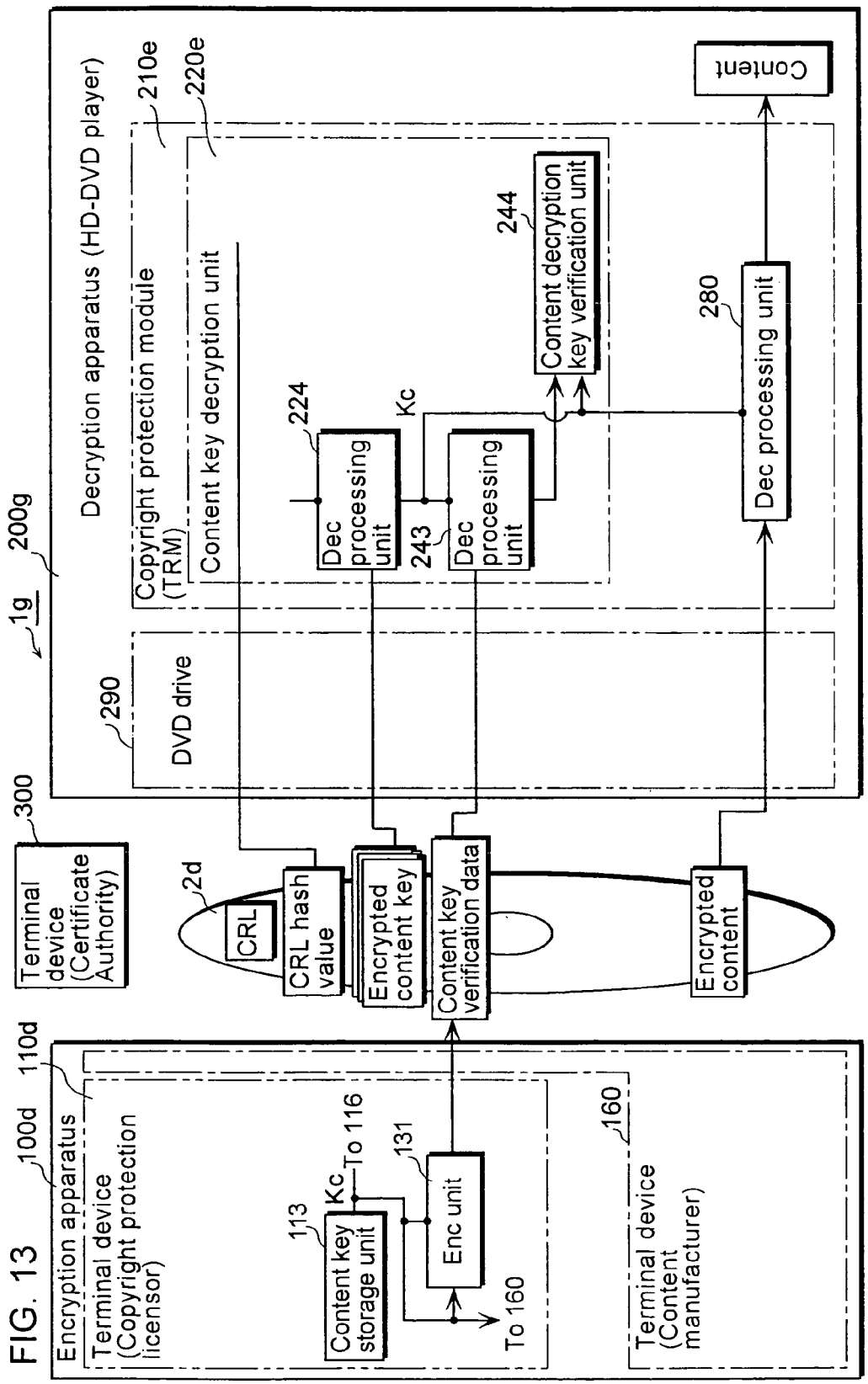
FIG. 13 is a functional block diagram showing the overall configuration of the copyright protection system 1e according to a seventh embodiment.

FIG. 13 is a functional block diagram showing the overall configuration of the copyright protection system 1g according to the seventh embodiment. It should be noted that, in the diagram, the functions corresponding to those of the copyright protection system 1a according to the first embodiment are omitted while the functions specific to the copyright protection system 1g are shown.

The copyright protection system 1g according to the seventh embodiment is a system having the key verification function as is the case of the copyright protection systems 1e and 1f. The encryption apparatus 100d has the same structure as the one described in the sixth embodiment and the content key verification data generated by the Enc unit 131 is bound to the DVD2d.

The content key decryption unit 220e set in the copyright protection module 210e in the decryption apparatus 200g further includes a Dec processing unit 243 and a content decryption key verification unit 244 in addition to the components in the content key decryption unit 220a.

The Dec processing unit 243 decrypts the content key verification data which is encrypted by the Enc unit 131 using the content key Kc decrypted by the Dec processing unit 224 and is bound to the DVD2d. The content decryption key verification unit 244 compares the content key Kc decrypted by the Dec processing unit 224 and the content key Kc decrypted by the Dec processing unit 243, and examines whether the content key Kc decrypted by the Dec processing unit 224 is a correct key, that is, a key that can decrypt the encrypted content, by checking whether or not these keys indicate the same value.

According to the copyright protection system 1g thus configured, it is possible for the content key decryption unit 220e to check beforehand whether or not the content key Kc indicates a correct value, as is the case of the copyright protection systems 1e and 1f intended for media. Thus, it is possible to avoid the unnecessary processing in the Dec processing unit 280 of decrypting a content using a wrong content key Kc.

In the copyright protection system 1g according to the seventh embodiment, the key verification function is applied to the copyright protection system 1a, but it may be applied to the copyright protection system 1d according to the fourth embodiment.

In this case, the content is encrypted using the exclusive OR value between the content key kc and the CRL hash value Hash, as is the case of the variation described in the sixth embodiment, the Enc unit 131 may encrypt the output from the Ex-OR unit 118, that is, the exclusive OR value between the content key Kc and the hash value Hash, using the exclusive OR value, in stead of the output from the content key storage unit 113, namely, the content key Kc, and record the content key verification data generated by the encryption onto the DVD2d.

The Dec processing unit 243 in the content key decryption unit 220e decrypts the content key decryption data read from the DVD2d using the output from the Ex-OR unit 226 (see reference to FIG. 10), that is, the exclusive OR value between the content key Kc and the hash value Hash, instead of the output from the Dec processing unit 224, that is, the content key Kc. Then, the content decryption key verification unit 244 compares, the exclusive OR value between the key for decrypting the content decrypted by the Ex-OR unit 226, namely, the exclusive OR value between the content key Kc and the hash value Hash, and the key decrypted by the Dec processing unit 243. The content decryption key verification unit 244 thus examines whether or not the key decrypted by the Ex-OR unit 226 is a correct key, namely, a key that can decrypt the encrypted content, by checking whether or not these keys indicate the same value.

Eighth Embodiment

Figure 14:
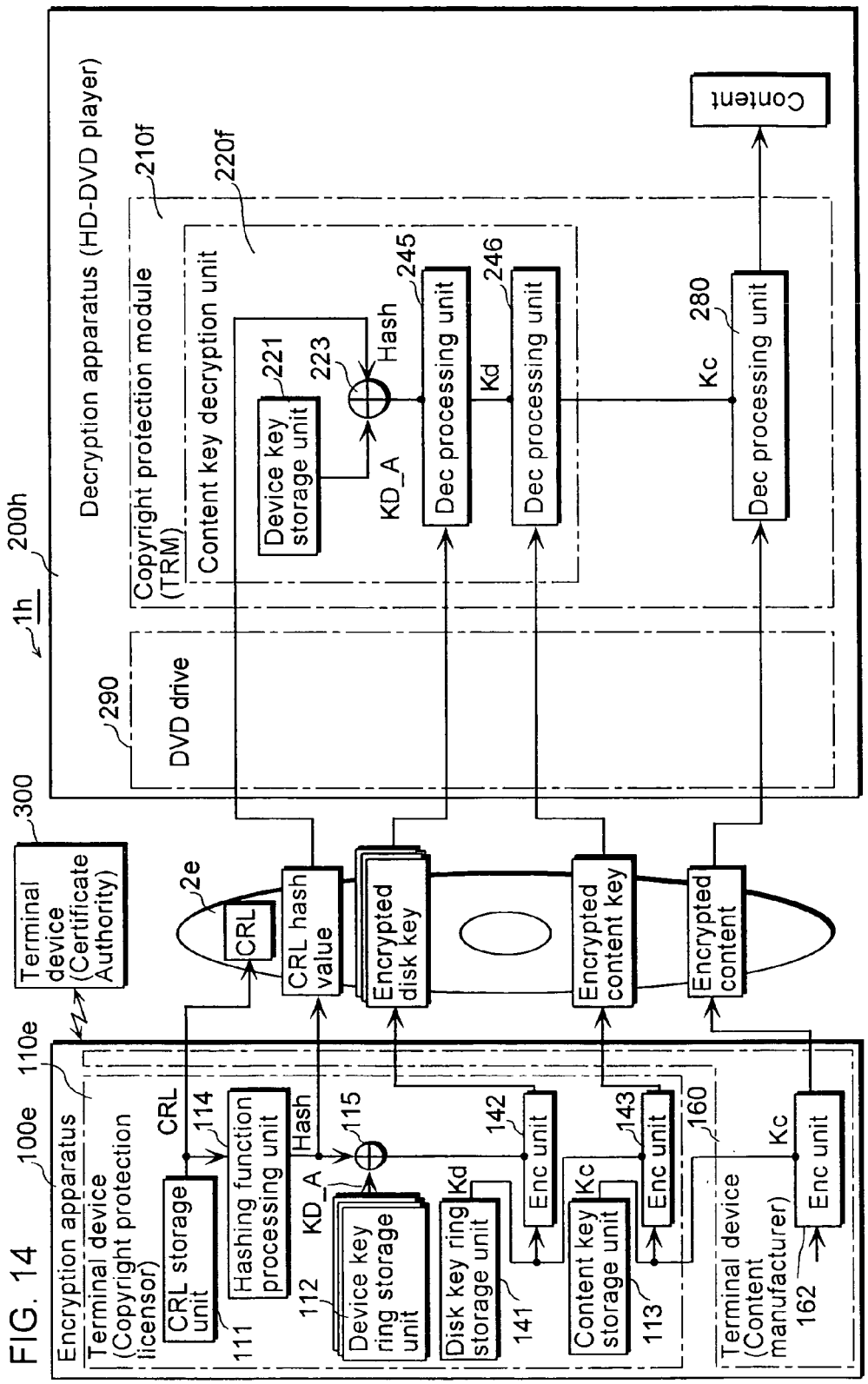
FIG. 14 is a functional block diagram showing the overall configuration of the copyright protection system 1g according to an eighth embodiment.

FIG. 14 is a functional block diagram showing the overall configuration of the copyright protection system 1h according to the eighth embodiment. It should be noted that, in the copyright protection system 1h, the same numbers are put for the parts corresponding to those included in the copyright protection system 1a. The description is therefore omitted, and the difference between the two systems will be focused.

The terminal device 110e in the encryption apparatus 100e further includes a disk key storage unit 141 and Enc units 142, 143, in addition to the CRL storage unit 111, the device key ring storage unit 112, the content key storage unit 113 and the hashing function processing unit 114. In the copyright protection module 210f in the decryption apparatus 200h, the content key decryption unit 220f further includes Dec processing units 245 246, in addition to the device key storage unit 221 and the Ex-OR unit 223.

The encryption apparatus 100a according to the first embodiment stores respectively two keys, a device key ring KD_A in the device key ring storage unit 112, and a content key Kc in the content key storage unit 113, encrypts the content key Kc using the device key KD_A in which the hash value of the CRL is involved, generates a ring of encrypted content keys, encrypts a content using the content key Kc, and generates an encrypted content key. Namely, a secret key is doubly encrypted using the device key KD_A and the content key Kc. Owing to the double encryption performed to the secret key, encryption level is normally high enough against attacks.

However, some licensors demand further improvement in encryption level.

The terminal device 110e in the encryption apparatus 100e according to the eighth embodiment employs the structure in which the secret key is triply encrypted using the device key KD_A, the content key Kc and a disk key Kd so as to achieve higher encryption level.

The disk key storage unit 141 stores beforehand a disk key Kd. It should be noted that the disk key Kd is a secret key that is placed in a position upper than the content key assigned to each content, considering that a single DVD can store plural (approximately seven) contents.

The Enc unit 142 encrypts the disk key Kd stored in the disk key storage unit 141 using the exclusive OR value between the hash value Hash and each device key KD_A, and generates a ring of encrypted disk keys.

The Enc unit 143 encrypts the content key Kc stored in the content key storage unit 113 using the disk key Kd, and generates an encrypted content key.

The terminal device 160 therefore allows the encrypted content, the CRL, the CRL hash value, the ring of encrypted disk keys generated by the Enc units 142, 143, and the encrypted content key to be bound to a DVD2e.

According to this, the content key decryption unit 220f in the copyright protection module 210f of the decryption apparatus 200h stores only the device key KD_A, decrypts the disk key Kd by decrypting the ring of encrypted disk keys bound to the DVD2e, using the device key KD_A and the hash value of the CRL, and further decrypts the content key Kc by decrypting, using the disk key Kd, the encrypted content key bound to the DVD2e.

The Dec processing unit 245 decrypts the disk key Kd by decrypting the ring of encrypted disk keys passed from the DVD drive 290, using the device key KD_A and the hash value of the CRL.

The Dec processing unit 246 decrypts the content key Kc by decrypting, using the disk key Kd, the encrypted content key passed from the DVD drive 290.

Therefore, it is also possible with the copyright protection system 1h according to the eighth embodiment, as is the case of the first embodiment, not only to achieve the higher cost performance and a secure transmission of a digital work, but also strengthen copyright protection because encryption level against attacks increases owing to the triple encryption performed for the secret key.

It should be noted that, in the eighth embodiment, the secret key is triply encrypted, but it may be encrypted further. In this case, it is possible to further increase the encryption level against attacks.

The terminal device 110e may further include verification data output unit for outputting, to the DVD2e, verification data that serves as a criterion for checking whether or not the content key decrypted by the decryption apparatus 200h is correct. The verification data output unit may output, to the DVD2e, the data obtained by encrypting the data of a predetermined fixed-pattern using the content key stored in the content key storage unit 113, as verification data. In accordance with the terminal device 110e, the content key decryption unit 220f may include a content decryption key checking unit 228, a content key verification unit 242, a content decryption key verification unit 244, or the like, for judging whether or not the decrypted content key is a correct key.

Ninth Embodiment

Figure 15:
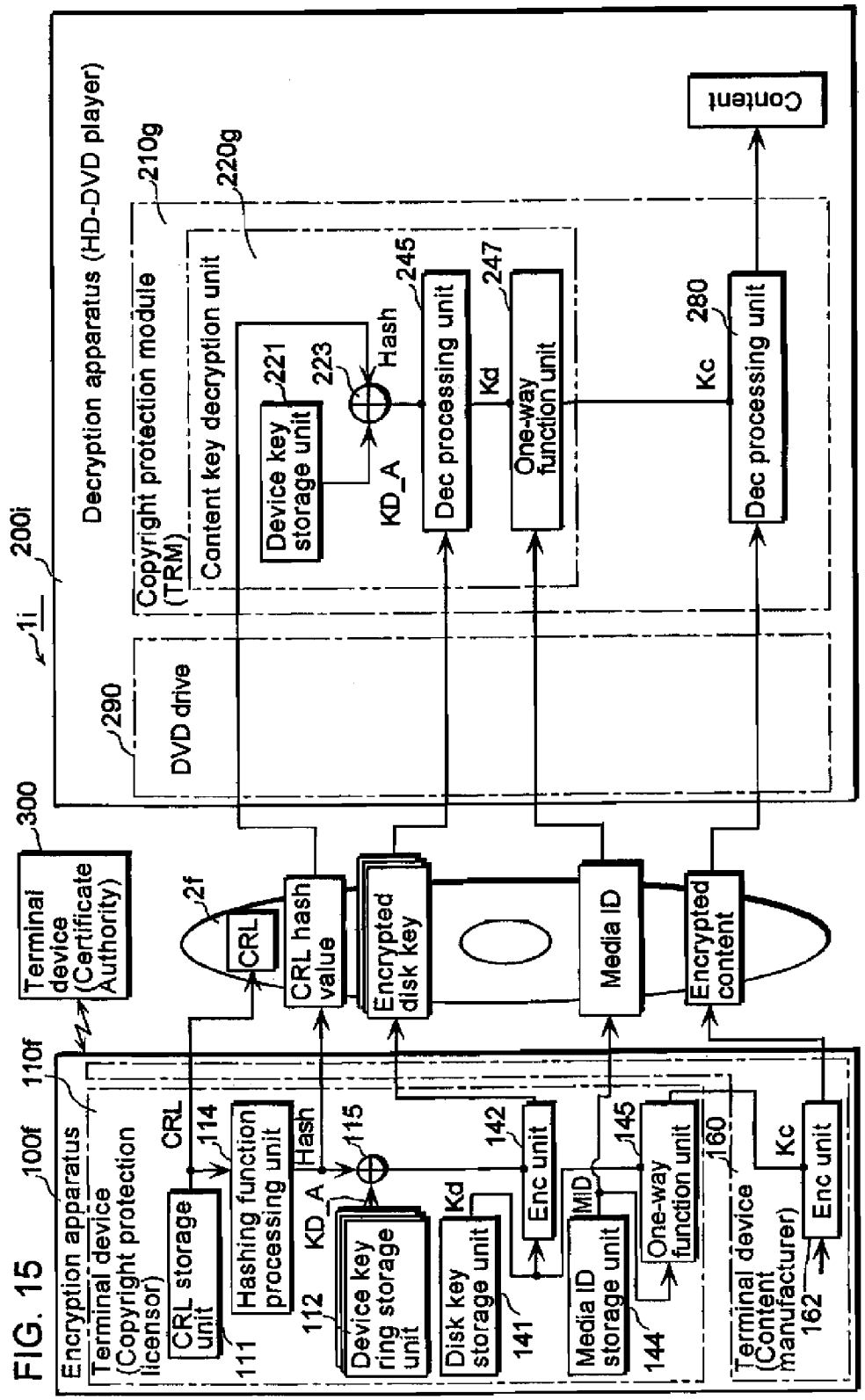
FIG. 15 is a functional block diagram showing the overall configuration of the copyright protection system 1h according to a ninth embodiment.

FIG. 15 is a functional block diagram showing the overall configuration of the copyright protection system 1i according to the ninth embodiment. It should be noted that, in the copyright protection system 1i, the same numbers are put for the parts corresponding to those in the copyright protection system 1h according to the eighth embodiment. The description is therefore omitted, and the difference between the two systems will be focused.

In the encryption apparatus 100f in the copyright protection system 1i, the terminal device 110f further include a media ID storage unit 144 and a one-way function unit 145, in addition to the CRL storage unit 111, the device key ring storage unit 112, the hashing function processing unit 114, the Ex-OR unit 115, the disk key storage unit 141 and the Enc unit 142. In the copyright protection module 210g in the decryption apparatus 200i, the content key decryption unit 220g further includes a one-way function unit 247 having the same structure as that of the one-way function unit 145, in addition to the device key storage unit 221, the Ex-OR unit 223 and the Dec processing unit 245.

The terminal device 110e in the encryption apparatus 100e according to the eighth embodiment encrypts the disk key Kd stored in the disk key storage unit 141, using the exclusive OR value between the hash value Hash and each device key KD_A, so as to generate a ring of encrypted disk keys, as well as encrypts the content key Kc stored in the content key storage unit 113 using the disk key Kd so as to generate an encrypted content key. As a result, in the terminal device 110e, the encryption level against attacks increases while the two encryption processing imposes a lot of tasks.

Therefore, the terminal device 110f according to the encryption apparatus 100f of the present copyright protection system 1i attempts to reduce additional tasks imposed on the terminal device 110f by using the media ID storage unit 144, in stead of the content key storage unit 113, for storing a media ID, an MID, specific to each DVD, and the one-way function unit 145, instead of the Enc unit 143, for generating a content key Kc based on the media ID, the MID and the disk key Kd so as to omit the processing of encrypting the content key Kc.

The one-way function unit 145 is, for instance, an Ex-OR, and generates a content key Kc by substituting, into a one-way function, the media ID, the MID and the disk key Kd which are stored in the media ID storage unit 144. The processing of generating a content key Kc requires a less amount of tasks compared to the processing of generating an encrypted content key performed by the Enc unit 143 shown in FIG. 14.

The terminal device 160 allows a ring of encrypted disk keys generated by the Enc unit 142 and the media ID, the MID outputted from the media ID storage unit 144, in addition to the CRL, the encrypted content and others, to be bound to a DVD2f.

According to this, the content key decryption unit 220g according to the copyright protection module 210g in the decryption apparatus 200i stores only the device key KD_A, decrypts the disk key Kd by decrypting the ring of encrypted disk keys bound to the DVD2f using the device key KD_A and the CRL hash value bound to the DVD2f, and further generates a content key Kc based on the media iD, the MID which are bound to a DVD2f and the disk key Kd.

The one-way function unit 247 generates a content key Kc by performing one-way function processing using the media ID, the MID and the disk key Kd. The processing of generating a content key Kc requires a less amount of tasks compared to the processing of decrypting a content key Kc by the Dec processing unit 246 shown in FIG. 14.

It is well known that the media ID and the MID are bound to the DVD2f, but the structure of the one-way function units 145 and 247 are hard to be known as is the case of the secret key. Therefore, it is also possible with the copyright protection system 1i according to the ninth embodiment, as in the case of the first embodiment, not only to achieve a higher cost performance and a secure transmission of a digital work, but also to further strengthen copyright protection as encryption level against attacks increases. Thus, the amount of tasks imposed on the terminal device 110f and the content key decryption unit 220g can be also reduced.

It should be noted that the terminal device 110f may further include a verification data output unit for outputting verification data that serves as a criterion for checking whether or not the content key decrypted by the decryption apparatus 200i is correct. The verification data output unit may output, to the DVD2f, the data obtained by encrypting the data of a predetermined fixed-pattern using the content key stored in the content key storage unit 113, as verification data. In accordance with the terminal device 110f, the content key decryption unit 220g may further include the content decryption key verification unit 228, the content key verification unit 242, the content decryption key verification unit 244, or the like, for verifying whether or not the decrypted content key is a correct key.

Tenth Embodiment

Figure 16:
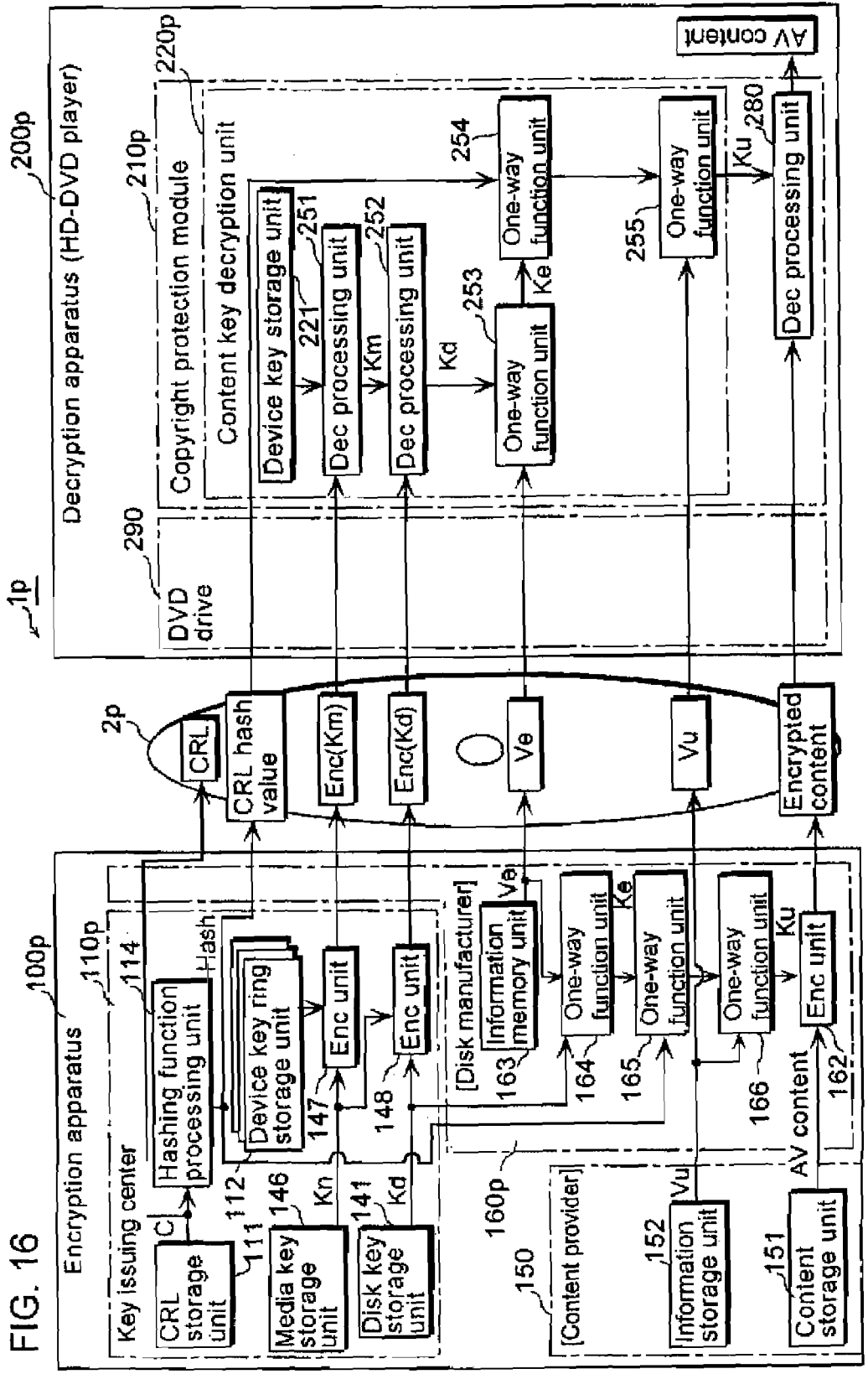
FIG. 16 is a functional block diagram showing the overall configuration of the copyright protection system 1p according to a tenth embodiment.

FIG. 16 is a functional block diagram showing the overall configuration of the copyright protection system 1p according to the tenth embodiment. It should be noted that in FIG. 16, the terminal device 300 is omitted. The same numbers are put for the parts corresponding to those in the copyright protection system 1i according to the ninth embodiment. The description is therefore omitted, and the difference between the two systems is focused.

In the copyright protection system 1i, the encryption apparatus 100f is composed of two terminal devices: the terminal device 110f of the copyright protection licensor; and the terminal device 160 of the content manufacturer. In contrast, in the copyright protection system 1p, the encryption apparatus 100p is composed of three terminal devices: the terminal device 110p of the key issuing center; the terminal device 150 of the content provider; and the terminal device 160p of the disk manufacturer.

The terminal device 110p includes: the CRL storage unit 111; the device key ring storage unit 112; the hashing function processing unit 114; the disk key storage unit 141 for storing a disk key Kd; the media key storage unit 146 for storing a media key Km; the Enc unit 147 for encrypting a media key Km using each device key KD_A; and the Enc unit 148 for encrypting a disk key Kd using a media key Km. The terminal device 110p transmits the following to the terminal device 160p: a CRL stored in the CRL storage unit 111; a CRL hash value calculated by the hashing function processing unit 114; each encrypted media key Km encrypted by the Enc unit 147; a disk key Kd stored in the disk key storage unit 141; and a disk key Kd encrypted by the Enc unit 148.

The terminal device 150 includes a content storage unit 151 for storing an AV content and an information storage unit 152 for storing information Vu indicating the detail of the content (e.g. a content ID). The terminal device 150 transmits, to the terminal device 160p, an AV content stored in the content storage unit 151 and information Vu stored in the information storage unit 152.

The terminal device 160p includes: information storage (memory) unit 163 for storing information Ve that includes a value (e.g., a serial number) which varies depending on a disk; and three one-way function units for two inputs 164, 165, 166, in addition to the Enc unit 162. The one-way function unit 164 generates a secret key Ke based on the disk key Kd and the information Ve. The one-way function unit 165 a secret key based on the secret key Ke and the CRL hash value. The one-way function unit 166 generates a secret key Ku for encrypting an AV content based on the secret key generated by the one-way function unit 166 and the information Vu. The Enc unit 162 encrypts the AV content using the secret key Ku and generates an encrypted content. The terminal device 160p allows the information Ve, Vu, the encrypted media key Enc (Km) and the encrypted disk key Enc (Kd), in addition to the CRL, the CRL hash value and the encrypted content, to be bound to a DVD2p.

It should be noted that the information Ve and Vu can be used not only as raw data but also as data that relates to the encryption of a content (i.e., key generation process) for the following reasons: (1) to prevent illegal conduct enacted by a disk manufacturer; or (2) to change a key for each content distribution under the control of a content provider. The information Vu may include information for specifying a content provider. The information Ve may further include information for specifying a disk manufacturer or a stamper.

In accordance with the structure of such encryption apparatus 100p, the copyright protection module 210p in the decryption apparatus 200p includes a content key decryption unit 220p and a Dec processing unit 280 and others while the content key decryption unit 220p includes two Dec processing units 251, 252 respectively corresponding to the Enc units 147, 148 of the encryption apparatus 100p and three one-way function units for two inputs 253, 254 and 255 respectively having the same structure as the one-way function units 164, 165 and 166 of the encryption apparatus 100p, in addition to the device key storage unit 221.

The Dec processing unit 251 receives, via the DVD drive 290, an encrypted media key Enc (Km) exclusively used by the decryption apparatus 200p out of the ring of encrypted media keys Enc recorded onto the DVD2p, and generates a media key Km by decrypting the received encrypted media key Enc (Km), using the device key KD_A stored in the device key storage unit 221. The Dec processing unit 252 generates a disk key Kd by decrypting the encrypted disk key Enc (Kd) recorded onto the DVD2p, using the media key Km generated by the Dec processing unit 251. The one-way function unit 253 generates a secret key Ke based on the information Ve recorded on the DVD2p and the disk key Kd generated by the Dec processing unit 252. The one-way function unit 254 generates a secret key based on the secret key Ke generated by the one-way function unit 253 and the CRL hash value recorded on the DVD2p. It should be noted that the secret key here is as same as the secret key generated by the one-way function unit 165. The one-way function unit 255 generates a secret key Ku based on the information Vu recorded on the DVD2p and the secret key generated by the one-way function unit 254, and transmits the generated secret key Ku to the Dec processing unit 280.

The Dec processing unit 280 replays an AV content by decrypting the encrypted content recorded on the DVD2p, using the secret key Ku transmitted from the content key decryption unit 220p.

Thus, with the copyright protection system 1p according to the tenth embodiment, the information Ve, Vu, the encrypted media key Enc (Km) and the encrypted disk key Enc (Kd), in addition to the CRL, the hash value of the CRL, the encrypted content, are bound to the DVD2p, but the secret key Ku obtained by encrypting an encrypted content is not bound. The secret key Ku is not merely generated by encrypting a content key using a second secret key associated with the decryption apparatus 200p, but is generated based on the CRL attribute value (hash value). Therefore, the decryption apparatus 200p having received the encrypted content and the CRL attribute value cannot properly generate such secret key Ku, and thus, cannot properly decrypt an encrypted digital work. Consequently, it is possible to securely transmit a digital work. The digital work recorded on the DVD2p is protected from unauthorized copy and others, and a sound development can be expected in the market of multimedia related products. By using the attribute value (i.e., a hash value) bound to the DVD2p, the time for calculating a hash value is no longer required, which leads to the high performance in the decryption of a content key. The price of the decryption apparatus 200a can be reduced because the attribute value calculation unit is omitted. The time required for mutual authentication is no longer necessary so that the high performance in the decryption of a content is greatly achieved while the price of the decryption apparatus 200p is greatly reduced owing to the omission of the encryption apparatus for forming a SAC.

It should be noted that the three one-way function units 164 through 166 are used in the encryption apparatus 100p according to the tenth embodiment. Instead of the one-way function units 164 through 166, one-way functions for four inputs may be used so as to generate a secret key Ku based on the disk key Kd, the CRL hash value and the information Ve, Vu. Similarly, instead of the one-way function units 253 through 255, one-way function units for four inputs may be used so as to generate a secret key Ku based on the disk key Kd, the CRL hash value and the information Ve, Vu. The information Ve, Vu may be omitted from the secret key generation process. That is to say that a secret key Ku may be generated based on the disk key Kd and the CRL hash value.

The terminal device 110p may further include a verification data output unit for outputting, to the DVD2p, verification data for checking whether or not the content key decrypted by the decryption apparatus 200p is correct. The verification data output unit may output, to the DVD2p, the data obtained by encrypting a predetermined fixed-pattern data using the content key stored in the content key storage unit 113, as verification data, or may output, to the DVD2p, the data obtained by encrypting a content key using the content key, as verification data. In accordance with the terminal device 110p, the content key decryption unit 220p may include the content decryption key verification unit 228, a content key verification unit 242, a content decryption key verification unit 244, or the like, for verifying whether or not the decrypted content key is a correct key.

Thus, the copyright protection system according to the present invention is described based on the embodiments, however, the present invention is not limited to these embodiments.

For example, a digital work is transmitted via a storage medium called DVD, but the present invention can be applied to the system of transmitting a digital work via a transmission medium such as the internet. That is to say that the application program in the copyright protection system according to the present invention can be achieved by transmitting to the transmission medium instead of a storage medium and receiving from a transmission line instead of reading from the storage medium.

The present invention can be also applied to the system of transmitting a digital work using both a storage medium and a transmission medium in a combined form. For example, an encrypted content may be provided via a storage medium like a DVD whereas a key for decrypting the encrypted content, a CRL, and a hash value may be provided be means of net distribution via a transmission medium. Reversely, a key and others may be provided via a storage medium while an encrypted content may be provided by net distribution via a transmission medium. In the system of transmitting a digital work using both a storage medium and a transmission medium in a combined form, those provided via a storage medium and those provided via a transmission medium may be arbitrarily determined.

The above-mentioned embodiments describe the case of applying the copyright protection system according to the present invention within a wide range of the encryption apparatuses 100a through 100i of the copyright protection licensor and the content manufacturer as well as the decryption apparatuses 200a through 200i used by the user. The present copyright protection system may be applied to the processing used for transmitting a content being a digital work in encrypted form within a broad area such as at home or in an office environment.

Eleventh Embodiment

Figure 17:
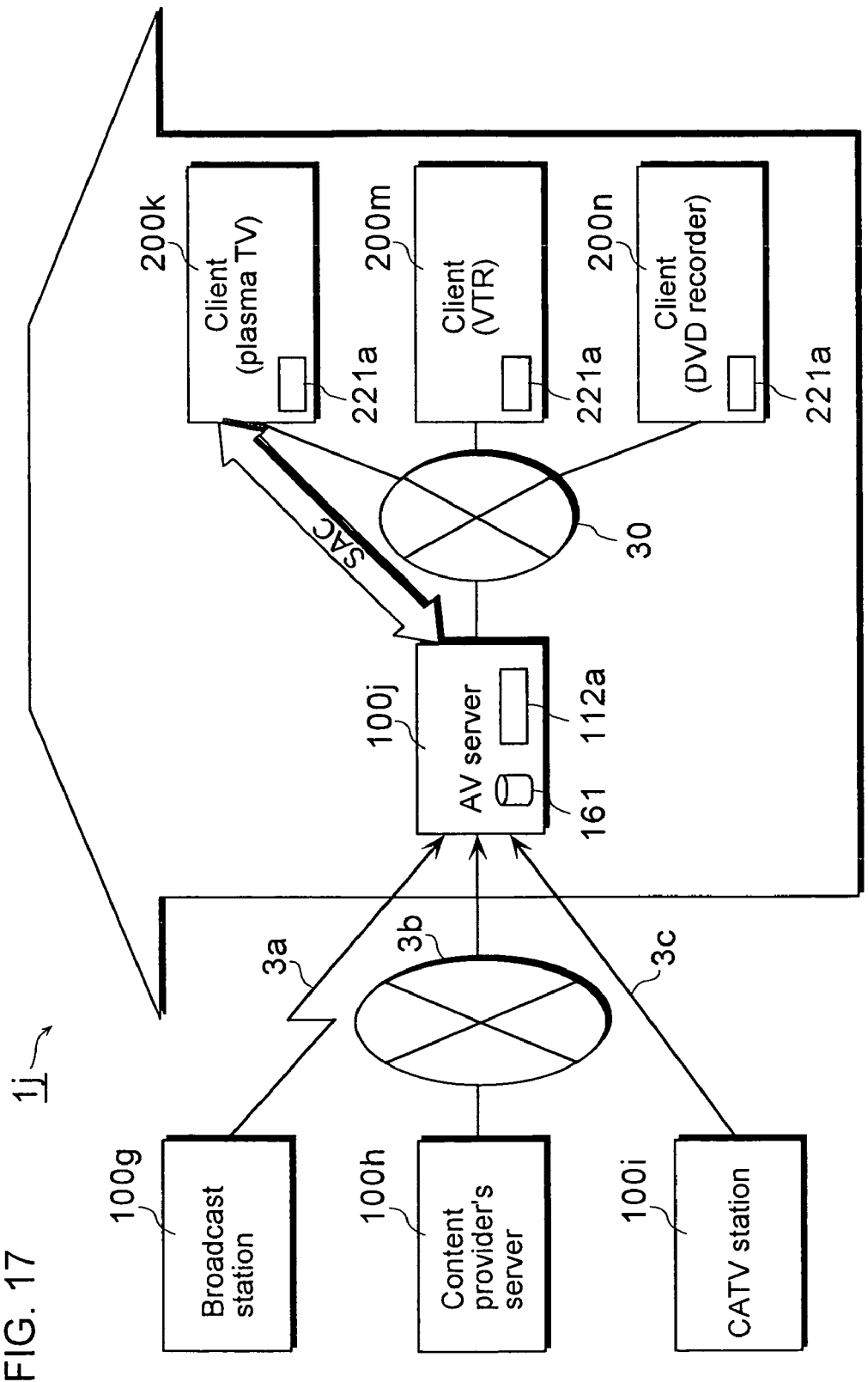
FIG. 17 is a block diagram showing the overall configuration of the copyright protection system for transmitting a content in encrypted form via a small-scaled home LAN.
Figure 18:
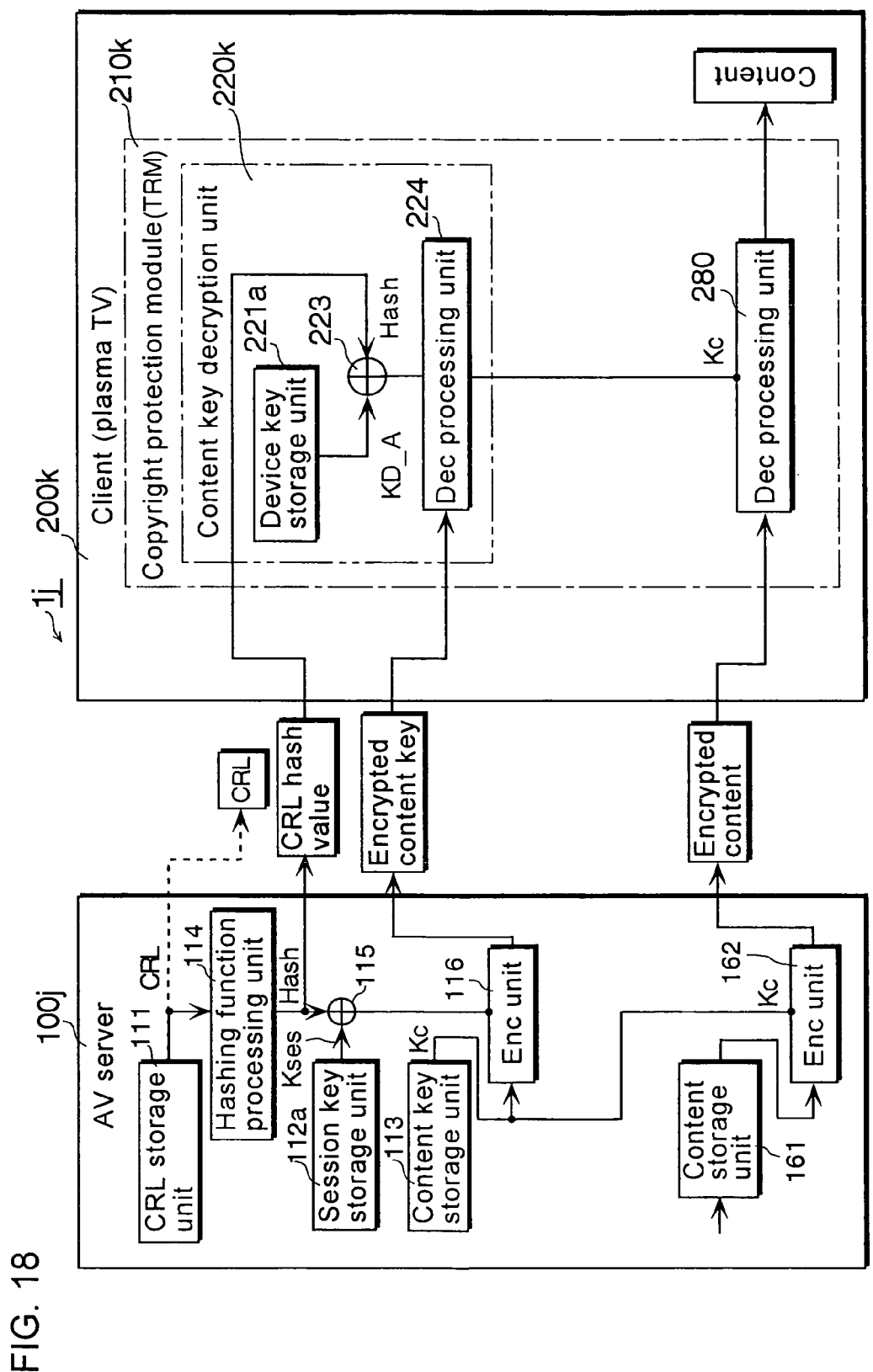
FIG. 18 is a block diagram showing the configuration of the AV server 100j and that of the plasma TV 200k which are shown in FIG. 17.

FIG. 17 is a block diagram showing the overall configuration of the copyright protection system for transmitting a content in encrypted form via a small-scaled home LAN. FIG. 18 is a block diagram showing the configuration including an AV server 100j and each plasma TV 200k, a VTR 200m and a DVD recorder 200n, shown in FIG. 17. It should be noted that FIG. 18 shows only the structure of the plasma TV 200k as a typical example since the structures of the plasma TV 200k, the VTR 200m, the DVD recorder 200n are as same as the components making up the copyright protection system.

The copyright protection system 1j is configured by a home LAN 30 as a transmission medium, an AV server 100j connected to the home LAN 30, as well as the plasma TV 200k, the VTR 200m and the DVD recorder 200n, as clients.

The AV server 100j has a structure almost as same as that of the encryption apparatus 100a shown in FIG. 1. The difference between the two, however, is that the AV server 100j accumulates contents received from outside into the content storage unit 161 composed of an HDD or the like, and delivers a required content by means of net distribution via the home LAN 30 according to the accumulation content distribution request made by the plasma TV 200k, the VTR 200m and the DVD recorder 200n.

More precisely, the AV server 100j receives a content in the following ways: from the broadcast station 100g via a satellite broadcasting (BS, CS) or a terrestrial broadcast network 3a; from the server 100h of a content provider via an internet network 3b; or from a CATV station 100i via a CATV network 3c. The AV server 100j accumulates the received content in the content storage unit 161.

The AV server 100j has a session key storage unit 112a which distinguishes the present configuration from the case of the encryption apparatus 100a which encrypts a content key Kc using a device key. The difference is that in the case where one of the clients, e.g., the plasma TV 200k, requests for a delivery of the content that is accumulated in the content storage unit 161, the AV server 100j forms a SAC between the plasma TV 200k and itself based on the request, stores, in the session key storage unit 112a, a session key Kses obtained at the time of SAC formation, and encrypts the content key Kc using the session key Kses instead of the device key used by the encryption apparatus 100a. In short, the use of the session key Kses in place of the device key is a notable difference compared to the case of encryption apparatus 100a.

The plasma TV 200k, the VTR 200m and the DVD recorder 200n are constructed nearly as same as the decryption apparatus 200a shown in FIG. 1, however, they respectively have a session key storage unit 221a for storing the session key Kses obtained at the time of SAC formation between the AV server 100j and themselves so as to decrypt a content key Kc using the session key Kses stored in the session key storage unit 221a. This is the difference that distinguishes the present configuration from the case of the decryption apparatus 200a which decrypts a content key Kc using a device key KD_A.

The following describes the processing performed by the AV server 100j and the plasma TV 200k in the copyright protection system 1j, mainly focusing on the difference between the copyright protection system 1j and the copyright protection system 1a.

When receiving a request for content distribution from a client, the DVD recorder 200n, the AV server 100j performs SAC processing using elliptical encryption between the plasma TV 200k and itself. Since the AV server 100j and the content key decryption unit 220k in the copyright protection module 210k of the plasma TV 200k respectively have the session key Kses indicating the same value, the AV server 100j stores the session key Kses into the session key storage unit 112a while the content key decryption unit 220k stores the session key Kses in the session key storage unit 221a.

The Ex-OR unit in the AV server 100j obtains an exclusive OR value between the session key Kses shared with the plasma TV 200k and the hash value of the CRL. The Enc unit 116 encrypts a content key Kc using the value obtained by the Ex-OR unit 115 as a key. Then, the Enc unit 162 encrypts the content for which AV data is requested, using the content key Kc. After the encryption of the content key and the content, the AV server 100j transmits, to the plasma TV 200k, the encrypted content key and the encrypted content together with the CRL hash value by means of encrypted communication using a session key via the home LAN 30.

The content key decryption unit 220k according to the copyright protection module 210k within the plasma TV 200k receives the CRL hash value, the encrypted content key and the encrypted content which are transmitted via the home LAN 30, and decrypts them using the session key. Then, the Ex-OR unit 223 in the content key decryption unit 220k calculates an exclusive OR value between the session key Kses and the hash value of the CRL. The Dec processing unit 224 decrypts a content key using the value obtained by the Ex-OR unit 223 as a key, and passes the decrypted content key to the Dec processing unit 280. The Dec processing unit 280 decrypts an encrypted content using the obtained content key Kc.

Therefore, content use is available for the clients connected to a relatively small network such as a home and a company. It is also possible to provide thorough copyright protection to the low-end clients.

It should be noted that a session key Kses, instead of a device key, is used in the eleventh embodiment, but the AV server 100j and the plasma TV 200k may share in advance a secret key Ks. In this case, the secret key Ks may be used instead of a session key Kses.

In order to examine whether or not a decrypted content key indicates a correct value, the fixed-pattern as described above may be transmitted together with the CRL or the like, so that the copyright module 210k can check it beforehand.

The present invention can realize various encryption apparatuses and decryption apparatuses by combining the characteristic processing described in the ten embodiments described above. Namely, in the case of encryption, the following selections are possible: (1) in the case of respectively terming an encryption for performed for a secret key and a transformation by means of one-way function for a media ID as a "layer", the number of layers can be selected between 2 and 3; (2) a key used for encrypting a content can be selected between a content key and a function value obtained by transforming a media ID by means of one-way function; and (3) a target in which the hash value of the CRL is to be involved can be selected among a device key, a disk key, a content key, a media ID, a session key, and a function value obtained by transforming a media ID by means of one-way function.

Thus, it is possible to realize various forms of encryption apparatus, decryption apparatus and content key decryption unit by combining the one respectively selected in the above respective parameters (1), (2) and (3).

The number of the layers for the encryption (or decryption) of the secret key is not restricted to 1-3, and it may be more than 3. Considering these variations, the encryption apparatus, the decryption apparatus and the content key decryption unit (i.e., a secret key generation apparatus) can be presented in the below.

The encryption method using a content key is a method employed by an encryption apparatus that encrypts a digital work and outputs the encrypted digital work to a storage medium or a transmission medium, the method comprising: repeating a sequence of encryption of encrypting a digital work using a first secret key out of n ($\geq 2$) secret keys as well as encrypting the (i−1)th ($2 \leq i \leq n$) secret key using the i th secret key, for the first to (n−1)th secret keys; and outputting, to said medium, the encrypted first to n th secret keys, wherein in the case of the encryption using at least one of the first to n th secret keys, the secret key is transformed, prior to the encryption, using an attribute that depends on the contents of the CRL being a list of information for specifying revoked public key certificates.

The encryption method using a media ID is a method employed by an encryption apparatus that encrypts a digital work and outputs the encrypted digital work to a storage medium or a transmission medium, the method comprising: repeating a sequence of encryption of converting medium identification information by one-way function using a first secret key out of n ($\geq 1$) secret keys, encrypting a digital work using the converted medium identification information as well as encrypting the (i−1)th secret key using the i th ($2 \leq i \leq n$) secret key in the case where "n" is greater than or equal to 2, for the first to (n−1)th secret keys; and outputting, to said medium, the encrypted first to (n−1)th secret keys, wherein in the case of encryption or transformation using at least one of the first to n th secret keys, (1) a secret key is transformed, prior to said encryption or transformation, using an attribute value that depends on the contents of the CRL being a list of information for specifying revoked public key certificates or (2) the medium identification information obtained in said conversion is transformed beforehand using the attribute value.

The decryption method using a content key is a method employed by a decryption apparatus that decrypts an encrypted digital work, the method comprising: repeating a sequence of decryption of obtaining, via a storage medium or a transmission medium, the encrypted digital work, n ($\geq 2$) encrypted secret keys and a CRL being a list of information for specifying revoked public key certificates and decrypting a first encrypted secret key out of the n encrypted secret keys using a pre-held secret key as well as decrypting a second encrypted secret key using the obtained first secret key, for n encrypted secret keys; and decrypting a digital work using the n th secret key obtained in the last decryption, wherein a secret key to be used for decryption is transformed, prior to the decryption, using an attribute value that depends on the contents of the CRL, for at least one of the decryptions performed for the first to n th encrypted secret keys.

The decryption method using a media ID is a method employed by a decryption apparatus that decrypts an encrypted digital work, the method comprising: repeating a sequence of decryption of obtaining, via a storage medium or a transmission medium, an encrypted digital work, medium identification information, n ($\geq 1$) encrypted secret keys and a CRL being a list of information for specifying revoked public key certificates, decrypting the first encrypted secret key out of n encrypted secret keys using a pre-held secret key, and decrypting the second encrypted secret key using the first secret key obtained as a result of the decryption, for n encrypted secret keys, in the case where n is greater than or equal to 2; converting, by means of one-way function, the medium identification information using the n th secret key obtained in the last decryption; and decrypting a digital work using the converted medium identification information, wherein for at least one of decryption performed for the first to n th encrypted secret keys and conversion performed on the medium identification information, either (1) a secret key to be used for decryption or transformation is transformed, prior to the decryption or the conversion, using an attribute value that depends on the contents of the CRL or (2) the medium identification information obtained in said conversion is transformed using the attribute value.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The encryption apparatus according to the copyright protection system of the present invention is useful as a computer apparatus that encrypts a digital work and outputs the encrypted digital work to a storage medium such as a DVD or a transmission medium such as the Internet, while the decryption apparatus as well as the secret key generation apparatus is useful as a computer apparatus such as a DVD player and a personal computer that obtains an encrypted digital work via a storage medium or a transmission medium and decrypts the obtained encrypted digital work.

What is claimed is:

1. An encryption apparatus that encrypts a digital work and outputs the encrypted digital work to a storage medium or a transmission medium, the encryption apparatus comprising:
    a digital work storage unit operable to store a digital work;
    a first secret key storage unit operable to store a first secret key, the first secret key being for encrypting the digital work;
    a second secret key storage unit operable to store a second secret key associated with a decryption apparatus that decrypts an encrypted digital work;
    a certificate revocation list (CRL) storage unit operable to store a CRL, the CRL including a list of information specifying revoked public key certificates;
    an attribute value calculation unit operable to calculate an attribute value associated with the information included in the CRL, the attribute value being calculated based on the CRL stored in the CRL storage unit;
    a modification unit operable to generate a modified second secret key by modifying the second secret key stored in the second secret key storage unit, the second secret key being modified using the attribute value calculated by the attribute value calculation unit and being modified without using the CRL stored in the CRL storage unit;
    a first encryption unit operable to generate an encrypted first secret key by encrypting the first secret key stored in the first secret key storage unit, the first secret key being encrypted using the modified second secret key generated by the modification unit;
    a second encryption unit operable to encrypt the digital work stored in the digital work storage unit, the digital work being encrypted using the first secret key stored in the first secret key storage unit; and
    an output unit operable to output, to the storage medium or the transmission medium, the attribute value calculated by the attribute value calculation unit, the encrypted first secret key generated by the first encryption unit and the digital work encrypted by the second encryption unit.

2. The encryption apparatus according to claim 1, further comprising:
    a verification data output unit operable to output, to the storage medium or the transmission medium, verification data that is a criterion for checking whether or not the first secret key decrypted by the decryption apparatus is correct.

3. The encryption apparatus according to claim 2,
    wherein the verification data output unit outputs, to the storage medium or the transmission medium, data obtained by encrypting predetermined fixed-pattern data using the first secret key stored in the first secret key storage unit, the data obtained by encrypting the predetermined fixed-pattern data being output as the verification data.

4. The encryption apparatus according to claim 2,
wherein the verification data output unit outputs, to the storage medium or the transmission medium, data obtained by encrypting the first secret key stored in the first secret key storage unit, using the first secret key, the data obtained by encrypted the first secret key being output as the verification data.

5. The encryption apparatus according to claim 1,
wherein the attribute value calculation unit calculates a hash value of the CRL as the attribute value, and the modification unit modifies the second secret key by obtaining an exclusive OR value from the second secret key and the hash value.

6. The encryption apparatus according to claim 1,
wherein the output unit outputs the CRL stored in the CRL storage unit to the storage medium or the transmission medium.

7. A copyright protection system for securely transmitting a digital work via a storage medium or a transmission medium, the copyright protection system comprising:
the encryption apparatus according to claim 1; and
a decryption apparatus comprising:
an obtainment unit operable to obtain, via the storage medium or the transmission medium, the attribute value, the encrypted digital work, and an encrypted first secret key generated by encrypting the first secret key;
a second secret key storage unit operable to store the second secret key;
a modification unit operable to generate a modified second secret key by modifying the second secret key stored in the second secret key storage unit, the second secret key being modified using the attribute value obtained by the obtainment unit and being modified without using the CRL;
a first decryption unit operable to decrypt the encrypted first secret key obtained by the obtainment unit, the encrypted first secret key being decrypted using the modified second secret key generated by the modification unit; and
a second decryption unit operable to decrypt the encrypted digital work obtained by the obtainment unit, the encrypted digital work being decrypted using the first secret key decrypted by the first decryption unit.

8. An encryption apparatus that encrypts a digital work and outputs the encrypted digital work to a storage medium or a transmission medium, the encryption apparatus comprising:
a digital work storage unit operable to store a digital work;
a first secret key storage unit operable to store a first secret key, the first secret key being for encrypting the digital work;
a second secret key storage unit operable to store a second secret key associated with a decryption apparatus that decrypts an encrypted digital work;
a certificate revocation list (CRL) storage unit operable to store a CRL, the CRL including a list of information specifying revoked public key certificates;
a first encryption unit operable to encrypt the first secret key stored in the first secret key storage unit, the first secret key being encrypted using the second secret key stored in the second secret key storage unit;
an attribute value calculation unit operable to calculate an attribute value associated with the information included in the CRL, the attribute value being calculated based on the CRL stored in the CRL storage unit;
a modification unit operable to generate a modified first secret key by modifying the first secret key stored in the first secret key storage unit, the first secret key being modified using the attribute value calculated by the attribute value calculation unit and being modified without using the CRL stored in the CRL storage unit;
a second encryption unit operable to encrypt the digital work stored in the digital work storage unit, the digital work being encrypted using the modified first secret key generated by the modification unit; and
an output unit operable to output, to a storage medium or a transmission medium, the attribute value calculated by the attribute value calculation unit, the first secret key encrypted by the first encryption unit and the digital work encrypted by the second encryption unit.

9. The encryption apparatus according to claim 8, further comprising:
a verification data output unit operable to output, to the storage medium or the transmission medium, verification data that is a criterion for checking whether or not the first secret key decrypted by the decryption apparatus is correct.

10. The encryption apparatus according to claim 9,
wherein the verification data output unit outputs, to the storage medium or the transmission medium, data obtained by encrypting predetermined fixed-pattern data using the first secret key modified by the modification unit, the data obtained by encrypting the predetermined fixed-pattern data being output as the verification data.

11. The encryption apparatus according to claim 9,
wherein the verification data output unit outputs the verification data to the storage medium or the transmission medium, the verification data being data obtained by encrypting the first secret key modified by the modification unit, using the first secret key.

12. A copyright protection system for securely transmitting a digital work via a storage medium or a transmission medium, the copyright protection system comprising:
the encryption apparatus according to claim 8; and
a decryption apparatus comprising:
an obtainment unit operable to obtain, via the storage medium or the transmission medium, the attribute value, the encrypted digital work, and an encrypted first secret key generated by encrypting the first secret key;
a second secret key storage unit operable to store the second secret key;
a first decryption unit operable to decrypt the encrypted first secret key obtained by the obtainment unit, the encrypted first secret key being decrypted using the second secret key stored in the second secret key storage unit;
an attribute value calculation unit operable to calculate the attribute value, based on the CRL obtained by the obtainment unit;
a modification unit operable to generate a modified first secret key by modifying the first secret key decrypted by the first decryption unit, the first secret key being modified using the attribute value obtained by the obtainment unit and being modified without using the CRL; and
a second decryption unit operable to decrypt the encrypted digital work obtained by the obtainment unit, the encrypted digital work being decrypted using the modified first secret key generated by the modification unit.

13. An encryption apparatus that encrypts a digital work and outputs the encrypted digital work to a storage medium or a transmission medium, the encryption apparatus comprising:

a digital work storage unit operable to store a digital work;

a medium identification information storage unit operable to store medium identification information, the medium identification information being for encrypting the digital work;

a first secret key storage unit operable to store a first secret key associated with a decryption apparatus that decrypts an encrypted digital work;

a certificate revocation list (CRL) storage unit operable to store a CRL, the CRL including a list of information specifying revoked public key certificates;

an attribute value calculation unit operable to calculate an attribute value associated with the information included in the CRL, the attribute value being calculated based on the CRL stored in the CRL storage unit;

a modification unit operable to generate a modified first secret key by modifying the first secret key stored in the first secret key storage unit, the first secret key being modified using the attribute value calculated by the attribute value calculation unit and being modified without using the CRL stored in the CRL storage unit;

a function conversion unit operable to convert the medium identification information stored in the medium identification information storage unit and the modified first secret key generated by the modification unit to obtain a function value, the function value being obtained by entering the medium identification information and the modified first secret key into a one-way function;

a second encryption unit operable to encrypt the digital work stored in the digital work storage unit, the digital work being encrypted using the function value obtained by the function conversion unit; and an output unit operable to output, to the storage medium or the transmission medium, the attribute value calculated by the attribute value calculation unit, the medium identification information stored in the medium identification information unit and the digital work encrypted by the second encryption unit.

14. A copyright protection system for securely transmitting a digital work via a storage medium or a transmission medium, the copyright protection system comprising:

the encryption apparatus according to claim 13; and a decryption apparatus comprising:

an obtainment unit operable to obtain, via the storage medium or the transmission medium, the attribute value, the encrypted digital work, and the medium identification information;

a first secret key storage unit operable to store the first secret key;

a modification unit operable to generate a modified first secret key by modifying the first secret key stored in the first secret key storage unit, the first secret key being modified using the attribute value obtained by the obtainment unit and being modified without using the CRL;

a function conversion unit operable to convert the medium identification information obtained by the obtainment unit and the modified first secret key generated by the modification unit to obtain a function value, the function value being obtained by entering the medium identification information and the modified first secret key into a one-way function; and a first decryption unit operable to decrypt the encrypted digital work obtained by the obtainment unit, the encrypted digital work being decrypted using the function value obtained by the function conversion unit.

15. An encryption apparatus that encrypts a digital work and outputs the encrypted digital work to a storage medium or a transmission medium, the encryption apparatus comprising:

a digital work storage unit operable to store a digital work;

a medium identification information storage unit operable to store medium identification information, the medium identification information being for encrypting the digital work;

a first secret key storage unit operable to store a first secret key associated with a decryption apparatus that decrypts an encrypted digital work;

a certificate revocation list (CRL) storage unit operable to store a CRL, the CRL including a list of information specifying revoked public key certificates;

a function conversion unit operable to convert the medium identification information stored in the medium identification information storage unit and the first secret key stored in the first secret key storage unit to obtain a function value, the function value being obtained by entering the medium identification information and the first secret key into a one-way function;

an attribute value calculation unit operable to calculate an attribute value associated with the information included in the CRL, the attribute value being calculated based on the CRL stored in the CRL storage unit;

a modification unit operable to modify the function value obtained by the function conversion unit, the function value being modified using the attribute value calculated by the attribute value calculation unit;

a first encryption unit operable to generate an encrypted digital work by encrypting the digital work stored in the digital work storage unit, the digital work being encrypted using the function value modified by the modification unit and without using the CRL; and an output unit operable to output, to the storage medium or the transmission medium, the attribute value calculated by the attribute value calculation unit, the medium identification information stored in the medium identification information storage unit and the digital work encrypted by the first encryption unit.

16. A copyright protection system for securely transmitting a digital work via a storage medium or a transmission medium, the copyright protection system comprising:

the encryption apparatus according to claim 15; and a decryption apparatus comprising:

an obtainment unit operable to obtain, via the storage medium or the transmission medium, the attribute value, the encrypted digital work, and the medium identification information;

a first secret key storage unit operable to store the first secret key;

a function conversion unit operable to convert the medium identification information obtained by the obtainment unit and the first secret key stored in the first secret key storage unit to obtain a function value, the function value being obtained by entering the medium identification information and the first secret key into a one-way function;

a modification unit operable to generate a modified function value by modifying the function value obtained by the function conversion unit, the function value being modified using the attribute value obtained by obtainment unit and being modified without using the CRL; and a first decryption unit operable to decrypt the encrypted digital work obtained by the obtainment unit, the encrypted digital work being decrypted using the modified function value generated by the modification unit.

17. An encryption apparatus that encrypts a digital work and outputs the encrypted digital work to a storage medium or a transmission medium, the encryption apparatus comprising:

a digital work storage unit operable to store a digital work;

a first secret key storage unit operable to store a first secret key, the first secret key being for encrypting the digital work;

a second secret key storage unit operable to store a second secret key associated with a decryption apparatus that decrypts an encrypted digital work;

a third secret key storage unit operable to store a third secret key, the third secret key being for encrypting the first secret key;

a certificate revocation list (CRL) storage unit operable to store a CRL, the CRL including a list of information for identifying revoked public key certificates;

an attribute value calculation unit operable to calculate an attribute associated with the information included in the CRL, the attribute value being calculated based on the CRL stored in the CRL storage unit;

a modification unit operable to generate a modified second secret key by modifying the second secret key stored in the CRL storage unit, the second secret key being modified using the attribute value calculated by the attribute value calculation unit and being modified without using the CRL stored in the CRL storage unit;

a first encryption unit operable to encrypt the third secret key stored in the third secret key storage unit, the third secret key being encrypted using the modified second secret key generated by the modification unit;

a second encryption unit operable to encrypt the first secret key stored in the first secret key storage unit, the first secret key being encrypted using the third secret key stored in the third secret key storage unit;

a third encryption unit operable to encrypt the digital work stored in the digital work storage unit, the digital work being encrypted using the first secret key stored in the first secret key storage unit; and an output unit operable to output, to the storage medium or the transmission medium, the attribute value calculated by the attribute value calculation unit, the third secret key encrypted by the first encryption unit, the first secret key encrypted by the second encryption unit and the digital work encrypted by the third encryption unit.

18. The encryption apparatus according to claim 17, further comprising:

a verification data output unit operable to output, to the storage medium or the transmission medium, verification data that is a criterion for checking whether or not the third secret key decrypted by the decryption apparatus is correct.

19. The encryption apparatus according to claim 18, wherein the verification data output unit outputs, to the storage medium or the transmission medium, data obtained by encrypting predetermined fixed-pattern data using the third secret key stored in the third secret key storage unit, the data obtained by encrypting the predetermined fixed-pattern data being output as the verification data.

20. The encryption apparatus according to claim 18, wherein the verification data output unit outputs, to the storage medium or the transmission medium, data obtained by encrypting the third secret key stored in the third secret key storage unit, using the third secret key, the data obtained by encrypting the third secret key being output as the verification data.

21. A copyright protection system for securely transmitting a digital work via a storage medium or a transmission medium, the copyright protection system comprising:

the encryption apparatus according to claim 17; and a decryption apparatus comprising:

an obtainment unit operable to obtain, via the storage medium or the transmission medium, the attribute value, the encrypted digital work, an encrypted first secret key generated by encrypting the first secret key, and an encrypted third secret key generated by encrypting the third secret key;

a second secret key storage unit operable to store a second secret key;

a modification unit operable to generate a modified second secret key by modifying the second secret key stored in the second secret key storage unit, the second secret key being modified using the attribute value obtained by the obtainment unit and being modified without using the CRL;

a first decryption unit operable to decrypt the encrypted third secret key obtained by the obtainment unit, the encrypted third secret key being decrypted using the modified second secret key generated by the modification unit;

a second decryption unit operable to decrypt the encrypted first secret key obtained by the obtainment unit, the encrypted first secret key being decrypted using the third secret key decrypted by the first decryption unit; and a third decryption unit operable to decrypt the encrypted digital work obtained by the obtainment unit, the encrypted digital work being decrypted using the first secret key decrypted by the second decryption unit.

22. An encryption apparatus that encrypts a digital work and outputs the encrypted digital work to a storage medium or a transmission medium, the encryption apparatus comprising:

a digital work storage unit operable to store a digital work;

a first secret key storage unit operable to store a first secret key, the first secret key being for encrypting the digital work, a second secret key storage unit operable to store a second secret key associated with a decryption apparatus that decrypts an encrypted digital work:

a third secret key storage unit operable to store a third secret key, the third secret key being for encrypting the first secret key;

a certificate revocation list (CRL) storage unit operable to store a CRL, the CRL including a list of information specifying revoked public key certificates;

a first encryption unit operable to encrypt the third secret key stored in the third secret key storage unit, the third secret key being encrypted using the second secret key stored in the second secret key storage unit;

an attribute value calculation unit operable to calculate an attribute value associated with the information included in the CRL, the attribute value being calculated based on the CRL stored in the CRL storage unit;

a modification unit operable to generate a modified third secret key by modifying the third secret key stored in the third secret key storage unit, the third secret key being modified using the attribute value calculated by the attribute value calculation unit and being modified without using the CRL;

a second encryption unit operable to encrypt the first secret key stored in the first secret key storage unit, the first secret key being encrypted using the modified third secret key generated by the modification unit;

a third encryption unit operable to encrypt the digital work stored in the digital work storage unit, the digital work being encrypted using the first secret key encrypted by the second encryption unit; and an output unit operable to output, to the storage medium or the transmission medium, the attribute value calculated by the attribute value calculation unit, the third secret key encrypted by the first encryption unit, the first secret key encrypted by the second encryption unit and the digital work encrypted by the third encryption unit.

23. A copyright protection system for securely transmitting a digital work via a storage medium or a transmission medium, the copyright protection system comprising:

the encryption apparatus according to claim 22; and a decryption apparatus comprising:

an obtainment unit operable to obtain, via the storage medium or the transmission medium, the attribute value, the encrypted digital work, an encrypted first secret key generated by encrypting the first secret key, an encrypted third secret key generated by encrypting the third secret key;

a second secret key storage unit operable to store the second secret key;

a first decryption unit operable to decrypt the encrypted third secret key obtained by the obtainment unit, the encrypted third secret key being decrypted using the second secret key stored in the second secret key storage unit;

a modification unit operable to generate a modified third secret key by modifying the third secret key decrypted by the first decryption unit, the third secret key being modified using the attribute value obtained by the obtainment unit and being modified without using the CRL;

a second decryption unit operable to decrypt the encrypted first secret key obtained by the obtainment unit, the encrypted first secret key being decrypted using the modified third secret key generated by the modification unit; and a third decryption unit operable to decrypt the encrypted digital work obtained by the obtainment, the encrypted digital work being decrypted using the first secret key decrypted by the second decryption unit.

24. An encryption apparatus that encrypts a digital work and outputs the encrypted digital work to a storage medium or a transmission medium, the encryption apparatus comprising:

a digital work storage unit operable to store a digital work;

a first secret key storage unit operable to store a first secret key, the first secret key being for encrypting the digital work;

a second secret key storage unit operable to store a second secret key associated with a decryption apparatus that decrypts an encrypted digital work;

a third secret key storage unit operable to store a third secret key, the third secret key being for encrypting the first secret key;

a certificate revocation list (CRL) storage unit operable to store a CRL, the CRL including a list of information specifying revoked public key certificates;

a first encryption unit operable to encrypt the third secret key stored in the third secret key storage unit, the third secret key being encrypted using the second secret key stored in the second secret key storage unit;

a second encryption unit operable to encrypt the first secret key stored in the first secret key storage unit, the first secret key being encrypted using the third secret key encrypted by the first encryption unit;

an attribute value calculation unit operable to calculate an attribute value associated with the information included in the CRL, the attribute value being calculated based on the CRL stored in the CRL storage unit;

a modification unit operable to generate a modified first secret key by modifying the first secret key stored in the first secret key storage unit, the first secret key being modified using the attribute value calculated by the attribute value calculation unit and being modified without using the CRL;

a third encryption unit operable to encrypt the digital work stored in the digital work storage unit, the digital work being encrypted using the modified first secret key generated by the modification unit; and an output unit operable to output, to the storage medium or the transmission medium, the attribute value calculated by the attribute value calculation unit, the third secret key encrypted by the first encryption unit, the first secret key encrypted by the second encryption unit and the digital work encrypted by the third encryption unit.

25. A copyright protection system for securely transmitting a digital work via a storage medium or a transmission medium, the copyright protection system comprising:

the encryption apparatus according to claim 24; and a decryption apparatus comprising:

an obtainment unit operable to obtain, via the storage medium or the transmission medium, the attribute value, the encrypted digital work, an encrypted first secret key generated by encrypting the first secret key, and an encrypted third secret key generated by encrypting the third secret key, the third secret key being for encrypting the first secret key;

a second secret key storage unit operable to store the second secret key;

a first decryption unit operable to decrypt the encrypted third secret key obtained by the obtainment unit, the encrypted third secret key being decrypted using the second secret key stored in the second secret key storage unit;

a second decryption unit operable to decrypt the encrypted first secret key obtained by the obtainment unit, the encrypted first secret key being decrypted using the third secret key decrypted by the first decryption unit;

a modification unit operable to generate a modified first secret key by modifying the first secret key decrypted by the second decryption unit, the first secret key being modified using the attribute value obtained by the obtainment unit and being modified without using the CRL; and a third decryption unit operable to decrypt the encrypted digital work obtained by the obtainment unit, the encrypted digital work being decrypted using the first modified secret key generated by the modification unit.

26. An encryption apparatus that encrypts a digital work and outputs the encrypted digital work to a storage medium or a transmission medium, the encryption apparatus comprising:
a digital work storage unit operable to store a digital work;
a first secret key storage unit operable to store a first secret key, the first secret key being for encrypting the digital work;
a second secret key storage unit operable to store a second secret key associated with a decryption apparatus that decrypts an encrypted digital work;
a fourth secret key storage unit operable to store a fourth secret key, the fourth secret key being for encrypting the first secret key;
a certificate revocation list (CRL) storage unit operable to store a CRL, the CRL including a list of information specifying revoked public key certificates;
a first encryption unit operable to encrypt the fourth secret key stored in the fourth secret key storage unit, the fourth secret key being encrypted using the second secret key stored in the second secret key storage unit;
a second encryption unit operable to encrypt the first secret key stored in the first secret key storage unit, the first secret key being encrypted using the fourth secret key stored in the fourth secret key storage unit;
an attribute value calculation unit operable to calculate an attribute value associated with the information included in the CRL, the attribute value being calculated based on the CRL stored in the CRL storage unit;
a secret key generation unit operable to generate a fifth secret key for encrypting a content based on the first secret key stored in the first secret key storage unit and the attribute value calculated by the attribute value calculation unit, the fifth secret key being generated without using the CRL;
a third encryption unit operable to encrypt the digital work stored in the digital work storage unit, the digital work being encrypted using the fifth secret key generated by the secret key generation unit; and
an output unit operable to output, to the storage medium or the transmission medium, the attribute value calculated by the attribute value calculation unit, the fourth secret key encrypted by the first encryption unit, the first secret key encrypted by the second encryption unit and the digital work encrypted by the third encryption unit.

27. The encryption apparatus according to claim 26, further comprising:
an information storage unit operable to store information specifying at least one of the storage medium or the transmission medium, and the content, wherein the secret key generation unit generates the fifth secret key based on the information stored in the information storage unit.

28. A copyright protection system for securely transmitting a digital work via a storage medium or a transmission medium, the copyright protection system comprising:
the encryption apparatus according to claim 26; and
a decryption apparatus comprising:
an obtainment unit operable to obtain, via the storage medium or the transmission medium, the attribute value, the encrypted digital work, an encrypted first secret key generated by encrypting the first secret key, and an encrypted fourth secret key generated by encrypting the fourth secret key;
a second secret key storage unit operable to store the second secret key;
a first decryption unit operable to decrypt the encrypted fourth secret key obtained by the obtainment unit, the encrypted fourth secret key being decrypted using the second secret key stored in the second secret key storage unit;
a second decryption unit operable to decrypt the encrypted first secret key obtained by the obtainment unit, the encrypted first secret key being decrypted using the fourth secret key decrypted by the first decryption unit;
a secret key generation unit operable to generate a fifth secret key for decrypting the encrypted digital work, the fifth secret key being based on the first secret key decrypted by the second decryption unit and the attribute value obtained by the obtainment unit; and
a third decryption unit operable to decrypt the encrypted digital work obtained by the obtainment unit, the encrypted digital work being decrypted using the fifth secret key generated by the secret key generation unit.

29. An encryption apparatus that encrypts a digital work and outputs the encrypted digital work to a storage medium or a transmission medium, the encryption apparatus comprising:
a digital work storage unit operable to store a digital work;
a medium identification information storage unit operable to store medium identification information, the medium identification information being for encrypting the digital work;
a first secret key storage unit operable to store a first secret key associated with a decryption apparatus that decrypts an encrypted digital work;
a second secret key storage unit operable to store a second secret key, the second secret key being for encrypting the medium identification information;
a certificate revocation list (CRL) storage unit operable to store a CRL, the CRL including a list of information specifying revoked public key certificates;
an attribute value calculation unit operable to calculate an attribute value associated with the information included in the CRL, the attribute value being calculated based on the CRL stored in the CRL storage unit;
a modification unit operable to generate a modified first secret key by modifying the first secret key stored in the first secret key storage unit, the first secret key being modified using the attribute value calculated by the attribute value calculation unit and being modified without using the CRL stored in the CRL storage unit;
a first encryption unit operable to encrypt the second secret key stored in the second secret key storage unit, the second secret key being encrypted using the modified first secret key generated by the modification unit;
a function conversion unit operable to convert the medium identification information stored in the medium identification information storage unit and the second secret key stored in the second secret key storage unit to obtain a function value, the function value being obtained by entering the medium identification information and the second secret key into a one-way function;
a second encryption unit operable to encrypt the digital work stored in the digital work storage unit, the digital work being encrypted using the function value obtained by the function conversion unit; and
an output unit operable to output, to the storage medium or the transmission medium, the attribute value stored in the digital work storage unit, the second secret key encrypted by the first encryption unit, the medium identification information stored in the medium identification information storage unit and the digital work encrypted by the third encryption unit.

30. The encryption apparatus according to claim 29, further comprising a verification data output unit operable to output, to the storage medium or the transmission medium, verification data that is a criterion for checking whether or not the second secret key decrypted by the decryption apparatus is correct.

31. The encryption apparatus according to claim 30,
wherein the verification data output unit outputs, to the storage medium or the transmission medium, data obtained by encrypting predetermined fixed-pattern data using the second secret key stored in the second secret key storage unit, the data obtained by encrypting the predetermined fixed-pattern data being output as the verification data.

32. The encryption apparatus according to claim 30,
wherein the verification data output unit operable to output, to the storage medium or the transmission medium, data obtained by encrypting the second secret key stored in the second secret key storage unit, using the second secret key, the data obtained by encrypted the second secret key being output as the verification data.

33. A copyright protection system for securely transmitting a digital work via a storage medium or a transmission medium, the copyright protection system comprising:
the encryption apparatus according to claim 29; and
a decryption apparatus comprising:
an obtainment unit operable to obtain, via the storage medium or the transmission medium, the attribute value, the encrypted digital work, the medium identification information, and an encrypted second secret key generated by encrypting the second secret key;
a first secret key storage unit operable to store the first secret key;
a modification unit operable to generate a modified first secret key by modifying the first secret key stored in the first secret key storage unit, the first secret key being modified using the attribute value obtained by the obtainment unit and being modified without using the CRL;
a first decryption unit operable to decrypt the encrypted second secret key obtained by the obtainment unit, the encrypted second secret key being decrypted using the first modified secret key generated by the modification unit;
a function conversion unit operable to convert the medium identification information obtained by the obtainment unit and the second secret key decrypted by the first decryption unit to obtain a function value, the function value being obtained by entering the medium identification information and the decrypted second secret key into a one-way function; and
a second decryption unit operable to decrypt the encrypted digital work obtained by the obtainment unit using the function value obtained by the function conversion unit.

34. An encryption apparatus that encrypts a digital work and outputs the encrypted digital work to a storage medium or a transmission medium, the encryption apparatus comprising:
a digital work storage unit operable to store a digital work;
a medium identification information storage unit operable to store medium identification information, the medium identification information being for encrypting the digital work;
a first secret key storage unit operable to store a first secret key associated with a decryption apparatus that decrypts an encrypted digital work;
a second secret key storage unit operable to store a second secret key, the second secret key being for encrypting the medium identification information;
a certificate revocation list (CRL) storage unit operable to store a CRL, the CRL including a list of information specifying revoked public key certificates;
a first encryption unit operable to encrypt the second secret key stored in the second secret key storage unit, the second secret key being encrypted using the first secret key stored in the first secret key storage unit;
an attribute value calculation unit operable to calculate an attribute value associated with the information included in the CRL, the attribute value being calculated based on the CRL stored in the CRL storage unit;
a modification unit operable to generate a modified second secret key by modifying the second secret key stored in the second secret key storage unit, the second secret key being modified using the attribute value calculated by the attribute value calculation unit and being modified without using the CRL stored in the CRL storage unit;
a function conversion unit operable to convert the medium identification information stored in the medium identification information storage unit and the modified second secret key generated by the modification unit to obtain a function value, the function value being obtained by entering the medium identification information and key into a one-way function;
a second encryption unit operable encrypt the digital work stored in the digital work storage unit, the digital work being encrypted using the function value obtained by the function conversion unit; and
an output unit operable to output, to the storage medium or the transmission medium, the attribute value calculated by the attribute value calculation unit, the second secret key encrypted by the first encryption unit, the medium identification information stored in the medium identification information storage unit and the digital work encrypted by the third encryption unit.

35. A copyright protection system for securely transmitting a digital work via a storage medium or a transmission medium, the copyright protection system comprising:
the encryption apparatus according to claim 34; and
a decryption apparatus comprising:
an obtainment unit operable to obtain, via the storage medium or the transmission medium, the attribute value, the encrypted digital work, the medium identification information, and an encrypted second secret key generated by encrypting the second secret key;
a first secret key storage unit operable to store the first secret key specific to the decryption apparatus;
a first decryption unit operable to decrypt the encrypted second secret key obtained by the obtainment unit, the encrypted second secret being decrypted using the first secret key stored in the first secret key storage unit;
a modification unit operable to modify the second secret key decrypted by the first decryption unit, the second secret key being modified using the attribute value obtained by the obtainment unit;

a function conversion unit operable to convert the medium identification information obtained by the obtainment unit and the modified second secret key modified by the modification unit to obtain a function value, the function value being obtained by entering the medium identification information and the modified second secret key to a one-way function; and a second decryption unit operable to decrypt the encrypted digital work obtained by the obtainment unit, the encrypted digital work being decrypted using the function value obtained by the function conversion unit.

36. An encryption apparatus that encrypts a digital work and outputs the encrypted digital work to a storage medium or a transmission medium, the encryption apparatus comprising:

a digital work storage unit operable to store a digital work;

a medium identification information storage unit operable to store medium identification information, the medium identification information being for encrypting the digital work;

a first secret key storage unit operable to store a first secret key associated with a decryption apparatus that decrypts an encrypted digital work;

a second secret key storage unit operable to store a second secret key, the second secret key being for encrypting the medium identification information;

a certificate revocation list (CRL) storage unit operable to store a CRL, the CRL including a list of information specifying revoked public key certificates;

a first encryption unit operable to encrypt the second secret key stored in the second secret key storage unit, the second secret key being encrypted using the first secret key stored in the first secret key storage unit;

a function conversion unit operable to convert the medium identification information stored in the medium identification information storage unit and the second secret key stored in the second secret key storage unit to obtain a function value, the function value being obtained by entering the medium identification information and the second secret key into a one-way function;

an attribute value calculation unit operable to calculate an attribute value associated with the information included in the CRL, the attribute value being calculated based on the CRL stored in the CRL storage unit;

a modification unit operable to generate a modified function value by modifying the function value obtained by the function conversion unit, the function value being modified using the attribute value calculated by the attribute calculation unit and being modified without using the CRL stored in the CRL storage unit;

a second encryption unit operable to encrypt the digital work stored in the digital work storage unit, the digital work being encrypted using the modified function value generated by the modification unit; and an output unit operable to output, to the storage medium or the transmission medium, the attribute value calculated by the attribute value calculation unit, the second secret key encrypted by the first encryption unit, the medium identification information stored in the medium identification information storage unit, and the digital work encrypted by the second encryption unit.

37. A copyright protection system for securely transmitting a digital work via a storage medium or a transmission medium, the copyright protection system comprising:

the encryption apparatus according to claim 36; and a decryption apparatus comprising:

an obtainment unit operable to obtain, via the storage medium or the transmission medium, the attribute value, the encrypted digital work, the medium identification information used for encrypting a digital work, and an encrypted second secret key generated by encrypting the second secret key;

a first secret key storage unit operable to store the first secret key;

a first decryption unit operable to decrypt the encrypted second secret key obtained by the obtainment unit, the encrypted second secret key being decrypted using the first secret key stored in the first secret key storage unit;

a function conversion unit operable to convert the medium identification information obtained by the obtainment unit and the second secret key decrypted by the first decryption unit to obtain a function value, the function value being obtained by entering the medium identification information and the decrypted second secret key into a one-way function;

a modification unit operable to generate a modified function value by modifying the function value obtained by the function conversion unit, the function value being modified using the attribute value obtained by the obtainment unit and being modified without using the CRL; and a second decryption unit operable to decrypt the encrypted digital work obtained by the obtainment unit, the encrypted digital work being decrypted using the modified function value generated by the modification unit.

38. A decryption apparatus that obtains an encrypted digital work via a storage medium or a transmission medium and decrypts the encrypted digital work, the decryption apparatus comprising:

an obtainment unit operable to obtain, via the storage medium or the transmission medium, (i) an attribute value associated with information included in a certificate revocation list (CRL), the CRL including a list of information specifying revoked public key certificates, (ii) an encrypted digital work, and (iii) an encrypted first secret key generated by encrypting a first secret key used for encrypting the digital work;

a second secret key storage unit operable to store a second secret key specific to the decryption apparatus;

a modification unit operable to generate a modified second secret key by modifying the second secret key stored in the second secret key storage unit, the second secret key being modified using the attribute value obtained by the obtainment unit and being modified without using the CRL;

a first decryption unit operable to decrypt the encrypted first secret key obtained by the obtainment unit, the encrypted first secret key being decrypted using the modified second secret key generated by the modification unit; and a second decryption unit operable to decrypt the encrypted digital work obtained by the obtainment unit, the encrypted digital work being decrypted using the first secret key decrypted by the first decryption unit.

39. The decryption apparatus according to claim 38, wherein the obtainment unit obtains a hash value of the CRL as the attribute value, and the modification unit modifies the second secret key by obtaining an exclusive OR value from the second secret key and the hash value.

40. A decryption apparatus that obtains an encrypted digital work via a storage medium or a transmission medium and decrypts the encrypted digital work, the decryption apparatus comprising:
an obtainment unit operable to obtain, via the storage medium or the transmission medium, (i) an attribute value associated with information included in a certificate revocation list (CRL), the CRL including a list of information specifying revoked public key certificates, (ii) an encrypted digital work, and (iii) an encrypted first secret key generated by encrypting a first secret key used for encrypting a digital work;
a second secret key storage unit operable to store a second secret key specific to the decryption apparatus;
a first decryption unit operable to generate a first secret key by decrypting the encrypted first secret key obtained by the obtainment unit, the encrypted first secret key being decrypted using the second secret key stored in the second secret key storage unit;
an attribute value calculation unit operable to calculate an attribute value associated with the information included in the CRL, the attribute value being calculated based on the CRL obtained by the obtainment unit;
a modification unit operable to generate a modified first secret key by modifying modify the first secret key decrypted by the first decryption unit, the first secret key being modified using the attribute value obtained by the obtainment unit and being modified without using the CRL; and
a second decryption unit operable to decrypt the encrypted digital work obtained by the obtainment unit, the encrypted digital work being decrypted using the modified first secret key generated by the modification unit.

41. A decryption apparatus that obtains an encrypted digital work via a storage medium or a transmission medium and decrypts the encrypted digital work, the decryption apparatus comprising:
an obtainment unit operable to obtain, via the storage medium or the transmission medium, (i) an attribute value associated with information included in a certificate revocation list (CRL), the CRL including a list of information specifying revoked public key certificates, (ii) an encrypted digital work, and (iii) medium identification information for encrypting a digital work;
a first secret key storage unit operable to store a first secret key specific to the decryption apparatus;
a modification unit operable to generate a modified first secret key by modifying the first secret key stored in the first secret key storage unit, the first secret key being modified using the attribute value obtained by the obtainment unit and being modified without using the CRL;
a function conversion unit operable to convert the medium identification information obtained by the obtainment unit and the modified first secret key generated by the modification unit to obtain a function value, the function value being obtained by entering the medium identification information and the modified first secret key into a one-way function; and
a first decryption unit operable to decrypt the encrypted digital work obtained by the obtainment unit, the encrypted digital work being decrypted using the function value obtained by the function conversion unit.

42. A decryption apparatus that obtains an encrypted digital work via a storage medium and a transmission medium and decrypts the encrypted digital work, the decryption apparatus comprising:
an obtainment unit operable to obtain, via the storage medium or the transmission medium, (i) an attribute value associated with information included in a certificate revocation list (CRL), the CRL including a list of information specifying revoked public key certificates, (ii) an encrypted digital work, and (iii) medium identification information for encrypting a digital work;
a first secret key storage unit operable to store a first secret key specific to the decryption apparatus;
a function conversion unit operable to convert the medium identification information obtained by the obtainment unit and the first secret key stored in the first secret key storage unit to obtain a function value, the function value being obtained by entering the medium identification information and the first secret key into a one-way function;
a modification unit operable to generate a modified function value by modifying the function value obtained by the function conversion unit, the function value being modified using the attribute value and being modified without using the CRL; and
a first decryption unit operable to decrypt the encrypted digital work obtained by the obtainment unit, the encrypted digital work being decrypted using the modified function value generated by the modification unit.

43. A decryption apparatus that obtains an encrypted digital work via a storage medium or a transmission medium and decrypts the encrypted digital work, the decryption apparatus comprising:
an obtainment unit operable to obtain, via the storage medium or the transmission medium, (i) an attribute value associated with information included in a certificate revocation list (CRL), the CRL including a list of information for specifying revoked public key certificates, (ii) an encrypted digital work, (iii) an encrypted first secret key generated by encrypting a first secret key, the first secret key being for encrypting a digital work, and (iv) an encrypted third secret key generated by encrypting a third secret key, the third secret key being for encrypting the first secret key;
a second secret key storage unit operable to store a second secret key specific to the decryption apparatus;
a modification unit operable to generate a modified second secret key by modifying the second secret key stored in the second secret key storage unit, the second secret key being modified using the attribute value obtained by the obtainment unit and being modified without using the CRL;
a first decryption unit operable to decrypt the encrypted third secret key obtained by the obtainment unit, the encrypted third secret key being decrypted using the modified second secret key generated by the modification unit;
a second decryption unit operable to decrypt the encrypted first secret key obtained by the obtainment unit, the encrypted first secret key being decrypted using the third secret key decrypted by the first decryption unit; and
a third decryption unit operable to decrypt the encrypted digital work obtained by the obtainment unit, the encrypted digital work being decrypted using the first secret key decrypted by the second decryption unit.

44. A decryption apparatus that obtains an encrypted digital work via a storage medium or a transmission medium and decrypts the encrypted digital work, the decryption apparatus comprising:
an obtainment unit operable to obtain, via the storage medium or the transmission medium, (i) an attribute value associated with information included in a certificate revocation list (CRL), the CRL including a list of information for specifying revoked public key certificates, (ii) an encrypted digital work, (iii) an encrypted first secret key generated by encrypting a first secret key, the first secret key being for encrypting the digital work, and (iv) an encrypted third secret key generated by encrypting a third secret key, the third secret key being for encrypting the first secret key;

a second secret key storage unit operable to store a second secret key specific to the decryption apparatus;

a first decryption unit operable to decrypt the encrypted third secret key obtained by the obtainment unit, the encrypted third secret key being decrypted using the second secret key stored in the second secret key storage unit;

a modification unit operable to generate a modified third secret key by modifying the third secret key decrypted by the first decryption unit, the third secret key being modified using the attribute value obtained by the obtainment unit and being modified without using the CRL;

a second decryption unit operable to decrypt the encrypted first secret key obtained by the obtainment unit, the encrypted first secret key being decrypted using the modified third secret key generated by the modification unit; and a third decryption unit operable to decrypt the encrypted digital work obtained by the obtainment, the encrypted digital work being decrypted using the first secret key decrypted by the second decryption unit.

45. A decryption apparatus that obtains an encrypted digital work via a storage medium or a transmission medium and decrypts the encrypted digital work, the decryption apparatus comprising:

an obtainment unit operable to obtain, via the storage medium or the transmission medium, (i) an attribute value associated with information included in a certificate revocation list (CRL), the CRL including a list of information specifying revoked public key certificates, (ii) an encrypted digital work, (iii) an encrypted first secret key generated by encrypting a first secret key, the first secret key being for encrypting a digital work, and (iv) an encrypted third secret key generated by encrypting a third secret key, the third secret key being for encrypting the first secret key;

a second secret key storage unit operable to store a second secret key specific to the decryption apparatus;

a first decryption unit operable to decrypt the encrypted third secret key obtained by the obtainment unit, the encrypted third secret key being decrypted using the second secret key stored in the second secret key storage unit;

a second decryption unit operable to decrypt the encrypted first secret key obtained by the obtainment unit, the encrypted first secret key being decrypted using the third secret key decrypted by the first decryption unit;

a modification unit operable to generate a modified first secret key by modifying the first secret key decrypted by the second decryption unit, the first secret key being modified using the attribute value obtained by the obtainment unit and being modified without using the CRL; and a third decryption unit operable to decrypt the encrypted digital work obtained by the obtainment unit, the encrypted digital work being decrypted using the modified first secret key generated by the modification unit.

46. A decryption apparatus that obtains an encrypted digital work via a storage medium or a transmission medium and decrypts the encrypted digital work, the decryption apparatus comprising:

an obtainment unit operable to obtain, via the storage medium or the transmission medium, (i) an attribute value associated with information included in a certificate revocation list (CRL), the CRL including a list of information specifying revoked public key certificates, (ii) an encrypted digital work, (iii) an encrypted first secret key generated by encrypting a first secret key, the first secret key being for encrypting a digital work, and (iv) an encrypted fourth secret key generated by encrypting a fourth secret key, the fourth secret key being for encrypting the first secret key;

a second secret key storage unit operable to store a second secret key specific to the decryption apparatus;

a first decryption unit operable to decrypt the encrypted fourth secret key obtained by the obtainment unit, the encrypted fourth secret key being decrypted using the second secret key stored in the second secret key storage unit;

a second decryption unit operable to decrypt the encrypted first secret key obtained by the obtainment unit, the encrypted first secret key being decrypted using the fourth secret key decrypted by the first decryption unit;

a secret key generation unit operable to generate a fifth secret key for decrypting the encrypted digital work, the fifth secret key being generated based on the first secret key decrypted by the second decryption unit and the attribute value obtained by the obtainment unit and being generated without using the CRL; and a third decryption unit operable to decrypt the encrypted digital work obtained by the obtainment unit, the encrypted digital work being decrypted using the fifth secret key generated by the secret key generation unit.

47. The decryption apparatus according to claim 46, wherein the obtainment unit obtains information specifying at least one of the storage medium or the transmission medium, and the content, and wherein the secret key generation unit generates the fifth secret key based on the information obtained by the obtainment unit.

48. A decryption apparatus that obtains an encrypted digital work via a storage medium or a transmission medium and decrypts the encrypted digital work, the decryption apparatus comprising:

an obtainment unit operable to obtain, via the storage medium or the transmission medium, (i) an attribute value associated with the information included in a certificate revocation list (CRL), the CRL including a list of information specifying revoked public key certificates, (ii) an encrypted digital work, (iii) medium identification information for encrypting a digital work, and (iv) an encrypted second secret key generated by encrypting a second secret key, the second secret key being for encrypting the medium identification information;

a first secret key storage unit operable to store a first secret key specific to the decryption apparatus;

a modification unit operable to generate a modified first secret key by modifying the first secret key stored in the first secret key storage unit, the first secret key being modified using the attribute value obtained by the obtainment unit and being modified without using the CRL;

a first decryption unit operable to decrypt the encrypted second secret key obtained by the obtainment unit, the encrypted second secret key being decrypted using the modified first secret key generated by the modification unit;

a function conversion unit operable to convert the medium identification information obtained by the obtainment unit and the second secret key decrypted by the first decryption unit to obtain a function value, the function value being obtained by entering the medium identification information and the second secret key into a one-way function; and a second decryption unit operable to decrypt the encrypted digital work obtained by the obtainment unit, the encrypted digital work being decrypted using the function value obtained by the function conversion unit.

49. A decryption apparatus that obtains an encrypted digital work via a storage medium or a transmission medium and decrypts the encrypted digital work, the decryption apparatus comprising:

an obtainment unit operable to obtain, via the storage medium or the transmission medium, (i) an attribute value associated with information included in a certificate revocation list (CRL), the CRL including a list of information specifying revoked public key certificates, (ii) an encrypted digital work, (iii) medium identification information for encrypting a digital work, and (iv) an encrypted second secret key generated by encrypting a second secret key, the second secret key being for encrypting the medium identification information;

a first secret key storage unit operable to store a first secret key specific to the decryption apparatus;

a first decryption unit operable to decrypt the encrypted second secret key obtained by the obtainment unit, the encrypted second secret key being decrypted using the first secret key stored in the first secret key storage unit;

a modification unit operable to generate a modified second secret key by modifying the second secret key decrypted by the first decryption unit, the second secret key being modified using the attribute value obtained by the obtainment unit and being modified without using the CRL;

a function conversion unit operable to convert the medium identification information obtained by the obtainment unit and the modified second secret key generated by the modification unit to obtain a function value, the function value being obtained by entering the medium identification information and the modified second secret key to a one-way function; and a second decryption unit operable to decrypt the encrypted digital work obtained by the obtainment unit, the encrypted digital work being decrypted using the function value obtained by the function conversion unit.

50. A decryption apparatus that obtains an encrypted digital work via a storage medium or a transmission medium and decrypts the encrypted digital work, the decryption apparatus comprising:

an obtainment unit operable to obtain, via the storage medium or the transmission medium, (i) an attribute value associated with information included in a certificate revocation list (CRL), the CRL including a list of information specifying revoked public key certificates, (ii) an encrypted digital work, (iii) medium identification information for encrypting a digital work, and (iv) an encrypted second secret key generated by encrypting a second secret key, the second secret key being for encrypting the medium identification information;

a second secret key storage unit operable to store a second secret key specific to the decryption apparatus;

a first decryption unit operable to decrypt the encrypted first secret key obtained by the obtainment unit, the encrypted first secret key being decrypted using the second secret key stored in the second secret key storage unit;

a function conversion unit operable to convert the medium identification information obtained by the obtainment unit and the second secret key decrypted by the first decryption unit to obtain a function value, the function value being obtained by entering the medium identification information and the second secret key into a one-way function;

a modification unit operable to generate a modified function value by modifying the function value obtained by the function conversion unit, the function value being modified using the attribute value obtained by the obtainment unit and being modified without using the CRL; and a second decryption unit operable to decrypt the encrypted digital work obtained by the obtainment unit, the encrypted digital work being decrypted using the modified function value generated by the modification unit.

51. A decryption apparatus comprising: an obtainment apparatus for obtaining an encrypted digital work via a storage medium or a transmission medium; and an application program for decrypting the encrypted digital work, wherein the obtainment apparatus includes:

an obtainment unit operable to obtain, via the storage medium or the transmission medium, (i) a certificate revocation list (CRL), the CRL including a list of information specifying revoked public key certificates, (ii) an encrypted digital work, and (iii) an encrypted first secret key generated by encrypting a first secret key, the first secret key being for encrypting a digital work; and a first encrypted communication unit operable to judge a validity of a public key held by the application program with reference to the CRL, and transmit, to the application program, at least the encrypted first secret key in encrypted form using the public key, in a case of judging that the public key is valid, and wherein the application program includes:

a second encrypted communication unit operable to judge a validity of a public key held by the obtainment apparatus with reference to the CRL, and transmits, to the obtainment apparatus, at least the encrypted first secret key in encrypted form using the public key;

a second secret key storage unit operable to store a second secret key specific to the decryption apparatus;

an attribute value calculation unit operable to calculate an attribute value which depends on the information in the CRL, based on the obtained CRL;

a modification unit operable to generate a modified second secret key by modifying the second secret key stored in the second secret key storage unit, the second secret key being modified using the attribute value calculated by the attribute value calculation unit and being modified without using the CRL;

a first decryption unit operable to decrypt the encrypted first secret key obtained by the obtainment unit, the encrypted first secret key being decrypted using the modified second secret key generated by the modification unit; and a second decryption unit operable to decrypt the encrypted digital work obtained by the obtainment unit, the encrypted digital work being decrypted using the first secret key decrypted by the first decryption unit.

52. A decryption apparatus comprising: an obtainment apparatus for obtaining an encrypted digital work via a storage medium or a transmission medium; and an application program for decrypting the encrypted digital work, wherein the obtainment apparatus includes:
an obtainment unit operable to obtain, via the storage medium or the transmission medium, (i) a certificate revocation list (CRL), the CRL including a list of information specifying revoked public key certificates, (ii) an encrypted digital work, and (iii) an encrypted first secret key generated by encrypting a first secret key, the first secret key being for encrypting the digital work; and
a first encryption communication unit operable to judge a validity of a public key held by the application program with reference to the CRL, and transmit to the application program, at least the CRL in encrypted form using the public key, in a case of judging that the public key is valid, wherein the application program includes:
a second encrypted communication unit operable to judge a validity of a public key held by the obtainment apparatus with reference to the CRL, and transmit, to the obtainment apparatus, at least the encrypted first secret key in encrypted form using the public key, in a case of judging that the public key is valid; and
an attribute value calculation unit operable to calculate an attribute value which depends on the information in the CRL, the attribute value being calculated based on the CRL obtained in the encrypted communication, and wherein the obtainment apparatus further includes:
a second secret key storage unit operable to store a second secret key specific to the decryption apparatus;
a modification unit operable to generate a modified second secret key by modifying the second secret key stored in the second secret key storage unit, the second secret key being modified using the attribute value calculated by the attribute value calculation unit and being modified without using the CRL;
a first decryption unit operable to decrypt the encrypted first secret key obtained by the obtainment unit, the encrypted first secret key being decrypted using the modified second secret key generated by the modification unit; and
a second decryption unit operable to decrypt the encrypted digital work obtained by the obtainment unit, the encrypted digital work being decrypted using the first secret key decrypted by the first decryption unit.

53. A secret key generation apparatus that outputs a secret key for decryption to a decryption apparatus that decrypts an encrypted digital work, the secret key generation apparatus comprising:
an obtainment unit operable to obtain, via a storage medium or a transmission medium, (i) an attribute value associated with depends on information included in a certificate revocation list (CRL), the CRL including a list of information specifying revoked public key certificates, and (ii) an encrypted first secret key generated by encrypting a first secret key, the first secret key being for encrypting a digital work;
a second secret key storage unit operable to store a second secret key specific to the secret key generation apparatus;
a modification unit operable to generate a modified second secret key by modifying the second secret key stored in the second secret key storage unit, the second secret key being modified using the attribute value obtained by the obtainment unit and being modified without using the CRL;
a first decryption unit operable to decrypt the encrypted first secret key obtained by the obtainment unit, the encrypted first secret key being decrypted using the modified second secret key generated by the modification unit; and
an output unit operable to output, to the decryption apparatus, the first secret key decrypted by the first decryption unit, the first secret key being output as the secret key for decrypting the digital work.

54. The secret key generation apparatus according to claim 53, further comprising:
a judgment unit operable to judge whether or not the first secret key decrypted by the first decryption unit is a correct first secret key for encrypting the digital work.

55. The secret key generation apparatus according to claim 54, wherein the judgment unit includes:
a verification data obtainment unit operable to obtain, from the storage medium or the transmission medium, verification data that is a criterion for the judgment made by the judgment unit;
a verification data decryption unit operable to decrypt the obtained verification data using the first secret key decrypted by the first decryption unit; and
a subunit operable to judge whether or not the data obtained in the decryption performed by the verification data decryption unit corresponds to a predetermined fixed-pattern, and judge that the first secret key is correct in a case where the data corresponds to the fixed-pattern.

56. The secret key generation apparatus according to claim 54, wherein the judgment unit includes:
a verification data obtainment unit operable to obtain, from the storage medium or the transmission medium, verification data that is a criterion for the judgment of the judgment unit;
a first secret key encryption unit operable to encrypt the first secret key decrypted by the first decryption unit using the first secret key; and
a subunit operable to judge whether or not the first secret key encrypted by the first secret key encryption unit corresponds to the verification data obtained by the verification data obtainment unit, and judge that the first secret key is correct in a case where the first secret key corresponds to the verification data.

57. The secret key generation apparatus according to claim 54, wherein the judgment unit includes:
a verification data obtainment unit operable to obtain, from the storage medium or the transmission medium, verification data that is a criterion for the judgment of the judgment unit;
a verification data decryption unit operable to decrypt the verification data obtained by the verification data obtainment unit using the first secret key decrypted by the first decryption unit; and
a subunit operable to judge whether or not a value decrypted by the verification data decryption unit corresponds to the first secret key decrypted by the first decryption unit, and judge that the first secret key is correct in a case where the value corresponds to the first secret key.

58. The secret key generation apparatus according to claim 53,
wherein the obtainment unit obtains a hash value of the CRL as the attribute value, and the modification unit modifies the second secret key by obtaining an exclusive OR value from the second secret key and the hash value.

59. A secret key generation apparatus that outputs a secret key for decryption to a decryption apparatus that decrypts an encrypted digital work, the secret key generation apparatus comprising:
an obtainment unit operable to obtain, via a storage medium or a transmission medium, (i) an attribute value associated with information included in a certificate revocation list (CRL), the CRL including a list of information specifying revoked public key certificates, and (ii) an encrypted first secret key generated by encrypting a first secret key used for encrypting a digital work;
a second secret key storage unit operable to store a second secret key specific to the decryption apparatus;
a first decryption unit operable to decrypt the encrypted first secret key obtained by the obtainment unit, the encrypted first secret key being decrypted using the second secret key stored in the second secret key storage unit;
a modification unit operable to generate a modified first secret key by modifying the first secret key decrypted by the first decryption unit, the first secret key being modified using the attribute value obtained by the obtainment unit being modified without using the CRL; and
an output unit operable to output the modified first secret key generated by the modification unit as the secret key for decrypting the digital work.

60. The secret key generation apparatus according to claim 59, further comprising a judgment unit operable to judge whether or not the first secret key modified by the modification unit is a correct first secret key for encrypting the digital work.

61. The secret key generation apparatus according to claim 60, wherein the judgment unit includes:
a verification data obtainment unit operable to obtain, from the storage medium or the transmission medium, verification data that is a criterion for the judgment of the judgment unit;
a verification data decryption unit operable to decrypt the obtained verification data using the first secret key modified by the modification unit; and
a subunit operable to judge whether or not the data obtained in the decryption performed by the verification data decryption unit corresponds to a predetermined fixed-pattern, and judge that the first secret key is correct in a case where the data corresponds to the fixed-pattern.

62. The secret key generation apparatus according to claim 60, wherein the judgment unit includes:
a verification data obtainment unit operable to obtain, from the storage medium or the transmission medium, verification data that is a criterion for the judgment of the judgment unit;
a first secret key encryption unit operable to encrypt the first secret key modified by the modification unit, the first secret key being encrypted using the first secret key; and
a subunit operable to judge whether or not the first secret key encrypted by the first secret key encryption unit corresponds to the verification data obtained by the verification data obtainment unit, and judge that the first secret key is correct in a case where the first secret key corresponds to the verification data.

63. The secret key generation apparatus according to claim 60, wherein the judgment unit includes:
a verification data obtainment unit operable to obtain, from the storage medium or the transmission medium, verification data that is a criterion for the judgment of the judgment unit;
a verification data decryption unit operable to decrypt the verification data obtained by the verification data obtainment unit, the verification data being decrypted using the first secret key modified by the modification unit; and
a judgment unit operable to judge whether or not a value decrypted by the verification data decryption unit corresponds to the first secret key modified by the modification unit, and judge that the first secret key is correct in a case where the value corresponds to the first secret key.

64. A secret key generation apparatus that outputs a secret key for decryption to a decryption apparatus that decrypts an encrypted digital work, the secret key generation apparatus comprising:
an obtainment unit operable to obtain, via a storage medium or a transmission medium, (i) an attribute associated with the information included in a certificate revocation list (CRL), the CRL including a list of information specifying revoked public key certificates, and (ii) medium identification information for encrypting the digital work;
a first secret key storage unit operable to store a first secret key specific to the decryption apparatus;
a modification unit operable to generate a modified first secret key by modifying the first secret key stored in the first secret key storage unit, the first secret key being modified using the attribute value obtained by the obtainment unit and being modified without using the CRL;
a function conversion unit operable to convert the medium identification information obtained by the obtainment unit and the modified first secret key generated by the modification unit to obtain a function value, the function value being obtained by entering the medium identification information and the modified first secret key into a one-way function; and
an output unit operable to output the function value obtained by the function conversion unit as the secret key for decrypting the digital work.

65. A secret key generation apparatus that outputs a secret key for decryption to-a decryption apparatus that decrypts an encrypted digital work, the secret key generation apparatus comprising:
an obtainment unit operable to obtain, via a storage medium or a transmission medium, (i) an attribute value associated with information included in a certificate revocation list (CRL), the CRL including a list of information specifying revoked public key certificates, and (ii) medium identification information for encrypting the digital work;
a first secret key storage unit operable to store a first secret key specific to the decryption apparatus;
a function conversion unit operable to convert the medium identification information obtained by the obtainment unit and the first secret key stored in the first secret key storage unit to obtain a function value, the function value being obtained by entering the medium identification information and the first secret key into a one-way function;

a modification unit operable to generate a modified function value by modifying the function value obtained by the function conversion unit, the function value being modified using the attribute value obtained by the obtainment unit and being modified without using the CRL; and an output unit operable to output the modified function value generated by the modification unit as the secret key for decrypting the digital work.

66. A secret key generation apparatus that outputs a secret key for decryption to a decryption apparatus that decrypts an encrypted digital work, the secret key generation apparatus comprising:

an obtainment unit operable to obtain, via a storage medium or a transmission medium, (i) an attribute value associated with information included in a certificate revocation list (CRL), the CRL including a list of information specifying revoked public key certificates, (ii) an encrypted first secret key generated by encrypting a first secret key, the first key being for encrypting the digital work, and (iii) an encrypted second secret key generated by encrypting a second secret key, the second secret key being for encrypting the first secret key;

a third secret key storage unit operable to store a third secret key specific to the secret key generation apparatus;

a modification unit operable to generate a modified third secret key by modifying the third secret key stored in the third secret key storage unit, the third secret key being modified using the attribute value obtained by the obtainment unit and being modified without using the CRL;

a first decryption unit operable to decrypt the encrypted second secret key obtained by the obtainment unit, the encrypted second secret key being decrypted using the modified third secret key generated by the modification unit;

a second decryption unit operable to decrypt the encrypted first secret key obtained by the obtainment unit, the encrypted first secret key being decrypted using the second secret key decrypted by the first decryption unit; and an output unit operable to output, to the decryption apparatus, the first secret key decrypted by the second decryption unit, as the secret key for decrypting the digital work.

67. The secret key generation apparatus according to claim 66, further comprising a judgment unit operable to judge whether or not the second secret key decrypted by the first decryption unit is a correct second secret key for encrypting the first secret key.

68. The secret key generation apparatus according to claim 67, wherein the judgment unit includes:

a verification data obtainment unit operable to obtain, from the storage medium or the transmission medium, verification data that is a criterion for the judgment from the judgment unit;

a verification data decryption unit operable to decrypt the obtained verification data using the second secret key decrypted by the first decryption unit; and a subunit operable to judge whether or not the data obtained in the decryption performed by the verification data decryption unit corresponds to a predetermined fixed-pattern, and judge that the second secret key is correct in a case where the data corresponds to the fixed-pattern.

69. The secret key generation apparatus according to claim 67, wherein the judgment includes:

a verification data obtainment unit operable to obtain, from the storage medium or the transmission medium, verification data that is a criterion for the judgment from the judgment unit;

a second secret key encryption unit operable to encrypt the second secret key decrypted by the first decryption unit, the second secret key being encrypted using the second secret key; and a subunit operable to judge whether or not the second secret key encrypted by the second secret key encryption unit corresponds to the verification data obtained by the verification data obtainment unit, and judge that the second secret key is correct in a case where the second secret key corresponds to the verification data.

70. The secret key generation apparatus according to claim 67, wherein the judgment unit includes:

a verification data obtainment unit operable to obtain, from a storage medium or a transmission medium, verification data that is a criteria for the judgment from the judgment unit;

a verification data decryption unit operable to decrypt the verification data obtained by the verification data obtainment unit, the verification data being decrypted using the second secret key decrypted by the first decryption unit; and a judgment unit operable to judge whether or not a value decrypted by the verification data decryption unit corresponds to the second secret key decrypted by the first decryption unit, and judge that the second secret key is correct in a case where the value corresponds to the second secret key.

71. A secret key generation apparatus that outputs a secret key for decryption to a decryption apparatus that decrypts an encrypted digital work, the secret key generation apparatus comprising:

an obtainment unit operable to obtain, via a storage medium or a transmission medium, (i) an attribute value associated with information included in a certificate revocation list (CRL), the CRL including a list of information specifying revoked public key certificates, (ii) an encrypted first secret key generated by encrypting a first secret key, the first secret key being used for encrypting the digital work, and (iii) an encrypted second secret key generated by encrypting a second secret key, the second secret key being for encrypting the first secret key;

a third secret key storage unit operable to store a third secret key specific to the decryption apparatus;

a first decryption unit operable to decrypt the encrypted second secret key obtained by the obtainment unit, the encrypted second secret key being decrypted using the third secret key stored in the third secret key storage unit;

a modification unit operable to generate a modified second secret key by modifying the second secret key decrypted by the first decryption unit, the second secret key being modified using the attribute value obtained by the obtainment unit and being modified without using the CRL;

a second decryption unit operable to decrypt the encrypted first secret key obtained by the obtainment unit, the encrypted first secret key being decrypted using the modified second secret key generated by the modification unit; and an output unit operable to output, to the decryption apparatus, the first secret key decrypted by the second decryption unit, as the secret key for decrypting the digital work.

72. A secret key generation apparatus that outputs a secret key for decryption to a decryption apparatus that decrypts an encrypted digital work, the secret key generation apparatus comprising:
an obtainment unit operable to obtain, via a storage medium or a transmission medium, (i) an attribute value associated with information included in a certificate revocation list (CRL), the CRL including a list of information specifying revoked public key certificates, (ii) an encrypted first secret key generated by encrypting a first secret key, the first key being used for encrypting the digital work, and (iii) an encrypted second secret key generated by encrypting a second secret key, the second secret key being used for encrypting the first secret key;
a third secret key storage unit operable to store a third secret key specific to the decryption apparatus;
a first decryption unit operable to decrypt the encrypted second secret key obtained by the obtainment unit, the encrypted second secret key being decrypted using a third secret key stored in the third secret key storage unit;
a second decryption unit operable to decrypt the encrypted first secret key obtained by the obtainment unit, the encrypted first secret key being decrypted using the second secret key decrypted by the first decryption unit;
a modification unit operable to generate a modified first secret key by modifying the first secret key decrypted by the second decryption unit, the first secret key being modified using the attribute value obtained by the obtainment unit and being modified without using the CRL; and
an output unit operable to output, to the decryption apparatus, the modified first secret key modified by the modification unit as the secret key for decrypting the digital work.

73. A secret key generation apparatus that outputs a secret key for decryption to a decryption apparatus that decrypts an encrypted digital work, the secret key generation apparatus comprising:
an obtainment unit operable to obtain (i) an attribute value associated with information included in a certificate revocation list (CRL), the CRL including a list of information specifying revoked public key certificates, (ii) an encrypted digital work (iii), an encrypted secret key generated by encrypting a first secret key, the first secret key being for encrypting the digital work, and (iv) an encrypted fourth secret key generated by encrypting a fourth secret key, the fourth secret key being encrypting the first secret key;
a second secret key storage unit operable to store a second secret key specific to the decryption apparatus;
a first decryption unit operable to decrypt the encrypted fourth secret key obtained by the obtainment unit, the encrypted fourth secret key being decrypted using the second secret key stored in the second secret key storage unit;
a second decryption unit operable to decrypt the encrypted first secret key obtained by the obtainment unit, the encrypted first secret key being decrypted using the fourth secret key decrypted by the first decryption unit;
a secret key generation unit operable to generate a fifth secret key for decrypting the encrypted digital work based on the first secret key decrypted by the second decryption unit and the attribute value obtained by the obtainment unit and generate the fifth secret key without using the CRL; and
an output unit operable to output, to the decryption apparatus, the fifth secret key generated by the secret key generation unit, as the secret key for decryption.

74. The secret key generation apparatus according to claim 73,
wherein the obtainment unit obtains information specifying at least one of the storage medium or the transmission medium, and the content, and wherein the secret key generation unit generates the fifth secret key based on the information obtained by the obtainment unit.

75. A secret key generation apparatus that outputs a secret key for decryption to a decryption apparatus that decrypts an encrypted digital work, the secret key generation apparatus comprising:
an obtainment unit operable to obtain, via a storage medium or a transmission medium, (i) an attribute value associated with information included in a certificate revocation list (CRL), the CRL including a list of information specifying revoked public key certificates, (ii) medium identification information for encrypting the digital work, and (iii) an encrypted first secret key generated by encrypting a first secret key, the first secret key being for encrypting the medium identification information;
a second secret key storage unit operable to store a second secret key specific to the secret key generation apparatus;
a modification unit operable to generate a modified second secret key by modifying the second secret key stored in the second secret key storage unit, the second secret key being modified using the attribute value obtained by the obtainment unit and being modified without using the CRL;
a first decryption unit operable to decrypt the encrypted first secret key obtained by the obtainment unit, the encrypted first secret key being decrypted using the modified second secret key generated by the modification unit;
a function conversion unit operable to convert the medium identification information obtained by the obtainment unit and the first secret key decrypted by the first decryption unit to obtain a function value, the function value being obtained by entering the medium identification information and the first secret key into a one-way function; and
an output unit operable to output, to the decryption apparatus, the function value obtained by the function conversion unit, as the secret key for decrypting the digital work.

76. The secret key generation apparatus according to claim 75, further comprising:
a judgment unit operable to judge whether or not the first secret key decrypted by the first decryption unit is a correct first secret key for encrypting the medium identification information.

77. The secret key generation apparatus according to claim 76, wherein the judgment unit includes:
a verification data obtainment unit operable to obtain, from the storage medium or the transmission medium, verification data that is a criterion for the judgment from the judgment unit;
a verification data decryption unit operable to decrypt the obtained verification data using the first secret key decrypted by the first decryption unit; and a subunit operable to judge whether or not the data obtained in the decryption performed by the verification data decryption unit corresponds to a predetermined fixed-pattern, and judge that the first secret key is correct in a case where the data corresponds to the fixed-pattern.

78. The secret key generation apparatus according to claim 76, wherein the judgment unit includes:
a verification data obtainment unit operable to obtain, from the storage medium or the transmission medium, verification data that is a criterion for the judgment from the judgment unit;
a first secret key encryption unit operable to encrypt the first secret key decrypted by the first decryption unit, the first secret key being encrypted using the first secret key; and
a subunit operable to judge whether or not the first secret key encrypted by the first secret key encryption unit corresponds to the verification data obtained by the verification data obtainment unit, and judge that the first secret key is correct in a case where the first secret key corresponds to the verification data.

79. The secret key generation apparatus according to claim 76, wherein the judgment unit includes:
a verification data obtainment unit operable to obtain, from the storage medium or the transmission medium, verification data that is a criterion for the judgment from the judgment unit;
a verification data decryption unit operable to decrypt the verification data obtained by the verification data obtainment unit, the verification data being decrypted using the first secret key decrypted by the first decryption unit; and
a subunit operable to judge whether or not a value decrypted by the verification data decryption unit corresponds to the first secret key decrypted by the first decryption unit, and judge that the first secret key is correct in a case where the value corresponds to the first secret key.

80. A secret key generation apparatus that outputs a secret key for decryption to a decryption apparatus that decrypts an encrypted digital work, the secret key generation apparatus comprising:
an obtainment unit operable to obtain, via a storage medium or a transmission medium, (i) an attribute value associated with information included in a certificate revocation list (CRL), the CRL including a list of information specifying revoked public key certificates, (ii) medium identification information for encrypting the digital work, and (iii) an encrypted first secret key generated by encrypting a first secret key, the first secret key being for encrypting the medium identification information;
a second secret key storage unit operable to store a second secret key specific to the decryption apparatus;
a first decryption unit operable to decrypt the encrypted first secret key obtained by the obtainment unit, the encrypted first secret key being decrypted using the second secret key stored in the second secret key storage unit;
a modification unit operable to generate a modified first secret key by modifying the first secret key decrypted by the first decryption unit, the first secret key being modified using the attribute value obtained by the obtainment unit and being modified without using the CRL;
a function conversion unit operable to convert the medium identification information obtained by the obtainment unit and the modified first secret key generated by the modification unit to obtain a function value, the function value being obtained by entering the medium identification information and the modified first secret key into a one-way function; and
an output unit operable to output, to the decryption apparatus, the function value obtained by the function conversion unit, as the secret key for decrypting the digital work.

81. A secret key generation apparatus that outputs a secret key for decryption to a decryption apparatus that decrypts an encrypted digital work, the secret key generation apparatus comprising:
an obtainment unit operable to obtain, via a storage medium or a transmission medium, (i) an attribute value associated with information included in a certificate revocation list (CRL), the CRL including a list of information specifying revoked public key certificates, (ii) medium identification information for encrypting the digital work, and (iii) an encrypted first secret key generated by encrypting a first secret key, the first secret key being for encrypting the medium identification information;
a second secret key storage unit operable to store a second secret key specific to the decryption apparatus;
a first decryption unit operable to decrypt the encrypted first secret key obtained by the obtainment unit, the encrypted first secret key being decrypted using the second secret key stored in the second secret key storage unit;
a function conversion unit operable to convert the medium identification information obtained by the obtainment unit and the first secret key decrypted by the first decryption unit to obtain a function value, the function value being obtained by entering the medium identification information and the first secret key into a one-way function;
a modification unit operable to generate a modified function value by modifying the function value obtained by the function conversion unit, the function value being modified using the attribute value obtained by the obtainment unit and being modified without using the CRL; and
an output unit operable to output, to the decryption apparatus, the modified function value generated by the modification unit, as the secret key for decrypting the digital work.

82. An encryption method of using an encryption apparatus that encrypts a digital work and outputs the encrypted digital work to a storage medium or a transmission medium, the encryption method comprising:
repeating, for a first through (n−1)th (n is 2 or greater) secret keys, a sequence of encrypting a digital work using a first secret key out of n secret keys, and encrypting an (i−1)th ($2 \leq i \leq n$) secret key using an i th secret key;
outputting the encrypted first through (n−1)th secret keys to either the storage medium or the transmission medium;
modifying a secret key, prior to encryption, using an attribute value associated with information included in a certificate revocation list (CRL) and without using the CRL, the CRL including a list of information specifying revoked public key certificates, in a case where at least one of the first through (n−1)th secret keys is used in the encryption of the digital work; and
outputting the attribute value to the medium.

83. A computer-readable recording medium having a program recorded thereon, the program for using an encryption apparatus that encrypts a digital work and outputs the encrypted digital work via a storage medium or a transmission medium, and the program causing a computer to execute the encryption method according to claim 82.

84. An encryption method of using an encryption apparatus that encrypts a digital work and outputs the encrypted digital work to a storage medium or a transmission medium, the encryption method comprising:

repeating, for a first through an (n−1)th (n is 1 or greater) secret keys, a sequence of encrypting a digital work using converted medium identification information after converting the medium identification information using a one-way function using a first secret key out of n secret keys, and encrypting an (i−1)th (2≦i≦n) secret key using an i th secret key, in a case where n is 2 or greater;

outputting the encrypted first through (n−1)th secret keys to the either the storage medium or the transmission medium;

modifying, prior to encryption or conversion, one of (i) a secret key, using an attribute value associated with information included in a certificate revocation list (CRL) and without using the CRL, the CRL including a list of information specifying revoked public key certificates, and (ii) the converted medium identification information, using the attribute value, in a case where at least one of the first through n th secret keys is used in the encryption of the digital work or the conversion of the medium identification information; and outputting the attribute value to the medium.

85. A decryption method of using a decryption apparatus that decrypts an encrypted digital work, the decryption method comprising:

repeating, for n (n is 2 or greater) encrypted secret keys, a sequence of decrypting, using a pre-hold secret key, (i) a first encrypted secret key out of the n encrypted secret keys, after obtaining, via a storage medium or a transmission medium, an attribute value associated with information included in a certificate revocation list (CRL), the CRL including a list of information specifying revoked public key certificates, (ii) an encrypted digital work, and (iii) the n encrypted secret keys, and decrypting a second encrypted secret key using the first secret key obtained as a result of the decrypting of the first encrypted secret key;

decrypting a digital work using the n th secret key obtained in a last decryption; and modifying, prior to decryption, a secret key to be used for the decryption of the digital work, using the attribute value and without using the CRL, for at least one of the decryptions performed on the first through n th encrypted secret keys.

86. A computer-readable recording medium having a program recorded thereon, the program for using a decryption apparatus that obtains an encrypted digital work via a storage medium or a transmission medium, and decrypts the encrypted digital work, and the program causing a computer to execute the decryption method according to claim 85.

87. A decryption method of using a decryption apparatus that decrypts an encrypted digital work, the decryption method comprising:

repeating, for n (n is 1 or greater) encrypted secret keys, a sequence of decrypting, using a pre-hold secret key, (i) a first encrypted secret key out of the n encrypted secret keys, after obtaining, via a storage medium or a transmission medium, the following: an attribute value associated with information included in a certificate revocation list (CRL), the CRL including a list of information specifying revoked public key certificates (ii) an encrypted digital work, (iii) medium identification information, and (iv) the n encrypted secret keys, and decrypting a second encrypted secret key using a first secret key obtained in the decryption of the first encrypted secret key, in a case where n is 2 or greater, converting the medium identification information using a one-way function using the n th secret key obtained in a last decryption;

decrypting a digital work using the converted medium identification information; and modifying, prior to decryption or conversion, one of (i) a secret key to be used for the decryption or the conversion, using the attribute value and without using the CRL, and (ii) the medium identification information obtained in the conversion, using the attribute value and without using the CRL, in at least one of the following cases: a decryption performed on the first through n th encrypted secret keys; and a conversion performed on the medium identification information.

88. A secret key generation method of using a secret key generation apparatus that outputs a secret key for decryption to a decryption apparatus that decrypts an encrypted digital work, the secret key generation method comprising:

repeating, for n (n is 2 or greater) encrypted secret keys, a sequence of decrypting, using a pre-hold secret key, (i) a first encrypted secret key out of the n encrypted secret keys, after obtaining, via a storage medium or a transmission medium, an attribute value associated with information included in a certificate revocation list (CRL), the CRL including a list of information specifying revoked public key certificates and (ii) the n encrypted secret keys, and decrypting a second encrypted secret key using the first secret key obtained in the decryption of the first encrypted secret key;

outputting the n th secret key obtained in a last decryption to the decryption apparatus; and modifying, prior to decryption, a secret key to be used for the decryption of the digital work, using the attribute value and without using the CRL, for at least one of the decryptions performed on the first through n th encrypted secret keys.

89. A computer-readable recording medium having a program recorded thereon, the program for using a secret key generation apparatus that outputs a secret key for decryption to a decryption apparatus that decrypts an encrypted digital work, and the program causing a computer to execute the secret key generation method according to claim 88.

90. A secret key generation method of using a secret key generation apparatus that outputs a secret key for decryption to a decryption apparatus that decrypts an encrypted digital work, the secret key generation method comprising:

repeating, for n (n is 1 or greater) encrypted secret keys, a sequence of decrypting, using a pre-hold secret key, (i) a first encrypted secret key out of the n encrypted secret keys, after obtaining, via a storage medium or a transmission medium, an attribute value associated with information included in a certificate revocation list (CRL), the CRL including a list of information specifying revoked public key certificates, (ii) medium identification information, and (iii) the n encrypted secret keys, and decrypting a second encrypted secret key using the first secret key obtained in the decryption of the first encrypted secret key, in a case where n is 2 or greater;

converting the medium identification information using a one-way function using the n th secret key obtained in a last decryption;

outputting the converted medium identification information to the decryption apparatus; and modifying, prior to decryption or conversion, one of (i) a secret key to be used for the decryption or the conversion, using the attribute value and without using the CRL and (ii) the converted medium identification information, using the attribute value and without using the CRL, in at least one of the following cases: a decryption performed on the first through n th encrypted secret keys; and a conversion performed on the medium identification information.

91. A storage medium for storing an encrypted digital work encrypted by an encryption apparatus that encrypts a digital work, wherein the encryption apparatus includes:

a digital work storage unit operable to store a digital work;

a first secret key storage unit operable to store a first secret key, the first secret key being for encrypting the digital work;

a second secret key storage unit operable to store a second secret key associated with a decryption apparatus that decrypts an encrypted digital work;

a certificate revocation list (CRL) storage unit operable to store a CRL, the CRL including a list of information specifying revoked public key certificates;

an attribute value calculation unit operable to calculate an attribute value associated with the information included in the CRL, the attribute value being calculated based on the CRL stored in the CRL storage unit;

a modification unit operable to generate a modified second secret key by modifying the second secret key stored in the second secret key storage unit, the second secret key being modified using the attribute value calculated by the attribute value calculation unit and being modified without using the CRL;

a first encryption unit operable to encrypt the first secret key stored in the first secret key storage unit, the first secret key being encrypted using the modified second secret key generated by the modification unit;

a second encryption unit operable to encrypt the digital work stored in the digital work storage unit, the digital work being encrypted using the first secret key stored in the first secret key storage unit; and an output unit operable to output, to the storage medium, the CRL stored in the CRL storage unit, the attribute value calculated by the attribute value calculation unit, the first secret key encrypted by the first encryption unit, and the digital work encrypted by the second encryption unit, and wherein the CRL stored in the CRL storage unit, the attribute value calculated by the attribute value calculation unit, the first secret key encrypted by the first encryption unit, and the digital work encrypted by the second encryption unit are stored.

* * * * *